(12) United States Patent
Kaner et al.

(10) Patent No.: US 11,168,001 B2
(45) Date of Patent: Nov. 9, 2021

(54) MIXED METAL DODECABORIDES AND USES THEREOF

(71) Applicant: The Regents of the University of California, Oakland, CA (US)

(72) Inventors: Richard Barry Kaner, Pacific Palisades, CA (US); Georgiy Akopov, Ames, IA (US); Michael Tyrone Yeung, Los Angeles, CA (US); Christopher Lawrence Turner, Lancaster, CA (US); Zachary C. Sobell, Menlo Park, CA (US); Cheng-Wei Lin, Los Angeles, CA (US)

(73) Assignee: The Regents of the University of California, Oakland, CA (US)

( * ) Notice: Subject to any disclaimer, the term of this patent is extended or adjusted under 35 U.S.C. 154(b) by 13 days.

(21) Appl. No.: 16/122,522

(22) Filed: Sep. 5, 2018

(65) Prior Publication Data
US 2019/0071318 A1 Mar. 7, 2019

Related U.S. Application Data

(60) Provisional application No. 62/554,376, filed on Sep. 5, 2017.

(51) Int. Cl.
*C01G 25/00* (2006.01)
*C01B 35/04* (2006.01)
*C01F 17/30* (2020.01)

(52) U.S. Cl.
CPC ............ *C01G 25/006* (2013.01); *C01B 35/04* (2013.01); *C01F 17/30* (2020.01); *C01P 2002/30* (2013.01); *C01P 2002/52* (2013.01); *C01P 2002/72* (2013.01); *C01P 2002/88* (2013.01); *C01P 2004/03* (2013.01); *C01P 2006/10* (2013.01)

(58) Field of Classification Search
None
See application file for complete search history.

(56) References Cited

U.S. PATENT DOCUMENTS 6,129,362 A * 10/2000 Kashima ............... F16L 27/073
277/651

FOREIGN PATENT DOCUMENTS

WO 2017/132286 A1 8/2017

OTHER PUBLICATIONS

Lugovy et al.; Boron Rich Solids; NATO Science for Peace; Dec. 2009.*
Georgiy Akopov et al., "Stabilization of LnB12 (Ln = Gd, Sm, Nd, and Pr) in Zr1-xLnxB12 under Ambient Pressure", Inorganic Chemistry, 2016, 55, pp. 12419-12426.
Georgiy Akopov et al., "Superhard Mixed Transition Metal Dodecaborides", Chemistry of Materials, 2016, 28, pp. 6605-6612.

* cited by examiner

*Primary Examiner* — Guinever S Gregorio
(74) *Attorney, Agent, or Firm* — Venable LLP; Henry J. Daley

(57) ABSTRACT

Disclosed herein, in certain embodiments, are compounds, methods, tools, and abrasive materials comprising mixed transition metal dodecaborides.

7 Claims, 24 Drawing Sheets
(7 of 24 Drawing Sheet(s) Filed in Color)

MIXED METAL DODECABORIDES AND USES THEREOF

CROSS-REFERENCE TO RELATED APPLICATION

This application claims the benefit of U.S. Provisional Application No. 62/554,376, filed Sep. 5, 2017, which application is incorporated herein by reference.

STATEMENT AS TO FEDERALLY SPONSORED RESEARCH

This invention was made with Government support under Grant No. 1506860 awarded by the National Science Foundation (NSF). The Government has certain rights in the invention.

BACKGROUND OF THE INVENTION

In many manufacturing processes, materials must be cut, formed, or drilled and their surfaces protected with wear-resistant coatings. Diamond has traditionally been the material of choice for these applications, due to its superior mechanical properties, e.g. hardness>70 GPa. However, diamond is rare in nature and difficult to synthesize artificially due to the need for a combination of high temperature and high pressure conditions. Industrial applications of diamond are thus generally limited by cost. Moreover, diamond is not a good option for high-speed cutting of ferrous alloys due to its graphitization on the material's surface and formation of brittle carbides, which leads to poor cutting performance.

SUMMARY OF THE INVENTION

Disclosed herein, in certain embodiments, are composite materials, methods, tools, and abrasive materials comprising mixed metal dodecaborides.

In one embodiment is a composite matrix comprising: $Zr_{1-x}M_xB_{12}$, or $Y_{1-x}Sc_xB_{12}$;
wherein:
M is yttrium (Y), scandium (Sc), gadolinium (Gd), samarium (Sm), neodymium (Nd), or praseodymium (Pr);
x is from 0.001 to 0.999.

In one embodiment, is a composite matrix comprising: $A_{1-x}M_xB_c$;
wherein:
A is zirconium (Zr), yttrium (Y) or scandium (Sc);
M is yttrium (Y), scandium (Sc), gadolinium (Gd), samarium (Sm), neodymium (Nd), praseodymium (Pr), terbium (Tb), dysprosium (Dy), holmium (Ho), erbium (Er), thulium (Tm), ytterbium (Yb), or lutetium (Lu);
x is from 0.001 to 0.999; and
c is 12-20; wherein
if A is Zr and c is 12, M is not Y, Sc, Gd, Sm, Nd, or Pr;
if A is Y and c is 12, M is not Sc;
if A is Sc and c is 12, M is not Y; and
A is not M.

In one embodiment, is a method of preparing a composite matrix described herein, wherein any of Zr, Y, Sc, Gd, Sm, or Nd and B are homogenized in an agate mortar and pestle or a vortex mixer, pressed under an 8-12 ton load, and arc melted under an argon atmosphere. In one embodiment, is a method of preparing a composite matrix described herein, wherein any of Zr, Y, Sc, Gd, Sm, Nd, Pr, Tb, Dy, Ho, Er, Tm, Yb, or Lu and B are homogenized in an agate mortar and pestle or a vortex mixer, pressed under an 8-12 ton load, and arc melted under an argon atmosphere.

In one embodiment, is a lightweight coating comprising a composite described herein.

In one embodiment, is a tool comprising a surface or body for cutting or abrading, wherein the surface or body comprises a composite matrix described herein.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Various aspects of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1:
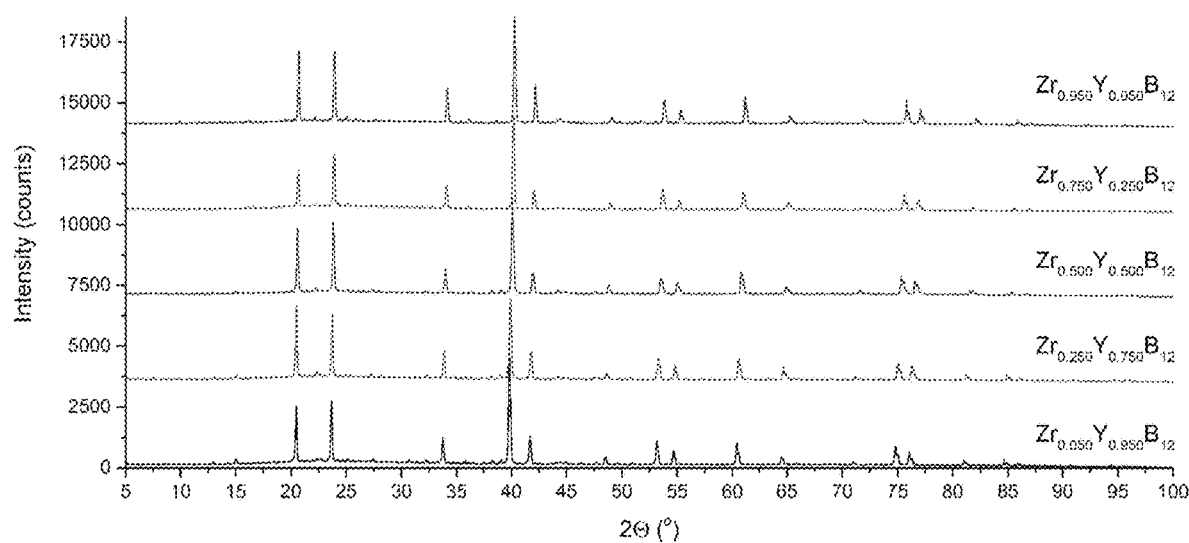
FIG. 1 shows X-ray powder diffractograms of $Zr_{1-x}Y_xB_{12}$.

Wear and tear are part of the normal use of tools and machines. There are different types of wear mechanisms, including, for example, abrasion wear, adhesion wear, attrition wear, diffusion wear, fatigue wear, edge chipping (or premature wear), and oxidation wear (or corrosive wear). Abrasion wear occurs when the hard particle or debris, such as chips, passes over or abrades the surface of a cutting tool. Adhesion wear or attrition wear occurs when debris removes microscopic fragments from a tool. Diffusion wear occurs when atoms in a crystal lattice move from a region of high concentration to a region of low concentration and the move weakens the surface structure of a tool. Fatigue wear occurs at a microscopic level when two surfaces slide in contact with each other under high pressure, generating surface cracks. Edge chipping or premature wear occurs as small breaking away of materials from the surface of a tool. Oxidation wear or corrosive wear occurs as a result of a chemical reaction between the surface of a tool and oxygen.

The present application discloses new materials having enhanced resistance to the above-mentioned types of wear and tear. The development of new materials with superior mechanical properties is challenging because of the many attributes that need to be controlled, ranging from hardness to oxidation resistance. These new material formulations may need to be superhard (defined as having Vickers hardness (Hv) greater than 40 GPa at a given force of applied load), so that they may be able to supplant tungsten carbide (Hv=13-25 GPa at 0.5 N of applied loading, force comparable to that experienced by materials during cutting and machining), the current industrial standard for drilling and machining, as well as having similar or superior oxidation resistance.

Indeed, the discovery of new superhard materials in higher borides comes from attempts to simulate diamond, the hardest material known thus far. Diamond is both highly incompressible and resistant to shear; together, this accounts for diamond's superior resistance to surface deformation and thus, high hardness. Not surprisingly, there are few compounds that possess the requisite attributes for superhardness, and among them are the higher metal borides. For $ReB_2$, $CrB_4$ and $WB_4$, the high electron density of the transition metal provides the ultra-incompressibility, while the high density of covalent bonds prevents the propagation of slip.

Metal dodecaborides ($MB_{12}$) constitute a class of boron rich compounds previously studied for their magnetic, optical and electronic properties. The structure of all dodecaborides contains boron cuboctahedron cages composed of 24 atoms, each containing a 12-coordinate metal in its center. The cages are usually arranged in a face-centered cubic close packed arrangement, forming the cubic-$UB_{12}$ Fm3̄m structure; however, $ScB_{12}$ forms its own structural type—tetragonal—ScB12 (I4/mmm), where the cuboctahedra are arranged in a body-centered tetragonal close-packed structure. Dodecaborides are known to exist for a number of metals: transition metals (Zr, Hf, Y and Sc), lanthanides (Tb, Dy, Ho, Er, Tm, Yb and Lu) and actinides (U and Th). For the most part, the aforementioned dodecaborides have been prepared via arc melting from the elements, or by borothermal reduction of the metal oxide under vacuum, to yield fully dense ingots or compacts, respectively. $HfB_{12}$ and $ThB_{12}$ are especially interesting, since in pure form they can only be formed under high pressure (6.5 GPa) and high temperature (1660° C.); however, they can be stabilized under ambient pressure in the matrices of $ZrB_{12}$ ($Zr_{1-x}Th_xB_{12}$) and $YB_{12}$ ($Y_{1-x}Hf_xB_{12}$).

The size of a metal atom in a 12-coordinate environment places limitations on which atoms can fit inside a boron cuboctahedral environment and form a metal dodecaboride. All metal dodecaborides, stable under ambient pressure, have metal atoms with sizes intermediate between zirconium ($r_{at}$=1.55 Å, $r_{CN=12}$=1.603 Å) and yttrium ($r_{at}$=1.80 Å, $r_{CN=12}$=1.801 Å), the smallest and largest metal atoms, respectively, capable of forming a stable transition metal dodecaboride. Therefore, this size requirement results in the stable dodecaboride lattice parameter lying between 7.408 Å ($ZrB_{12}$) and 7.500 Å ($YB_{12}$).

Dodecaborides where the metal cation lies outside the range of stability ($HfB_{12}$, $GdB_{12}$ and $ThB_{12}$) requires pressures upwards of 6.5 GPa. These phases have metal atoms either smaller than zirconium (Hf, $r_{at}$=1.55 Å, $r_{CN=12}$=1.580 Å) and thus incapable of accommodating the boron cuboctahedron cage, or larger that yttrium, resulting in a unit cell far exceeding the size of the $YB_{12}$ cell (a=7.524 Å for $GdB_{12}$ and a=7.612 Å for $ThB_{12}$). The broad applicability of high-pressure synthesis for dodecaborides of all sizes comes from differences in incompressibility between the metal atom and the boron network. For $HfB_{12}$, hafnium is more incompressible than the boron network; thus, the boron network shrinks in size under applied pressure, increasing the effective size of the hafnium atom. For $GdB_{12}$ and $ThB_{12}$ the effect is reversed, with the effective size of the metal atom shrinking due to the increased compressibility of gadolinium and thorium atoms when compared to the boron network.

Described herein is the stabilization of the high-pressure phase of $GdB_{12}$ in a matrix of $ZrB_{12}$, with a solubility of Gd in $ZrB_{12}$ reaching 54 at. % Gd, along with select properties. Also described are the stabilizations with limited solubilities (below 15%) of previously un-synthesized $SmB_{12}$, $NdB_{12}$ and $PrB_{12}$ in $ZrB_{12}$ matrices, demonstrating a decrease in solubility with increasing size of the secondary metal.

Pure dodecaborides are superhard, which can be attributed to their high isotropy and stiff metal-boron bonds as well as boron-boron bonds forming the cuboctahedra. $MB_{12}$, as secondary phases, are also known to increase the hardness of other borides, such as WB4, through extrinsic hardening mechanisms. Atomic radii may play a determining role in the different structural types of tetragonal-$ScB_{12}$ and cubic-MB but electronic structure of the atoms also plays an important role. Scandium, although being a transition metal, behaves more like an alkaline-earth metal.

Apart from the fundamental interest of metal $MB_{12}$ due to their unique structure, their properties are also of interest in industrial applications, such as Zr-based cutting tools and abrasives (with abrasive qualities comparable to that of diamond, but producing less roughening of surfaces). Therefore, the mechanical properties (superhardness), lightweight (due to density comparable or lower than that of diamond (3.52 $g/cm^3$)) and enhanced oxidation resistance properties are of interest for potential applications in machining industries and as lightweight protective coatings.

In some embodiments, described herein include composite matrix materials, when applied to a tool or abrasive material, reduce the rate of oxidation wear of the tool or abrasive material, or inhibit oxidation wear of the tool or abrasive material. In some embodiments, also described herein include methods of manufacturing of the composite matrix, and tools and abrasive materials for use with the composite matrix.

In one embodiment is a composite matrix comprising:
$Zr_{1-x}M_xB_{12}$, or $Y_{1-x}Sc_xB_{12}$;
wherein:
M is yttrium (Y), scandium (Sc), gadolinium (Gd), samarium (Sm), neodymium (Nd), or praseodymium (Pr);
x is from 0.001 to 0.999.

In some embodiments of a composite matrix described herein, x is 0.001-0.200. In some embodiments of a composite matrix described herein, x is 0.201-0.400. In some embodiments of a composite matrix described herein, x is 0.401-0.600. In some embodiments of a composite matrix described herein, x is 0.601-0.800. In some embodiments of a composite matrix described herein, x is 0.801-0.999. In some embodiments of a composite matrix described herein, x is 0.25. In some embodiments of a composite matrix described herein, x is 0.50. In some embodiments of a composite matrix described herein, x is 0.75. In some embodiments of a composite matrix described herein, x is 0.80. In some embodiments of a composite matrix described herein, x is 0.85. In some embodiments of a composite matrix described herein, x is 0.90. In some embodiments of a composite matrix described herein, x is 0.95. In some embodiments of a composite matrix described herein, the composite matrix is resistant to oxidation.

In some embodiments of a composite matrix described herein, the composite matrix is resistant to oxidation below 620° C. In some embodiments of a composite matrix described herein, the composite matrix is resistant to oxidation below 675° C. In some embodiments of a composite matrix described herein, the composite matrix is resistant to oxidation below 685° C.

In some embodiments of a composite matrix described herein, the composite matrix possesses a density of 4.0 $g/cm^3$ or less. In some embodiments of a composite matrix described herein, the composite matrix possesses a density of 3.55 $g/cm^3$ or less. In some embodiments of a composite matrix described herein, the composite matrix possesses a density of 3.35 $g/cm^3$ or less.

In some embodiments of a composite matrix described herein, the composite matrix possesses a density of 3.21 $g/cm^3$ or less. In some embodiments of a composite matrix described herein, the composite matrix possesses a hardness between 38.0 and 52.0 GPa. In some embodiments of a composite matrix described herein, the composite matrix possesses a hardness between 44.0 and 48.0 GPa. In some embodiments of a composite matrix described herein, the composite matrix possesses a hardness between 45.0 and 51.0 GPa. In some embodiments of a composite matrix described herein, the composite matrix possesses a hardness between 42.0 and 48.0 GPa. In some embodiments of a composite matrix described herein, the composite matrix possesses a hardness between 38.0 and 45.0 GPa.

In some embodiments of a composite matrix described herein, the composite matrix unit cell is cubic or tetragonal. In some embodiments of a composite matrix described herein, the composite matrix unit cell is cubic and the length of a is between 7.350 and 7.550 Å, wherein a is the length between two adjacent vertices in the unit cell. In some embodiments of a composite matrix described herein, the composite matrix unit cell is tetragonal and the length of a is between 5.150 and 5.450 Å, where a is the shortest length between two adjacent vertices in the unit cell, and the length of c is between 7.350 and 7.550 Å, where c is the longest length between two adjacent vertices in the unit cell.

In some embodiments, the composite matrix is $Zr_{1-x}Y_xB_{12}$. In some embodiments, the composite matrix is $Zr_{1-x}Sc_xB_{12}$. In some embodiments, the composite matrix is $Y_{1-x}Sc_xB_{12}$. In some embodiments, the composite matrix is $Zr_{1-x}Gd_xB_{12}$. In some embodiments, the composite matrix is $Zr_{1-x}Sm_xB_{12}$. In some embodiments, the composite matrix is $Zr_{1-x}Nd_xB_{12}$. In some embodiments, the composite matrix is $Zr_{1-x}Pr_xB_{12}$.

In some embodiments, the composite matrix is $Zr_{1-x}Y_xB_{12}$ and characterized by X-ray diffraction pattern reflections given in Table 8. In some embodiments, the composite matrix is $Zr_{1-x}Y_xB_{12}$ and characterized by at least one X-ray diffraction pattern reflection given in Table 8. In some embodiments, the composite matrix is $Zr_{1-x}Sc_xB_{12}$ and characterized by X-ray diffraction pattern reflections given in Tables 9 or 10. In some embodiments, the composite matrix is $Zr_{1-x}Sc_xB_{12}$ and characterized by at least one X-ray diffraction pattern reflection given in Table 9 or 10. In some embodiments, the composite matrix is $Y_{1-x}Sc_xB_{12}$ and characterized by X-ray diffraction pattern reflections given in Table 11 or 12. In some embodiments, the composite matrix is $Y_{1-x}Sc_xB_{12}$ and characterized by at least one X-ray diffraction pattern reflection given in Table 11 or 12. In some embodiments, the composite matrix is $Zr_{1-x}Gd_xB_{12}$ and characterized by X-ray diffraction pattern reflections given in Table 13. In some embodiments, the composite matrix is $Zr_{1-x}Gd_xB_{12}$ and characterized by at least one X-ray diffraction pattern reflection given in Table 13. In some embodiments, the composite matrix is $Zr_{1-x}Sm_xB_{12}$ and characterized by X-ray diffraction pattern reflections given in Table 14. In some embodiments, the composite matrix is $Zr_{1-x}Sm_xB_{12}$ and characterized by at least one X-ray diffraction pattern reflection given in Table 14. In some embodiments, the composite matrix is $Zr_{1-x}Nd_xB_{12}$ and characterized by X-ray diffraction pattern reflections given in Table 15. In some embodiments, the composite matrix is $Zr_{1-x}Nd_xB_{12}$ and characterized by at least one X-ray diffraction pattern reflection given in Table 15. In some embodiments, the composite matrix is $Zr_{1-x}Pr_xB_{12}$ and characterized by X-ray diffraction pattern reflections given in Table 16. In some embodiments, the composite matrix is $Zr_{1-x}Pr_xB_{12}$ and characterized by at least one X-ray diffraction pattern reflection given in Table 16.

In one embodiment is a composite matrix comprising:
$A_{1-x}M_xB_c$;
wherein:
A is zirconium (Zr), yttrium (Y) or scandium (Sc);
M is yttrium (Y), scandium (Sc), gadolinium (Gd), samarium (Sm), neodymium (Nd), praseodymium (Pr), terbium (Tb), dysprosium (Dy), holmium (Ho), erbium (Er), thulium (Tm), ytterbium (Yb), or lutetium (Lu);
x is from 0.001 to 0.999; and
c is 12-20; wherein
if A is Zr and c is 12, M is not Y, Sc, Gd, Sm, Nd, or Pr;
if A is Y and c is 12, M is not Sc;
if A is Sc and c is 12, M is not Y; and
A is not M.

In another embodiment is a method of preparing a composite matrix described herein, wherein the raw materials are homogenized in an agate mortar and pestle or vortex mixer, pressed under an 8-12 ton load, and arc melted under an argon atmosphere. In another embodiment is a method of preparing a composite matrix described herein, wherein the arc melting is performed using a current of over 50 A for a time of between 0.01 and 5 minutes. In another embodiment is a method of preparing a composite matrix described herein, wherein the arc melting is performed using a current of over between 65-75 A for a time of between 1 and 2 minutes.

In another embodiment is a lightweight coating comprising a composite matrix described herein.

In another embodiment is a tool comprising a surface or body for cutting or abrading, wherein the surface or body comprises a composite matrix described herein.

In one embodiment is a composite matrix comprising:
$Zr_{1-x}M_xB_{12}$, or $Y_{1-x}Sc_xB_{12}$;
wherein:
M is yttrium (Y), scandium (Sc), gadolinium (Gd), samarium (Sm), neodymium (Nd), or praseodymium (Pr);
x is from 0.001 to 0.999.

In one embodiment, the composite matrix is resistant to oxidation. In one embodiment, the composite matrix possesses a density of 4.0 g/cm$^3$ or less. In one embodiment, the composite matrix possesses a hardness between 38.0 and 52.0 GPa. In one embodiment, the composite matrix is crystalline. In one embodiment, the composite matrix is crystalline and comprises a unit cell that is cubic or tetragonal as determined by X-ray powder diffraction. In one embodiment, the unit cell is cubic and the length between two adjacent vertices in the unit cell is a, and a is from 7.350 to 7.550 Å. In one embodiment, the unit cell is tetragonal and comprises two distinct lengths between one vertex and at least two adjacent vertices, wherein the two distinct lengths comprise a first length c and a second length a, wherein c is from 7.350 to 7.550 Å and a is from 5.150 to 5.450 Å. In one embodiment, the composite matrix is $Zr_{1-x}Y_xB_{12}$. In one embodiment, the composite matrix is $Zr_{1-x}Sc_xB_{12}$. In one embodiment, the composite matrix is $Y_{1-x}Sc_xB_{12}$. In one embodiment, the composite matrix is $Zr_{1-x}Gd_xB_{12}$. In one embodiment, the composite matrix is $Zr_{1-x}Sm_xB_{12}$. In one embodiment, the composite matrix is $Zr_{1-x}Nd_xB_{12}$. In one embodiment, the composite matrix is $Zr_{1-x}Pr_xB_{12}$.

In one embodiment, is a composite matrix comprising:
$A_{1-x}M_xB_c$;
wherein:
A is zirconium (Zr), yttrium (Y) or scandium (Sc);
M is yttrium (Y), scandium (Sc), gadolinium (Gd), samarium (Sm), neodymium (Nd), praseodymium (Pr), terbium (Tb), dysprosium (Dy), holmium (Ho), erbium (Er), thulium (Tm), ytterbium (Yb), or lutetium (Lu);
x is from 0.001 to 0.999; and
c is 12-20; wherein
if A is Zr and c is 12, M is not Y, Sc, Gd, Sm, Nd, or Pr;
if A is Y and c is 12, M is not Sc;
if A is Sc and c is 12, M is not Y; and
A is not M.

In one embodiment, the composite matrix is $Y_{1-x}Gd_xB_c$, $Sc_{1-x}Gd_xB_c$, $Y_{1-x}Sm_xB_c$, $Sc_{1-x}Sm_xB_c$, $Y_{1-x}Nd_xB_c$, $Sc_{1-x}Nd_xB_c$, $Y_{1-x}Pr_xB_c$, $Sc_{1-x}Pr_xB_c$, $Zr_{1-x}Tb_xB_c$, $Y_{1-x}Tb_xB_c$, $Sc_{1-x}Tb_xB_c$, $Zr_{1-x}Dy_xB_c$, $Y_{1-x}DY_xB_c$, $Sc_{1-x}Dy_xB_c$, $Zr_{1-x}Ho_xB_c$, $Y_{1-x}Ho_xB_c$, $Sc_{1-x}Ho_xB_c$, $Zr_{1-x}Er_xB_c$, $Y_{1-x}Er_xB_c$, $Sc_{1-x}Er_xB_c$, $Zr_{1-x}Tm_xB_c$, $Y_{1-x}Tm_xB_c$, $Sc_{1-x}Tm_xB_c$, $Zr_{1-x}Yb_xB_c$, $Y_{1-x}Yb_xB_c$, $Sc_{1-x}Yb_xB_c$, $Zr_{1-x}Lu_xB_c$, $Y_{1-x}Lu_xB_c$, or $Sc_{1-x}Lu_xB_c$.

In one embodiment, is a method of preparing a composite matrix described herein, wherein any of Zr, Y, Sc, Gd, Sm, or Nd and B are homogenized in an agate mortar and pestle or a vortex mixer, pressed under an 8-12 ton load, and arc melted under an argon atmosphere. In one embodiment, is a method of preparing a composite matrix described herein, wherein any of Zr, Y, Sc, Gd, Sm, Nd, Pr, Tb, Dy, Ho, Er, Tm, Yb, or Lu and B are homogenized in an agate mortar and pestle or a vortex mixer, pressed under an 8-12 ton load, and arc melted under an argon atmosphere.

In one embodiment, is a lightweight coating comprising a composite described herein.

In one embodiment, is a tool comprising a surface or body for cutting or abrading, wherein the surface or body comprises a composite matrix described herein.

Mixed Metal Dodecaboride Composite Matrix

In some embodiments, a composite matrix described herein comprises a composition comprising at least two metals and boron (B). In some embodiments, the composite matrix is prepared with a ratio of all metal atoms to boron atoms is about 1 to 12. In some embodiments, the composite matrix is a superhard material. In some embodiments, the composite matrix comprises a solid solution phase. In some embodiments, the composite matrix is resistant to oxidation.

In some embodiments, a composite matrix described herein comprises a composition comprising at least two metals and boron (B). In some embodiments, the composite matrix is prepared with a ratio of all metal atoms to boron atoms is from about 1 to 12 to about 1 to 20. In some embodiments, the composite matrix is prepared with a ratio of all metal atoms to boron atoms of about 1 to 12. In some embodiments, the composite matrix is prepared with a ratio of all metal atoms to boron atoms of about 1 to 13. In some embodiments, the composite matrix is prepared with a ratio of all metal atoms to boron atoms of about 1 to 14. In some embodiments, the composite matrix is prepared with a ratio of all metal atoms to boron atoms of about 1 to 15. In some embodiments, the composite matrix is prepared with a ratio of all metal atoms to boron atoms of about 1 to 16. In some embodiments, the composite matrix is prepared with a ratio of all metal atoms to boron atoms of about 1 to 17. In some embodiments, the composite matrix is prepared with a ratio of all metal atoms to boron atoms of about 1 to 18. In some embodiments, the composite matrix is prepared with a ratio of all metal atoms to boron atoms of about 1 to 19. In some embodiments, the composite matrix is prepared with a ratio of all metal atoms to boron atoms of about 1 to 20.

In one embodiment, described herein is a composite matrix comprising:
$Zr_{1-x}M_xB_{12}$, or $Y_{1-x}Sc_xB_{12}$;
wherein:
M is yttrium (Y), scandium (Sc), gadolinium (Gd), samarium (Sm), neodymium (Nd), or praseodymium (Pr);
x is from 0.001 to 0.999.

In some embodiments, M is Y. In some embodiments, M is Sc. In some embodiments, M is Gd. In some embodiments, M is Sm. In some embodiments, M is Nd. In some embodiments, M is Pr.

In some embodiments, M comprises Y, Sc, Gd, Sm, Nd, or Pr. In some embodiments, M comprises Y or Sc. In some embodiments, M comprises Gd, Sm, Nd, or Pr.

In some embodiments, M comprises at least Y. In some embodiments, M comprises at least Sc. In some embodiments, M comprises at least Gd. In some embodiments, M comprises at least Sm. In some embodiments, M comprises at least Nd. In some embodiments, M comprises at least Pr. In some embodiments, M comprises two or more elements selected from Y, Sc, Gd, Sm, Nd, or Pr.

In some embodiments is a composite matrix comprising:
$Zr_{1-x}Y_xB_c$;
wherein:
x is from 0.001 to 0.999; and
c is 12-20.

In some embodiments, the composite matrix is $Zr_{1-x}Y_xB_c$ and prepared with a ratio of all metal atoms to boron atoms from about 1 to 12 to about 1 to 20. In some embodiments, the composite matrix is prepared with a ratio of all metal atoms to boron atoms of about 1 to 12. In some embodiments, the composite matrix is prepared with a ratio of all metal atoms to boron atoms of about 1 to 13. In some embodiments, the composite matrix is prepared with a ratio of all metal atoms to boron atoms of about 1 to 14. In some embodiments, the composite matrix is prepared with a ratio of all metal atoms to boron atoms of about 1 to 15. In some embodiments, the composite matrix is prepared with a ratio of all metal atoms to boron atoms of about 1 to 16. In some embodiments, the composite matrix is prepared with a ratio of all metal atoms to boron atoms of about 1 to 17. In some embodiments, the composite matrix is prepared with a ratio of all metal atoms to boron atoms of about 1 to 18. In some embodiments, the composite matrix is prepared with a ratio of all metal atoms to boron atoms of about 1 to 19. In some embodiments, the composite matrix is prepared with a ratio of all metal atoms to boron atoms of about 1 to 20.

In some embodiments is a composite matrix comprising:
$Zr_{1-x}Y_xB_{12}$;
wherein:
x is from 0.001 to 0.999.

In some embodiments, the composite matrix is $Zr_{1-x}Y_xB_{12}$ and prepared with a ratio of all metal atoms to boron atoms from about 1 to 12 to about 1 to 20. In some embodiments, the composite matrix is prepared with a ratio of all metal atoms to boron atoms of about 1 to 12. In some embodiments, the composite matrix is prepared with a ratio of all metal atoms to boron atoms of about 1 to 13. In some embodiments, the composite matrix is prepared with a ratio of all metal atoms to boron atoms of about 1 to 14. In some embodiments, the composite matrix is prepared with a ratio of all metal atoms to boron atoms of about 1 to 15. In some embodiments, the composite matrix is prepared with a ratio of all metal atoms to boron atoms of about 1 to 16. In some embodiments, the composite matrix is prepared with a ratio of all metal atoms to boron atoms of about 1 to 17. In some embodiments, the composite matrix is prepared with a ratio of all metal atoms to boron atoms of about 1 to 18. In some embodiments, the composite matrix is prepared with a ratio of all metal atoms to boron atoms of about 1 to 19. In some embodiments, the composite matrix is prepared with a ratio of all metal atoms to boron atoms of about 1 to 20.

In some embodiments is a composite matrix comprising:
$Zr_{1-x}Sc_{1-x}B_c$;
wherein:
x is from 0.001 to 0.999; and
c is 12-20.

In some embodiments, the composite matrix is $Zr_{1-x}Sc_{1-x}B_c$ and prepared with a ratio of all metal atoms to boron atoms from about 1 to 12 to about 1 to 20. In some embodiments, the composite matrix is prepared with a ratio of all metal atoms to boron atoms of about 1 to 12. In some embodiments, the composite matrix is prepared with a ratio of all metal atoms to boron atoms of about 1 to 13. In some embodiments, the composite matrix is prepared with a ratio of all metal atoms to boron atoms of about 1 to 14. In some embodiments, the composite matrix is prepared with a ratio of all metal atoms to boron atoms of about 1 to 15. In some embodiments, the composite matrix is prepared with a ratio of all metal atoms to boron atoms of about 1 to 16. In some embodiments, the composite matrix is prepared with a ratio of all metal atoms to boron atoms of about 1 to 17. In some embodiments, the composite matrix is prepared with a ratio of all metal atoms to boron atoms of about 1 to 18. In some embodiments, the composite matrix is prepared with a ratio of all metal atoms to boron atoms of about 1 to 19. In some embodiments, the composite matrix is prepared with a ratio of all metal atoms to boron atoms of about 1 to 20.

In some embodiments is a composite matrix comprising:
$Zr_{1-x}Sc_xB_{12}$;
wherein:
x is from 0.001 to 0.999.

In some embodiments, the composite matrix is $Zr_{1-x}Sc_xB_{12}$ and prepared with a ratio of all metal atoms to boron atoms from about 1 to 12 to about 1 to 20. In some embodiments, the composite matrix is prepared with a ratio of all metal atoms to boron atoms of about 1 to 12. In some embodiments, the composite matrix is prepared with a ratio of all metal atoms to boron atoms of about 1 to 13. In some embodiments, the composite matrix is prepared with a ratio of all metal atoms to boron atoms of about 1 to 14. In some embodiments, the composite matrix is prepared with a ratio of all metal atoms to boron atoms of about 1 to 15. In some embodiments, the composite matrix is prepared with a ratio of all metal atoms to boron atoms of about 1 to 16. In some embodiments, the composite matrix is prepared with a ratio of all metal atoms to boron atoms of about 1 to 17. In some embodiments, the composite matrix is prepared with a ratio of all metal atoms to boron atoms of about 1 to 18. In some embodiments, the composite matrix is prepared with a ratio of all metal atoms to boron atoms of about 1 to 19. In some embodiments, the composite matrix is prepared with a ratio of all metal atoms to boron atoms of about 1 to 20.

In some embodiments is a composite matrix comprising:
$Y_{1-x}Sc_xB_c$;
wherein:
x is from 0.001 to 0.999; and
c is 12-20.

In some embodiments, the composite matrix $Y_{1-x}Sc_{1-x}B_c$ and prepared with a ratio of all metal atoms to boron atoms from about 1 to 12 to about 1 to 20. In some embodiments, the composite matrix is prepared with a ratio of all metal atoms to boron atoms of about 1 to 12. In some embodiments, the composite matrix is prepared with a ratio of all metal atoms to boron atoms of about 1 to 13. In some embodiments, the composite matrix is prepared with a ratio of all metal atoms to boron atoms of about 1 to 14. In some embodiments, the composite matrix is prepared with a ratio of all metal atoms to boron atoms of about 1 to 15. In some embodiments, the composite matrix is prepared with a ratio of all metal atoms to boron atoms of about 1 to 16. In some embodiments, the composite matrix is prepared with a ratio of all metal atoms to boron atoms of about 1 to 17. In some embodiments, the composite matrix is prepared with a ratio of all metal atoms to boron atoms of about 1 to 18. In some embodiments, the composite matrix is prepared with a ratio of all metal atoms to boron atoms of about 1 to 19. In some embodiments, the composite matrix is prepared with a ratio of all metal atoms to boron atoms of about 1 to 20.

In some embodiments is a composite matrix comprising:
$Y_{1-x}Sc_xB_{12}$;
wherein:
x is from 0.001 to 0.999.

In some embodiments, the composite matrix is $Y_{1-x}Sc_xB_{12}$ and prepared with a ratio of all metal atoms to boron atoms from about 1 to 12 to about 1 to 20. In some embodiments, the composite matrix is prepared with a ratio of all metal atoms to boron atoms of about 1 to 12. In some embodiments, the composite matrix is prepared with a ratio of all metal atoms to boron atoms of about 1 to 13. In some embodiments, the composite matrix is prepared with a ratio of all metal atoms to boron atoms of about 1 to 14. In some embodiments, the composite matrix is prepared with a ratio of all metal atoms to boron atoms of about 1 to 15. In some embodiments, the composite matrix is prepared with a ratio of all metal atoms to boron atoms of about 1 to 16. In some embodiments, the composite matrix is prepared with a ratio of all metal atoms to boron atoms of about 1 to 17. In some embodiments, the composite matrix is prepared with a ratio of all metal atoms to boron atoms of about 1 to 18. In some embodiments, the composite matrix is prepared with a ratio of all metal atoms to boron atoms of about 1 to 19. In some embodiments, the composite matrix is prepared with a ratio of all metal atoms to boron atoms of about 1 to 20.

In some embodiments is a composite matrix comprising:
$Zr_{1-x}Gd_xB_c$;
wherein:
x is from 0.001 to 0.999; and
c is 12-20.

In some embodiments, the composite matrix is $Zr_{1-x}Gd_xB_c$ and prepared with a ratio of all metal atoms to boron atoms from about 1 to 12 to about 1 to 20. In some embodiments, the composite matrix is prepared with a ratio of all metal atoms to boron atoms of about 1 to 12. In some embodiments, the composite matrix is prepared with a ratio of all metal atoms to boron atoms of about 1 to 13. In some embodiments, the composite matrix is prepared with a ratio of all metal atoms to boron atoms of about 1 to 14. In some embodiments, the composite matrix is prepared with a ratio of all metal atoms to boron atoms of about 1 to 15. In some embodiments, the composite matrix is prepared with a ratio of all metal atoms to boron atoms of about 1 to 16. In some embodiments, the composite matrix is prepared with a ratio of all metal atoms to boron atoms of about 1 to 17. In some embodiments, the composite matrix is prepared with a ratio of all metal atoms to boron atoms of about 1 to 18. In some embodiments, the composite matrix is prepared with a ratio of all metal atoms to boron atoms of about 1 to 19. In some embodiments, the composite matrix is prepared with a ratio of all metal atoms to boron atoms of about 1 to 20.

In some embodiments is a composite matrix comprising:
$Zr_{1-x}Gd_xB_{12}$;
wherein:
x is from 0.001 to 0.999.

In some embodiments, the composite matrix is $Zr_{1-x}Gd_xB_{12}$ and prepared with a ratio of all metal atoms to boron atoms from about 1 to 12 to about 1 to 20. In some embodiments, the composite matrix is prepared with a ratio of all metal atoms to boron atoms of about 1 to 12. In some embodiments, the composite matrix is prepared with a ratio of all metal atoms to boron atoms of about 1 to 13. In some embodiments, the composite matrix is prepared with a ratio of all metal atoms to boron atoms of about 1 to 14. In some embodiments, the composite matrix is prepared with a ratio of all metal atoms to boron atoms of about 1 to 15. In some embodiments, the composite matrix is prepared with a ratio of all metal atoms to boron atoms of about 1 to 16. In some embodiments, the composite matrix is prepared with a ratio of all metal atoms to boron atoms of about 1 to 17. In some embodiments, the composite matrix is prepared with a ratio of all metal atoms to boron atoms of about 1 to 18. In some embodiments, the composite matrix is prepared with a ratio of all metal atoms to boron atoms of about 1 to 19. In some embodiments, the composite matrix is prepared with a ratio of all metal atoms to boron atoms of about 1 to 20.

In some embodiments is a composite matrix comprising:
$Zr_{1-x}Sm_xB_c$;
wherein:
x is from 0.001 to 0.999; and
c is 12-20.

In some embodiments, the composite matrix is $Zr_{1-x}Sm_xB_c$ and prepared with a ratio of all metal atoms to boron atoms from about 1 to 12 to about 1 to 20. In some embodiments, the composite matrix is prepared with a ratio of all metal atoms to boron atoms of about 1 to 12. In some embodiments, the composite matrix is prepared with a ratio of all metal atoms to boron atoms of about 1 to 13. In some embodiments, the composite matrix is prepared with a ratio of all metal atoms to boron atoms of about 1 to 14. In some embodiments, the composite matrix is prepared with a ratio of all metal atoms to boron atoms of about 1 to 15. In some embodiments, the composite matrix is prepared with a ratio of all metal atoms to boron atoms of about 1 to 16. In some embodiments, the composite matrix is prepared with a ratio of all metal atoms to boron atoms of about 1 to 17. In some embodiments, the composite matrix is prepared with a ratio of all metal atoms to boron atoms of about 1 to 18. In some embodiments, the composite matrix is prepared with a ratio of all metal atoms to boron atoms of about 1 to 19. In some embodiments, the composite matrix is prepared with a ratio of all metal atoms to boron atoms of about 1 to 20.

In some embodiments is a composite matrix comprising:
$Zr_{1-x}Sm_xB_{12}$;
wherein:
x is from 0.001 to 0.999.

In some embodiments, the composite matrix is $Zr_{1-x}Sm_xB_{12}$ and prepared with a ratio of all metal atoms to boron atoms from about 1 to 12 to about 1 to 20. In some embodiments, the composite matrix is prepared with a ratio of all metal atoms to boron atoms of about 1 to 12. In some embodiments, the composite matrix is prepared with a ratio of all metal atoms to boron atoms of about 1 to 13. In some embodiments, the composite matrix is prepared with a ratio of all metal atoms to boron atoms of about 1 to 14. In some embodiments, the composite matrix is prepared with a ratio of all metal atoms to boron atoms of about 1 to 15. In some embodiments, the composite matrix is prepared with a ratio of all metal atoms to boron atoms of about 1 to 16. In some embodiments, the composite matrix is prepared with a ratio of all metal atoms to boron atoms of about 1 to 17. In some embodiments, the composite matrix is prepared with a ratio of all metal atoms to boron atoms of about 1 to 18. In some embodiments, the composite matrix is prepared with a ratio of all metal atoms to boron atoms of about 1 to 19. In some embodiments, the composite matrix is prepared with a ratio of all metal atoms to boron atoms of about 1 to 20.

In some embodiments is a composite matrix comprising:
$Zr_{1-x}Nd_xB_c$;
wherein:
x is from 0.001 to 0.999; and
c is 12-20.

In some embodiments, the composite matrix $Zr_{1-x}Nd_xB_c$ and prepared with a ratio of all metal atoms to boron atoms from about 1 to 12 to about 1 to 20. In some embodiments, the composite matrix is prepared with a ratio of all metal atoms to boron atoms of about 1 to 12. In some embodiments, the composite matrix is prepared with a ratio of all metal atoms to boron atoms of about 1 to 13. In some embodiments, the composite matrix is prepared with a ratio of all metal atoms to boron atoms of about 1 to 14. In some embodiments, the composite matrix is prepared with a ratio of all metal atoms to boron atoms of about 1 to 15. In some embodiments, the composite matrix is prepared with a ratio of all metal atoms to boron atoms of about 1 to 16. In some embodiments, the composite matrix is prepared with a ratio of all metal atoms to boron atoms of about 1 to 17. In some embodiments, the composite matrix is prepared with a ratio of all metal atoms to boron atoms of about 1 to 18. In some embodiments, the composite matrix is prepared with a ratio of all metal atoms to boron atoms of about 1 to 19. In some embodiments, the composite matrix is prepared with a ratio of all metal atoms to boron atoms of about 1 to 20.

In some embodiments is a composite matrix comprising:
$Zr_{1-x}Nd_xB_{12}$;
wherein:
x is from 0.001 to 0.999.

In some embodiments, the composite matrix is $Zr_{1-x}Nd_xB_{12}$ and prepared with a ratio of all metal atoms to boron atoms from about 1 to 12 to about 1 to 20. In some embodiments, the composite matrix is prepared with a ratio of all metal atoms to boron atoms of about 1 to 12. In some embodiments, the composite matrix is prepared with a ratio of all metal atoms to boron atoms of about 1 to 13. In some embodiments, the composite matrix is prepared with a ratio of all metal atoms to boron atoms of about 1 to 14. In some embodiments, the composite matrix is prepared with a ratio of all metal atoms to boron atoms of about 1 to 15. In some embodiments, the composite matrix is prepared with a ratio of all metal atoms to boron atoms of about 1 to 16. In some embodiments, the composite matrix is prepared with a ratio of all metal atoms to boron atoms of about 1 to 17. In some embodiments, the composite matrix is prepared with a ratio of all metal atoms to boron atoms of about 1 to 18. In some embodiments, the composite matrix is prepared with a ratio of all metal atoms to boron atoms of about 1 to 19. In some embodiments, the composite matrix is prepared with a ratio of all metal atoms to boron atoms of about 1 to 20.

In some embodiments is a composite matrix comprising:
$Zr_{1-x}Pr_xB_c$;
wherein:
x is from 0.001 to 0.999; and
c is 12-20.

In some embodiments, the composite matrix is $Zr_{1-x}Pr_xB_c$ and prepared with a ratio of all metal atoms to boron atoms from about 1 to 12 to about 1 to 20. In some embodiments, the composite matrix is prepared with a ratio of all metal atoms to boron atoms of about 1 to 12. In some embodiments, the composite matrix is prepared with a ratio of all metal atoms to boron atoms of about 1 to 13. In some embodiments, the composite matrix is prepared with a ratio of all metal atoms to boron atoms of about 1 to 14. In some embodiments, the composite matrix is prepared with a ratio of all metal atoms to boron atoms of about 1 to 15. In some embodiments, the composite matrix is prepared with a ratio of all metal atoms to boron atoms of about 1 to 16. In some embodiments, the composite matrix is prepared with a ratio of all metal atoms to boron atoms of about 1 to 17. In some embodiments, the composite matrix is prepared with a ratio of all metal atoms to boron atoms of about 1 to 18. In some embodiments, the composite matrix is prepared with a ratio of all metal atoms to boron atoms of about 1 to 19. In some embodiments, the composite matrix is prepared with a ratio of all metal atoms to boron atoms of about 1 to 20.

In some embodiments is a composite matrix comprising:
$Zr_{1-x}Pr_xB_2$;
wherein:
x is from 0.001 to 0.999.

In some embodiments, the composite matrix is $Zr_{1-x}Pr_xB_{12}$ and prepared with a ratio of all metal atoms to boron atoms from about 1 to 12 to about 1 to 20. In some embodiments, the composite matrix is prepared with a ratio of all metal atoms to boron atoms of about 1 to 12. In some embodiments, the composite matrix is prepared with a ratio of all metal atoms to boron atoms of about 1 to 13. In some embodiments, the composite matrix is prepared with a ratio of all metal atoms to boron atoms of about 1 to 14. In some embodiments, the composite matrix is prepared with a ratio of all metal atoms to boron atoms of about 1 to 15. In some embodiments, the composite matrix is prepared with a ratio of all metal atoms to boron atoms of about 1 to 16. In some embodiments, the composite matrix is prepared with a ratio of all metal atoms to boron atoms of about 1 to 17. In some embodiments, the composite matrix is prepared with a ratio of all metal atoms to boron atoms of about 1 to 18. In some embodiments, the composite matrix is prepared with a ratio of all metal atoms to boron atoms of about 1 to 19. In some embodiments, the composite matrix is prepared with a ratio of all metal atoms to boron atoms of about 1 to 20.

In one embodiment is a composite matrix comprising:
$A_{1-x}M_xB_c$;
wherein:
A is zirconium (Zr), yttrium (Y) or scandium (Sc);
M is yttrium (Y), scandium (Sc), gadolinium (Gd), samarium (Sm), neodymium (Nd), praseodymium (Pr), terbium (Tb), dysprosium (Dy), holmium (Ho), erbium (Er), thulium (Tm), ytterbium (Yb), or lutetium (Lu);
x is from 0.001 to 0.999; and
c is 12-20; wherein
if A is Zr and c is 12, M is not Y, Sc, Gd, Sm, Nd, or Pr;
if A is Y and c is 12, M is not Sc;
if A is Sc and c is 12, M is not Y; and
A is not M.

In some embodiments, the composite matrix is resistant to oxidation.

In some embodiments, the composite matrix is $Y_{1-x}Gd_xB_c$, $Sc_{1-x}Gd_xB_c$, $Y_{1-x}Sm_xB_c$, $Sc_{1-x}Sm_xB_c$, $Y_{1-x}Nd_xB_c$, $Sc_{1-x}Nd_xB_c$, $Y_{1-x}Pr_xB_c$, $Sc_{1-x}Pr_xB_c$, $Zr_{1-x}Tb_xB_c$, $Y_{1-x}Tb_xB_c$, $Sc_{1-x}Tb_xB_c$, $Zr_{1-x}Dy_xB_c$, $Y_{1-x}DY_xB_c$, $Sc_{1-x}DY_xB_c$, $Zr_{1-x}Ho_xB_c$, $Y_{1-x}Ho_xB_c$, $Sc_{1-x}Ho_xB_c$, $Zr_{1-x}Er_xB_c$, $Y_{1-x}Er_xB_c$, $Sc_{1-x}Er_xB_c$, $Zr_{1-x}Tm_xB_c$, $Y_{1-x}Tm_xB_c$, $Sc_{1-x}Tm_xB_c$, $Zr_{1-x}Yb_xB_c$, $Y_{1-x}Yb_xB_c$, $Sc_{1-x}Yb_xB_c$, $Zr_{1-x}Lu_xB_c$, $Y_{1-x}Lu_xB_c$, or $Sc_{1-x}Lu_xB_c$.

In some embodiments, the composite matrix is $Y_{1-x}Gd_xB_{12}$, $Sc_{1-x}Gd_xB_{12}$, $Y_{1-x}Sm_xB_{12}$, $Sc_{1-x}Sm_xB_{12}$, $Y_{1-x}Nd_xB_{12}$, $Sc_{1-x}Nd_xB_{12}$, $Y_{1-x}Pr_xB_{12}$, $Sc_{1-x}Pr_xB_{12}$, $Zr_{1-x}Tb_xB_{12}$, $Y_{1-x}Tb_xB_{12}$, $Sc_{1-x}Tb_xB_{12}$, $Zr_{1-x}Dy_xB_{12}$, $Y_{1-x}Dy_xB_{12}$, $Sc_{1-x}Dy_xB_{12}$, $Zr_{1-x}Ho_xB_{12}$, $Y_{1-x}Ho_xB_{12}$, $Sc_{1-x}Ho_xB_{12}$, $Zr_{1-x}Er_xB_{12}$, $Y_{1-x}Er_xB_{12}$, $Sc_{1-x}Er_xB_{12}$, $Zr_{1-x}Tm_xB_{12}$, $Y_{1-x}Tm_xB_{12}$, $Sc_{1-x}Tm_xB_{12}$, $Zr_{1-x}Yb_xB_{12}$, $Y_{1-x}Yb_xB_{12}$, $Sc_{1-x}Yb_xB_{12}$, $Zr_{1-x}Lu_xB_{12}$, $Y_{1-x}Lu_xB_{12}$, or $Sc_{1-x}Lu_xB_{12}$.

In some embodiments, the composite matrix is $A_{1-x}M_xB_c$ and prepared with a ratio of all metal atoms to boron atoms from about 1 to 12 to about 1 to 20. In some embodiments, the composite matrix is prepared with a ratio of all metal atoms to boron atoms of about 1 to 12. In some embodiments, the composite matrix is prepared with a ratio of all metal atoms to boron atoms of about 1 to 13. In some embodiments, the composite matrix is prepared with a ratio of all metal atoms to boron atoms of about 1 to 14. In some embodiments, the composite matrix is prepared with a ratio of all metal atoms to boron atoms of about 1 to 15. In some embodiments, the composite matrix is prepared with a ratio of all metal atoms to boron atoms of about 1 to 16. In some embodiments, the composite matrix is prepared with a ratio of all metal atoms to boron atoms of about 1 to 17. In some embodiments, the composite matrix is prepared with a ratio of all metal atoms to boron atoms of about 1 to 18. In some embodiments, the composite matrix is prepared with a ratio of all metal atoms to boron atoms of about 1 to 19. In some embodiments, the composite matrix is prepared with a ratio of all metal atoms to boron atoms of about 1 to 20.

In some embodiments, x has a value within the range 0.001 to 0.999, inclusively. In some embodiments, x has a value within the range 0.005 to 0.99, 0.01 to 0.95, 0.05 to 0.9, 0.1 to 0.9, 0.001 to 0.6, 0.005 to 0.6, 0.01 to 0.6, 0.05 to 0.6, 0.1 to 0.6, 0.2 to 0.6, 0.3 to 0.6, 0.4 to 0.6, 0.001 to 0.55, 0.005 to 0.55, 0.01 to 0.55, 0.05 to 0.55, 0.1 to 0.55, 0.2 to 0.55, 0.3 to 0.55, 0.4 to 0.55, 0.45 to 0.55, 0.001 to 0.5, 0.005 to 0.5, 0.01 to 0.5, 0.05 to 0.5, 0.1 to 0.5, 0.2 to 0.5, 0.3 to 0.5, 0.4 to 0.5, 0.5 to 0.55, 0.45 to 0.5, 0.001 to 0.4, 0.005 to 0.4, 0.01 to 0.4, 0.05 to 0.4, 0.1 to 0.4, 0.2 to 0.4, 0.001 to 0.3, 0.005 to 0.3, 0.01 to 0.3, 0.05 to 0.3, 0.1 to 0.3, 0.001 to 0.2, 0.005 to 0.2, 0.01 to 0.2, 0.05 to 0.2, or 0.1 to 0.2, inclusively. In some embodiments, x has a value within the range 0.1 to 0.9, inclusively. In some embodiments, x has a value within the range 0.001 to 0.6, 0.005 to 0.6, 0.001 to 0.4, or 0.001 to 0.2, inclusively. In some embodiments, x has a value within the range 0.001 to 0.6, inclusively. In some embodiments, x has a value within the range 0.001 to 0.5, inclusively. In some embodiments, x has a value within the range 0.001 to 0.4, inclusively. In some embodiments, x has a value within the range 0.001 to 0.3, inclusively. In some embodiments, x has a value within the range 0.001 to 0.2, inclusively. In some embodiments, x has a value within the range 0.01 to 0.6, inclusively. In some embodiments, x has a value within the range 0.01 to 0.5, inclusively. In some embodiments, x has a value within the range 0.01 to 0.4, inclusively. In some embodiments, x has a value within the range 0.01 to 0.3, inclusively. In some embodiments, x has a value within the range 0.01 to 0.2, inclusively. In some embodiments, x has a value within the range 0.1 to 0.8, inclusively. In some embodiments, x has a value within the range 0.1 to 0.7, inclusively. In some embodiments, x has a value within the range 0.1 to 0.6, inclusively. In some embodiments, x has a value within the range 0.1 to 0.5, inclusively. In some embodiments, x has a value within the range 0.1 to 0.4, inclusively. In some embodiments, x has a value within the range 0.1 to 0.3, inclusively. In some embodiments, x has a value within the range 0.1 to 0.2, inclusively. In some embodiments, x has a value within the range 0.2 to 0.8, inclusively. In some embodiments, x has a value within the range 0.2 to 0.7, inclusively. In some embodiments, x has a value within the range 0.2 to 0.6, inclusively. In some embodiments, x has a value within the range 0.2 to 0.5, inclusively. In some embodiments, x has a value within the range 0.2 to 0.4, inclusively. In some embodiments, x has a value within the range 0.2 to 0.3, inclusively. In some embodiments, x has a value within the range 0.3 to 0.8, inclusively. In some embodiments, x has a value within the range 0.3 to 0.7, inclusively. In some embodiments, x has a value within the range 0.3 to 0.6, inclusively. In some embodiments, x has a value within the range 0.3 to 0.5, inclusively. In some embodiments, x has a value within the range 0.3 to 0.4, inclusively. In some embodiments, x has a value within the range 0.4 to 0.8, inclusively. In some embodiments, x has a value within the range 0.4 to 0.7, inclusively. In some embodiments, x has a value within the range 0.4 to 0.6, inclusively. In some embodiments, x has a value within the range 0.4 to 0.5, inclusively.

In some embodiments, x is at least 0.001 and less than 0.999. In some embodiments, x is at least 0.001 and less than 0.9. In some embodiments, x is at least 0.001 and less than 0.6. In some embodiments, x is at least 0.001 and less than 0.5. In some embodiments, x is at least 0.001 and less than 0.4. In some embodiments, x is at least 0.001 and less than 0.3. In some embodiments, x is at least 0.001 and less than 0.2. In some embodiments, x is at least 0.001 and less than 0.05. In some embodiments, x is at least 0.01 and less than 0.5. In some embodiments, x is at least 0.01 and less than 0.4. In some embodiments, x is at least 0.01 and less than 0.3. In some embodiments, x is at least 0.01 and less than 0.2. In some embodiments, x is at least 0.1 and less than 0.5. In some embodiments, x is at least 0.1 and less than 0.4. In some embodiments, x is at least 0.1 and less than 0.3. In some embodiments, x is at least 0.1 and less than 0.2.

In some embodiments, x has a value of about 0.001, 0.005, 0.01, 0.05, 0.1, 0.15, 0.2, 0.25, 0.3, 0.35, 0.4, 0.41, 0.42, 0.43, 0.44, 0.45, 0.46, 0.47, 0.48, 0.49, 0.5, 0.51, 0.52, 0.53, 0.54, 0.55, 0.56, 0.57, 0.58, 0.59, 0.6, 0.65, 0.7, 0.8, 0.9, 0.95, 0.99, or about 0.999. In some embodiments, x has a value of about 0.001. In some embodiments, x has a value of about 0.005. In some embodiments, x has a value of about 0.01. In some embodiments, x has a value of about 0.05. In some embodiments, x has a value of about 0.1. In some embodiments, x has a value of about 0.15. In some embodiments, x has a value of about 0.2. In some embodiments, x has a value of about 0.3. In some embodiments, x has a value of about 0.4. In some embodiments, x has a value of about 0.41. In some embodiments, x has a value of about 0.42. In some embodiments, x has a value of about 0.43. In some embodiments, x has a value of about 0.44. In some embodiments, x has a value of about 0.45. In some embodiments, x has a value of about 0.46. In some embodiments, x has a value of about 0.47. In some embodiments, x has a value of about 0.48. In some embodiments, x has a value of about 0.49. In some embodiments, x has a value of about 0.5. In some embodiments, x has a value of about 0.51. In some embodiments, x has a value of about 0.52. In some embodiments, x has a value of about 0.53. In some embodiments, x has a value of about 0.54. In some embodiments, x has a value of about 0.55. In some embodiments, x has a value of about 0.56. In some embodiments, x has a value of about 0.57. In some embodiments, x has a value of about 0.58. In some embodiments, x has a value of about 0.59. In some embodiments, x has a value of about 0.6. In some embodiments, x has a value of about 0.7. In some embodiments, x has a value of about 0.8. In some embodiments, x has a value of about 0.9. In some embodiments, x has a value of about 0.99.

In some embodiments, x is 0.001-0.200. In some embodiments, x is 0.201-0.400. In some embodiments, x is 0.401-0.600. In some embodiments, x is 0.601-0.800. In some embodiments, x is 0.801-0.999.

In some embodiments, x is about 0.05. In some embodiments, x is about 0.25. In some embodiments, x is about 0.50. In some embodiments, x is about 0.75. In some embodiments, x is about 0.80. In some embodiments, x is about 0.85. In some embodiments, x is about 0.90. In some embodiments, x is about 0.95.

In some embodiments, c has a value of 12-20. In some embodiments, c has a value of 12. In some embodiments, c has a value of 13. In some embodiments, c has a value of 14. In some embodiments, c has a value of 15. In some embodiments, c has a value of 16. In some embodiments, c has a value of 17. In some embodiments, c has a value of 18. In some embodiments, c has a value of 19. In some embodiments, c has a value of 20. In some embodiments, c has a value within the range of 12-13. In some embodiments, c has a value within the range of 13-14. In some embodiments, c has a value within the range of 14-15. In some embodiments, c has a value within the range of 15-16. In some embodiments, c has a value within the range of 17-18. In some embodiments, c has a value within the range of 19-20. In some embodiments, c has a value within the range of 12-14. In some embodiments, c has a value within the range of 12-16. In some embodiments, c has a value within the range of 12-18. In some embodiments, c has a value within the range of 14-16. In some embodiments, c has a value within the range of 14-18. In some embodiments, c has a value within the range of 14-20. In some embodiments, c has a value within the range of 16-18. In some embodiments, c has a value within the range of 16-20. In some embodiments, c has a value within the range of 18-20.

In some embodiments M is Y, and x is at least 0.001 and less than 0.999. In some embodiments M is Y, and x is at least 0.100 and less than 0.900. In some embodiments M is Y, and x is at least 0.200 and less than 0.800. In some embodiments M is Y, and x is at least 0.300 and less than 0.700. In some embodiments M is Y, and x is at least 0.400 and less than 0.600.

In some embodiments, the composite matrix is $Zr_{0.95}Y_{0.05}B_{12}$. In some embodiments, the composite matrix is $Zr_{0.90}Y_{0.10}B_{12}$. In some embodiments, the composite matrix is $Zr_{0.85}Y_{0.15}B_{12}$. In some embodiments, the composite matrix is $Zr_{0.80}Y_{0.20}B_{12}$. In some embodiments, the composite matrix is $Zr_{0.75}Y_{0.25}B_{12}$. In some embodiments, the composite matrix is $Zr_{0.70}Y_{0.30}B_{12}$. In some embodiments, the composite matrix is $Zr_{0.65}Y_{0.35}B_{12}$. In some embodiments, the composite matrix is $Zr_{0.60}Y_{0.40}B_{12}$. In some embodiments, the composite matrix is $Zr_{0.55}Y_{0.45}B_{12}$. In some embodiments, the composite matrix is $Zr_{0.50}Y_{0.50}B_{12}$. In some embodiments, the composite matrix is $Zr_{0.45}Y_{0.55}B_{12}$. In some embodiments, the composite matrix is $Zr_{0.40}Y_{0.60}B_{12}$. In some embodiments, the composite matrix is $Zr_{0.35}Y_{0.65}B_{12}$. In some embodiments, the composite matrix is $Zr_{0.30}Y_{0.70}B_{12}$. In some embodiments, the composite matrix is $Zr_{0.25}Y_{0.75}B_{12}$. In some embodiments, the composite matrix is $Zr_{0.20}Y_{0.65}B_{12}$. In some embodiments, the composite matrix is $Zr_{0.15}Y_{0.85}B_{12}$. In some embodiments, the composite matrix is $Zr_{0.10}Y_{0.90}B_{12}$. In some embodiments, the composite matrix is $Zr_{0.05}Y_{0.95}B_{12}$.

In some embodiments M is Sc, and x is at least 0.001 and less than 0.999. In some embodiments M is Sc, and x is at least 0.100 and less than 0.900. In some embodiments M is Sc, and x is at least 0.200 and less than 0.800. In some embodiments M is Sc, and x is at least 0.300 and less than 0.700. In some embodiments M is Sc, and x is at least 0.400 and less than 0.600.

In some embodiments, the composite matrix is $Zr_{0.95}Sc_{0.05}B_{12}$. In some embodiments, the composite matrix is $Zr_{0.90}Sc_{0.10}B_{12}$. In some embodiments, the composite matrix is $Zr_{0.85}Sc_{0.15}B_{12}$. In some embodiments, the composite matrix is $Zr_{0.80}Sc_{0.20}B_{12}$. In some embodiments, the composite matrix is $Zr_{0.75}Sc_{0.25}B_{12}$. In some embodiments, the composite matrix is $Zr_{0.70}Sc_{0.30}B_{12}$. In some embodiments, the composite matrix is $Zr_{0.65}Sc_{0.35}B_{12}$. In some embodiments, the composite matrix is $Zr_{0.60}Sc_{0.40}B_{12}$. In some embodiments, the composite matrix is $Zr_{0.70}Sc_{0.45}B_{12}$. In some embodiments, the composite matrix is $Zr_{0.50}Sc_{0.50}B_{12}$. In some embodiments, the composite matrix is $Zr_{0.45}Sc_{0.55}B_{12}$. In some embodiments, the composite matrix is $Zr_{0.40}Sc_{0.60}B_{12}$. In some embodiments, the composite matrix is $Zr_{0.35}Sc_{0.65}B_{12}$. In some embodiments, the composite matrix is $Zr_{0.30}Sc_{0.70}B_{12}$. In some embodiments, the composite matrix is $Zr_{0.25}Sc_{0.75}B_{12}$. In some embodiments, the composite matrix is $Zr_{0.20}Sc_{0.80}B_{12}$. In some embodiments, the composite matrix is $Zr_{0.15}Sc_{0.85}B_{12}$. In some embodiments, the composite matrix is $Zr_{0.10}Sc_{0.90}B_{12}$. In some embodiments, the composite matrix is $Zr_{0.05}Sc_{0.95}B_{12}$.

In some embodiments, the composite matrix is $Y_{0.95}Sc_{0.05}B_{12}$. In some embodiments, the composite matrix is $Y_{0.90}Sc_{0.10}B_{12}$. In some embodiments, the composite matrix is $Y_{0.85}Sc_{0.15}B_{12}$. In some embodiments, the composite matrix is $Y_{0.80}Sc_{0.20}B_{12}$. In some embodiments, the composite matrix is $Y_{0.75}Sc_{0.25}B_{12}$. In some embodiments, the composite matrix is $Y_{0.70}Sc_{0.30}B_{12}$. In some embodiments, the composite matrix is $Y_{0.65}Sc_{0.35}B_{12}$. In some embodiments, the composite matrix is $Y_{0.60}Sc_{0.40}B_{12}$. In some embodiments, the composite matrix is $Y_{0.55}Sc_{0.45}B_{12}$. In some embodiments, the composite matrix is $Y_{0.50}Sc_{0.50}B_{12}$. In some embodiments, the composite matrix is $Y_{0.45}Sc_{0.55}B_{12}$. In some embodiments, the composite matrix is $Y_{0.40}Sc_{0.60}B_{12}$. In some embodiments, the composite matrix is $Y_{0.35}Sc_{0.65}B_{12}$. In some embodiments, the composite matrix is $Y_{0.30}Sc_{0.70}B_{12}$. In some embodiments, the composite matrix is $Y_{0.25}Sc_{0.75}B_{12}$. In some embodiments, the composite matrix is $Y_{0.20}Sc_{0.80}B_{12}$. In some embodiments, the composite matrix is $Y_{0.15}Sc_{0.85}B_{12}$. In some embodiments, the composite matrix is $Y_{0.10}Sc_{0.90}B_{12}$. In some embodiments, the composite matrix is $Y_{0.05}Sc_{0.95}B_{12}$.

In some embodiments M is Gd, and x is at least 0.001 and less than 0.999. In some embodiments M is Gd, and x is at least 0.100 and less than 0.900. In some embodiments M is Gd, and x is at least 0.200 and less than 0.800. In some embodiments M is Gd, and x is at least 0.300 and less than 0.700. In some embodiments M is Gd, and x is at least 0.400 and less than 0.600.

In some embodiments, the composite matrix is $Zr_{0.95}Gd_{0.05}B_{12}$. In some embodiments, the composite matrix is $Zr_{0.90}Gd_{0.10}B_{12}$. In some embodiments, the composite matrix is $Zr_{0.85}Gd_{0.15}B_{12}$. In some embodiments, the composite matrix is $Zr_{0.80}Gd_{0.20}B_{12}$. In some embodiments, the composite matrix is $Zr_{0.75}Gd_{0.25}B_{12}$. In some embodiments, the composite matrix is $Zr_{0.70}Gd_{0.30}B_{12}$. In some embodiments, the composite matrix is $Zr_{0.65}Gd_{0.35}B_{12}$. In some embodiments, the composite matrix is $Zr_{0.60}Gd_{0.40}B_{12}$. In some embodiments, the composite matrix is $Zr_{0.55}Gd_{0.45}B_{12}$. In some embodiments, the composite matrix is $Zr_{0.50}Gd_{0.50}B_{12}$. In some embodiments, the composite matrix is $Zr_{0.45}Gd_{0.55}B_{12}$. In some embodiments, the composite matrix is $Zr_{0.40}Gd_{0.60}B_{12}$. In some embodiments, the composite matrix is $Zr_{0.35}Gd_{0.65}B_{12}$. In some embodiments, the composite matrix is $Zr_{0.30}Gd_{0.70}B_{12}$. In some embodiments, the composite matrix is $Zr_{0.25}Gd_{0.75}B_{12}$. In some embodiments, the composite matrix is $Zr_{0.20}Gd_{0.80}B_{12}$. In some embodiments, the composite matrix is $Zr_{0.15}Gd_{0.03}{12}$. In some embodiments, the composite matrix is $Zr_{0.10}Gd_{0.90}B_{12}$. In some embodiments, the composite matrix is $Zr_{0.05}Gd_{0.95}B_{12}$.

In some embodiments, the composite matrix is $Y_{0.95}Gd_{0.05}B_{12}$. In some embodiments, the composite matrix is $Y_{0.90}Gd_{0.10}B_{12}$. In some embodiments, the composite matrix is $Y_{0.85}Gd_{0.15}B_{12}$. In some embodiments, the composite matrix is $Y_{0.80}Gd_{0.20}B_{12}$. In some embodiments, the composite matrix is $Y_{0.75}Gd_{0.25}B_{12}$. In some embodiments, the composite matrix is $Y_{0.70}Gd_{0.30}B_{12}$. In some embodiments, the composite matrix is $Y_{0.65}Gd_{0.35}B_{12}$. In some embodiments, the composite matrix is $Y_{0.60}Gd_{0.40}B_{12}$. In some embodiments, the composite matrix is $Y_{0.55}Gd_{0.45}B_{12}$. In some embodiments, the composite matrix is $Y_{0.50}Gd_{0.50}B_{12}$. In some embodiments, the composite matrix is $Y_{0.45}Gd_{0.55}B_{12}$. In some embodiments, the composite matrix is $Y_{0.40}Gd_{0.60}B_{12}$. In some embodiments, the composite matrix is $Y_{0.35}Gd_{0.65}B_{12}$. In some embodiments, the composite matrix is $Y_{0.30}Gd_{0.70}B_{12}$. In some embodiments, the composite matrix is $Y_{0.25}Gd_{0.75}B_{12}$. In some embodiments, the composite matrix is $Y_{0.20}Gd_{0.0312}$. In some embodiments, the composite matrix is $Y_{0.15}Gd_{0.85}B_{12}$. In some embodiments, the composite matrix is $Y_{0.10}Gd_{0.90}B_{12}$. In some embodiments, the composite matrix is $Y_{0.05}Gd_{0.95}B_{12}$.

In some embodiments, the composite matrix is $Sc_{0.95}Gd_{0.05}B_{12}$. In some embodiments, the composite matrix is $Sc_{0.90}Gd_{0.10}B_{12}$. In some embodiments, the composite matrix is $Sc_{0.85}Gd_{0.15}B_{12}$. In some embodiments, the composite matrix is $Sc_{0.80}Gd_{0.20}B_{12}$. In some embodiments, the composite matrix is $Sc_{0.75}Gd_{0.25}B_{12}$. In some embodiments, the composite matrix is $Sc_{0.70}Gd_{0.30}B_{12}$. In some embodiments, the composite matrix is $Sc_{0.65}Gd_{0.35}B_{12}$. In some embodiments, the composite matrix is $Sc_{0.60}Gd_{0.40}B_{12}$. In some embodiments, the composite matrix is $Sc_{0.55}Gd_{0.45}B_{12}$. In some embodiments, the composite matrix is $Sc_{0.50}Gd_{0.50}B_{12}$. In some embodiments, the composite matrix is $Sc_{0.45}Gd_{0.55}B_{12}$. In some embodiments, the composite matrix is $Sc_{0.40}Gd_{0.60}B_{12}$. In some embodiments, the composite matrix is $Sc_{0.35}Gd_{0.65}B_{12}$. In some embodiments, the composite matrix is $Sc_{0.30}Gd_{0.70}B_{12}$. In some embodiments, the composite matrix is $Sc_{0.25}Gd_{0.75}B_{12}$. In some embodiments, the composite matrix is $Sc_{0.20}Gd_{0.80}B_{12}$. In some embodiments, the composite matrix is $Sc_{0.15}Gd_{0.0312}$. In some embodiments, the composite matrix is $Sc_{0.10}Gd_{0.90}B_{12}$. In some embodiments, the composite matrix is $Sc_{0.05}Gd_{0.95}B_{12}$.

In some embodiments M is Sm, and x is at least 0.001 and less than 0.999. In some embodiments M is Sm, and x is at least 0.100 and less than 0.900. In some embodiments M is Sm, and x is at least 0.200 and less than 0.800. In some embodiments M is Sm, and x is at least 0.300 and less than 0.700. In some embodiments M is Sm, and x is at least 0.400 and less than 0.600.

In some embodiments, the composite matrix is $Zr_{0.95}Sm_{0.05}B_{12}$. In some embodiments, the composite matrix is $Zr_{0.90}Sm_{0.10}B_{12}$. In some embodiments, the composite matrix is $Zr_{0.85}Sm_{0.15}B_{12}$. In some embodiments, the composite matrix is $Zr_{0.80}Sm_{0.20}B_{12}$. In some embodiments, the composite matrix is $Zr_{0.75}Sm_{0.25}B_{12}$. In some embodiments, the composite matrix is $Zr_{0.70}Sm_{0.30}B_{12}$. In some embodiments, the composite matrix is $Zr_{0.65}Sm_{0.35}B_{12}$. In some embodiments, the composite matrix is $Zr_{0.60}Sm_{0.40}B_{12}$. In some embodiments, the composite matrix is $Zr_{0.55}Sm_{0.45}B_{12}$. In some embodiments, the composite matrix is $Zr_{0.50}Sm_{0.50}B_{12}$. In some embodiments, the composite matrix is $Zr_{0.45}Sm_{0.55}B_{12}$. In some embodiments, the composite matrix is $Zr_{0.40}Sm_{0.60}B_{12}$. In some embodiments, the composite matrix is $Zr_{0.35}Sm_{0.65}B_{12}$. In some embodiments, the composite matrix is $Zr_{0.30}Sm_{0.70}B_{12}$. In some embodiments, the composite matrix is $Zr_{0.25}Sm_{0.75}B_{12}$. In some embodiments, the composite matrix is $Zr_{0.20}Sm_{0.80}B_{12}$. In some embodiments, the composite matrix is $Zr_{0.15}Sm_{0.85}B_{12}$. In some embodiments, the composite matrix is $Zr_{0.10}Sm_{0.90}B_{12}$. In some embodiments, the composite matrix is $Zr_{0.05}Sm_{0.95}B_{12}$.

In some embodiments, the composite matrix is $Y_{0.95}Sm_{0.05}B_{12}$. In some embodiments, the composite matrix is $Y_{0.90}Sm_{0.10}B_{12}$. In some embodiments, the composite matrix is $Y_{0.85}Sm_{0.15}B_{12}$. In some embodiments, the composite matrix is $Y_{0.80}Sm_{0.20}B_{12}$. In some embodiments, the composite matrix is $Y_{0.75}Sm_{0.25}B_{12}$. In some embodiments, the composite matrix is $Y_{0.70}Sm_{0.30}B_{12}$. In some embodiments, the composite matrix is $Y_{0.65}Sm_{0.35}B_{12}$. In some embodiments, the composite matrix is $Y_{0.60}Sm_{0.40}B_{12}$. In some embodiments, the composite matrix is $Y_{0.55}Sm_{0.45}B_{12}$. In some embodiments, the composite matrix is $Y_{0.50}Sm_{0.50}B_{12}$. In some embodiments, the composite matrix is $Y_{0.45}Sm_{0.55}B_{12}$. In some embodiments, the composite matrix is $Y_{0.40}Sm_{0.60}B_{12}$. In some embodiments, the composite matrix is $Y_{0.35}Sm_{0.65}B_{12}$. In some embodiments, the composite matrix is $Y_{0.30}Sm_{0.70}B_{12}$. In some embodiments, the composite matrix is $Y_{0.25}Sm_{0.75}B_{12}$. In some embodiments, the composite matrix is $Y_{0.20}Sm_{0.80}B_{12}$. In some embodiments, the composite matrix is $Y_{0.15}Sm_{0.85}B_{12}$. In some embodiments, the composite matrix is $Y_{0.10}Sm_{0.90}B_{12}$. In some embodiments, the composite matrix is $Y_{0.05}Sm_{0.95}B_{12}$.

In some embodiments, the composite matrix is $Sc_{0.95}Sm_{0.05}B_{12}$. In some embodiments, the composite matrix is $Sc_{0.90}Sm_{0.10}B_{12}$. In some embodiments, the composite matrix is $Sc_{0.85}Sm_{0.15}B_{12}$. In some embodiments, the composite matrix is $Sc_{0.80}Sm_{0.20}B_{12}$. In some embodiments, the composite matrix is $Sc_{0.75}Sm_{0.25}B_{12}$. In some embodiments, the composite matrix is $Sc_{0.70}Sm_{0.30}B_{12}$. In some embodiments, the composite matrix is $Sc_{0.65}Sm_{0.35}B_{12}$. In some embodiments, the composite matrix is $Sc_{0.60}Sm_{0.40}B_{12}$. In some embodiments, the composite matrix is $Sc_{0.55}Sm_{0.45}B_{12}$. In some embodiments, the composite matrix is $Sc_{0.50}Sm_{0.50}B_{12}$. In some embodiments, the composite matrix is $Sc_{0.45}Sm_{0.55}B_{12}$. In some embodiments, the composite matrix is $Sc_{0.40}Sm_{0.60}B_{12}$. In some embodiments, the composite matrix is $Sc_{0.35}Sm_{0.65}B_{12}$. In some embodiments, the composite matrix is $Sc_{0.30}Sm_{0.70}B_{12}$. In some embodiments, the composite matrix is $Sc_{0.25}Sm_{0.75}B_{12}$. In some embodiments, the composite matrix is $Sc_{0.20}Sm_{0.80}B_{12}$. In some embodiments, the composite matrix is $Sc_{0.15}Sm_{0.85}B_{12}$. In some embodiments, the composite matrix is $Sc_{0.10}Sm_{0.90}B_{12}$. In some embodiments, the composite matrix is $Sc_{0.05}Sm_{0.95}B_{12}$.

In some embodiments M is Nd, and x is at least 0.001 and less than 0.999. In some embodiments M is Nd, and x is at least 0.100 and less than 0.900. In some embodiments M is Nd, and x is at least 0.200 and less than 0.800. In some embodiments M is Nd, and x is at least 0.300 and less than 0.700. In some embodiments M is Nd, and x is at least 0.400 and less than 0.600.

In some embodiments, the composite matrix is $Zr_{0.95}Nd_{0.05}B_{12}$. In some embodiments, the composite matrix is $Zr_{0.90}Nd_{0.10}B_{12}$. In some embodiments, the composite matrix is $Zr_{0.85}Nd_{0.15}B_{12}$. In some embodiments, the composite matrix is $Zr_{0.80}Nd_{0.20}B_{12}$. In some embodiments, the composite matrix is $Zr_{0.75}Nd_{0.25}B_{12}$. In some embodiments, the composite matrix is $Zr_{0.70}Nd_{0.30}B_{12}$. In some embodiments, the composite matrix is $Zr_{0.65}Nd_{0.35}B_{12}$. In some embodiments, the composite matrix is $Zr_{0.60}Nd_{0.40}B_{12}$. In some embodiments, the composite matrix is $Zr_{0.55}Nd_{0.45}B_{12}$. In some embodiments, the composite matrix is $Zr_{0.50}Nd_{0.50}B_{12}$. In some embodiments, the composite matrix is $Zr_{0.45}Nd_{0.55}B_{12}$. In some embodiments, the composite matrix is $Zr_{0.40}Nd_{0.60}B_{12}$. In some embodiments, the composite matrix is $Zr_{0.35}Nd_{0.65}B_{12}$. In some embodiments, the composite matrix is $Zr_{0.30}Nd_{0.70}B_{12}$. In some embodiments, the composite matrix is $Zr_{0.25}Nd_{0.75}B_{12}$. In some embodiments, the composite matrix is $Zr_{0.20}Nd_{0.80}B_{12}$. In some embodiments, the composite matrix is $Zr_{0.15}Nd_{0.85}B_{12}$. In some embodiments, the composite matrix is $Zr_{0.10}Nd_{0.90}B_{12}$. In some embodiments, the composite matrix is $Zr_{0.05}Nd_{0.95}B_{12}$.

In some embodiments, the composite matrix is $Y_{0.95}Nd_{0.05}B_{12}$. In some embodiments, the composite matrix is $Y_{0.90}Nd_{0.10}B_{12}$. In some embodiments, the composite matrix is $Y_{0.85}Nd_{0.15}B_{12}$. In some embodiments, the composite matrix is $Y_{0.80}Nd_{0.20}B_{12}$. In some embodiments, the composite matrix is $Y_{0.75}Nd_{0.25}B_{12}$. In some embodiments, the composite matrix is $Y_{0.70}Nd_{0.30}B_{12}$. In some embodiments, the composite matrix is $Y_{0.65}Nd_{0.35}B_{12}$. In some embodiments, the composite matrix is $Y_{0.60}Nd_{0.40}B_{12}$. In some embodiments, the composite matrix is $Y_{0.55}Nd_{0.45}B_{12}$. In some embodiments, the composite matrix is $Y_{0.50}Nd_{0.50}B_{12}$. In some embodiments, the composite matrix is $Y_{0.45}Nd_{0.55}B_{12}$. In some embodiments, the composite matrix is $Y_{0.40}Nd_{0.60}B_{12}$. In some embodiments, the composite matrix is $Y_{0.35}Nd_{0.65}B_{12}$. In some embodiments, the composite matrix is $Y_{0.30}Nd_{0.70}B_{12}$. In some embodiments, the composite matrix is $Y_{0.25}Nd_{0.75}B_{12}$. In some embodiments, the composite matrix is $Y_{0.20}Nd_{0.0312}$. In some embodiments, the composite matrix is $Y_{0.15}Nd_{0.85}B_{12}$. In some embodiments, the composite matrix is $Y_{0.10}Nd_{0.90}B_{12}$. In some embodiments, the composite matrix is $Y_{0.05}Nd_{0.95}B_{12}$.

In some embodiments, the composite matrix is $Sc_{0.95}Nd_{0.05}B_{12}$. In some embodiments, the composite matrix is $Sc_{0.90}Nd_{0.10}B_{12}$. In some embodiments, the composite matrix is $Sc_{0.85}Nd_{0.15}B_{12}$. In some embodiments, the composite matrix is $Sc_{0.80}Nd_{0.20}B_{12}$. In some embodiments, the composite matrix is $Sc_{0.75}Nd_{0.25}B_{12}$. In some embodiments, the composite matrix is $Sc_{0.70}Nd_{0.30}B_{12}$. In some embodiments, the composite matrix is $Sc_{0.65}Nd_{0.35}B_{12}$. In some embodiments, the composite matrix is $Sc_{0.60}Nd_{0.40}B_{12}$. In some embodiments, the composite matrix is $Sc_{0.55}Nd_{0.45}B_{12}$. In some embodiments, the composite matrix is $Sc_{0.50}Nd_{0.50}B_{12}$. In some embodiments, the composite matrix is $Sc_{0.45}Nd_{0.55}B_{12}$. In some embodiments, the composite matrix is $Sc_{0.40}Nd_{0.60}B_{12}$. In some embodiments, the composite matrix is $Sc_{0.35}Nd_{0.65}B_{12}$. In some embodiments, the composite matrix is $Sc_{0.30}Nd_{0.70}B_{12}$. In some embodiments, the composite matrix is $Sc_{0.25}Nd_{0.75}B_{12}$. In some embodiments, the composite matrix is $Sc_{0.20}Nd_{0.80}B_{12}$. In some embodiments, the composite matrix is $Sc_{0.15}Nd_{0.85}B_{12}$. In some embodiments, the composite matrix is $Sc_{0.10}Nd_{0.90}B_{12}$. In some embodiments, the composite matrix is $Sc_{0.05}Nd_{0.95}B_{12}$.

In some embodiments M is Pr, and x is at least 0.001 and less than 0.999. In some embodiments M is Pr, and x is at least 0.100 and less than 0.900. In some embodiments M is Pr, and x is at least 0.200 and less than 0.800. In some embodiments M is Pr, and x is at least 0.300 and less than 0.700. In some embodiments M is Pr, and x is at least 0.400 and less than 0.600.

In some embodiments, the composite matrix is $Zr_{0.95}Pr_{0.05}B_{12}$. In some embodiments, the composite matrix is $Zr_{0.90}Pr_{0.10}B_{12}$. In some embodiments, the composite matrix is $Zr_{0.85}Pr_{0.15}B_{12}$. In some embodiments, the composite matrix is $Zr_{0.80}Pr_{0.20}B_{12}$. In some embodiments, the composite matrix is $Zr_{0.75}Pr_{0.25}B_{12}$. In some embodiments, the composite matrix is $Zr_{0.70}Pr_{0.30}B_{12}$. In some embodiments, the composite matrix is $Zr_{0.65}Pr_{0.35}B_{12}$. In some embodiments, the composite matrix is $Zr_{0.60}Pr_{0.40}B_{12}$. In some embodiments, the composite matrix is $Zr_{0.55}Pr_{0.45}B_{12}$. In some embodiments, the composite matrix is $Zr_{0.50}Pr_{0.50}B_{12}$. In some embodiments, the composite matrix is $Zr_{0.45}Pr_{0.55}B_{12}$. In some embodiments, the composite matrix is $Zr_{0.40}Pr_{0.60}B_{12}$. In some embodiments, the composite matrix is $Zr_{0.35}Pr_{0.65}B_{12}$. In some embodiments, the composite matrix is $Zr_{0.30}Pr_{0.70}B_{12}$. In some embodiments, the composite matrix is $Zr_{0.25}Pr_{0.75}B_{12}$. In some embodiments, the composite matrix is $Zr_{0.20}Pr_{0.80}B_{12}$. In some embodiments, the composite matrix is $Zr_{0.15}Pr_{0.85}B_{12}$. In some embodiments, the composite matrix is $Zr_{0.10}Pr_{0.90}B_{12}$. In some embodiments, the composite matrix is $Zr_{0.05}Pr_{0.95}B_{12}$.

In some embodiments, the composite matrix is $Y_{0.95}Pr_{0.05}B_{12}$. In some embodiments, the composite matrix is $Y_{0.90}Pr_{0.10}B_{12}$. In some embodiments, the composite matrix is $Y_{0.85}Pr_{0.15}B_{12}$. In some embodiments, the composite matrix is $Y_{0.80}Pr_{0.20}B_{12}$. In some embodiments, the composite matrix is $Y_{0.75}Pr_{0.25}B_{12}$. In some embodiments, the composite matrix is $Y_{0.70}Pr_{0.30}B_{12}$. In some embodiments, the composite matrix is $Y_{0.65}Pr_{0.35}B_{12}$. In some embodiments, the composite matrix is $Y_{0.60}Pr_{0.40}B_{12}$. In some embodiments, the composite matrix is $Y_{0.55}Pr_{0.45}B_{12}$. In some embodiments, the composite matrix is $Y_{0.50}Pr_{0.50}B_{12}$. In some embodiments, the composite matrix is $Y_{0.45}Pr_{0.55}B_{12}$. In some embodiments, the composite matrix is $Y_{0.40}Pr_{0.60}B_{12}$. In some embodiments, the composite matrix is $Y_{0.35}Pr_{0.65}B_{12}$. In some embodiments, the composite matrix is $Y_{0.30}Pr_{0.70}B_{12}$. In some embodiments, the composite matrix is $Y_{0.25}Pr_{0.75}B_{12}$. In some embodiments, the composite matrix is $Y_{0.20}Pr_{0.80}B_{12}$. In some embodiments, the composite matrix is $Y_{0.15}Pr_{0.03}B_{12}$. In some embodiments, the composite matrix is $Y_{0.10}Pr_{0.90}B_{12}$. In some embodiments, the composite matrix is $Y_{0.05}Pr_{0.95}B_{12}$.

In some embodiments, the composite matrix is $Sc_{0.95}Pr_{0.05}B_{12}$. In some embodiments, the composite matrix is $Sc_{0.90}Pr_{0.10}B_{12}$. In some embodiments, the composite matrix is $Sc_{0.85}Pr_{0.15}B_{12}$. In some embodiments, the composite matrix is $Sc_{0.80}Pr_{0.20}B_{12}$. In some embodiments, the composite matrix is $Sc_{0.75}Pr_{0.25}B_{12}$. In some embodiments, the composite matrix is $Sc_{0.70}Pr_{0.30}B_{12}$. In some embodiments, the composite matrix is $Sc_{0.65}Pr_{0.35}B_{12}$. In some embodiments, the composite matrix is $Sc_{0.60}Pr_{0.40}B_{12}$. In some embodiments, the composite matrix is $Sc_{0.55}Pr_{0.45}B_{12}$. In some embodiments, the composite matrix is $Sc_{0.50}Pr_{0.50}B_{12}$. In some embodiments, the composite matrix is $Sc_{0.45}Pr_{0.55}B_{12}$. In some embodiments, the composite matrix is $Sc_{0.40}Pr_{0.60}B_{12}$. In some embodiments, the composite matrix is $Sc_{0.35}Pr_{0.65}B_{12}$. In some embodiments, the composite matrix is $Sc_{0.30}Pr_{0.70}B_{12}$. In some embodiments, the composite matrix is $Sc_{0.25}Pr_{0.75}B_{12}$. In some embodiments, the composite matrix is $Sc_{0.20}Pr_{0.0312}$. In some embodiments, the composite matrix is $Sc_{0.15}Pr_{0.85}B_{12}$. In some embodiments, the composite matrix is $Sc_{0.10}Pr_{0.90}B_{12}$. In some embodiments, the composite matrix is $Sc_{0.05}Pr_{0.95}B_{12}$.

In some embodiments, the composite matrix is $Zr_{1-x}Tb_xB_{12}$, $Y_{1-x}Tb_xB_{12}$, $Sc_{1-x}Tb_xB_{12}$, $Zr_{1-x}Dy_xB_{12}$, $Y_{1-x}Dy_xB_{12}$, $Sc_{1-x}Dy_xB_{12}$, $Zr_{1-x}Ho_xB_{12}$, $Y_{1-x}Ho_xB_{12}$, $Sc_{1-x}Ho_xB_{12}$, $Zr_{1-x}Er_xB_{12}$, $Y_{1-x}Er_xB_{12}$, $Sc_{1-x}Er_xB_{12}$, $Zr_{1-x}Tm_xB_{12}$, $Y_{1-x}Tm_xB_{12}$, $Sc_{1-x}Tm_xB_{12}$, $Zr_{1-x}Yb_xB_{12}$, $Y_{1-x}Yb_xB_{12}$, $Sc_{1-x}Yb_xB_{12}$, $Zr_{1-x}Lu_xB_{12}$, $Y_{1-x}Lu_xB_{12}$, or $Sc_{1-x}Lu_xB_{12}$.

In some embodiments M is Tb, and x is at least 0.001 and less than 0.999. In some embodiments M is Tb, and x is at least 0.100 and less than 0.900. In some embodiments M is Tb, and x is at least 0.200 and less than 0.800. In some embodiments M is Tb, and x is at least 0.300 and less than 0.700. In some embodiments M is Tb, and x is at least 0.400 and less than 0.600.

In some embodiments, the composite matrix is $Zr_{0.95}Tb_{0.05}B_{12}$. In some embodiments, the composite matrix is $Zr_{0.90}Tb_{0.10}B_{12}$. In some embodiments, the composite matrix is $Zr_{0.85}Tb_{0.15}B_{12}$. In some embodiments, the composite matrix is $Zr_{0.80}Tb_{0.20}B_{12}$. In some embodiments, the composite matrix is $Zr_{0.75}Tb_{0.25}B_{12}$. In some embodiments, the composite matrix is $Zr_{0.70}Tb_{0.30}B_{12}$. In some embodiments, the composite matrix is $Zr_{0.65}Tb_{0.35}B_{12}$. In some embodiments, the composite matrix is $Zr_{0.60}Tb_{0.40}B_{12}$. In some embodiments, the composite matrix is $Zr_{0.55}Tb_{0.45}B_{12}$. In some embodiments, the composite matrix is $Zr_{0.50}Tb_{0.50}B_{12}$. In some embodiments, the composite matrix is $Zr_{0.45}Tb_{0.55}B_{12}$. In some embodiments, the composite matrix is $Zr_{0.40}Tb_{0.60}B_{12}$. In some embodiments, the composite matrix is $Zr_{0.35}Tb_{0.65}B_{12}$. In some embodiments, the composite matrix is $Zr_{0.30}Tb_{0.70}B_{12}$. In some embodiments, the composite matrix is $Zr_{0.25}Tb_{0.75}B_{12}$. In some embodiments, the composite matrix is $Zr_{0.20}Tb_{0.80}B_{12}$. In some embodiments, the composite matrix is $Zr_{0.15}Tb_{0.85}B_{12}$. In some embodiments, the composite matrix is $Zr_{0.10}Tb_{0.90}B_{12}$. In some embodiments, the composite matrix is $Zr_{0.05}Tb_{0.95}B_{12}$.

In some embodiments, the composite matrix is $Y_{0.95}Tb_{0.05}B_{12}$. In some embodiments, the composite matrix is $Y_{0.90}Tb_{0.10}B_{12}$. In some embodiments, the composite matrix is $Y_{0.85}Tb_{0.15}B_{12}$. In some embodiments, the composite matrix is $Y_{0.80}Tb_{0.20}B_{12}$. In some embodiments, the composite matrix is $Y_{0.75}Tb_{0.25}B_{12}$. In some embodiments, the composite matrix is $Y_{0.70}Tb_{0.30}B_{12}$. In some embodiments, the composite matrix is $Y_{0.65}Tb_{0.35}B_{12}$. In some embodiments, the composite matrix is $Y_{0.60}Tb_{0.40}B_{12}$. In some embodiments, the composite matrix is $Y_{0.55}Tb_{0.45}B_{12}$. In some embodiments, the composite matrix is $Y_{0.50}Tb_{0.50}B_{12}$. In some embodiments, the composite matrix is $Y_{0.45}Tb_{0.55}B_{12}$. In some embodiments, the composite matrix is $Y_{0.40}Tb_{0.60}B_{12}$. In some embodiments, the composite matrix is $Y_{0.35}Tb_{0.65}B_{12}$. In some embodiments, the composite matrix is $Y_{0.30}Tb_{0.70}B_{12}$. In some embodiments, the composite matrix is $Y_{0.25}Tb_{0.75}B_{12}$. In some embodiments, the composite matrix is $Y_{0.20}Tb_{0.80}B_{12}$. In some embodiments, the composite matrix is $Y_{0.15}Tb_{0.85}B_{12}$. In some embodiments, the composite matrix is $Y_{0.10}Tb_{0.90}B_{12}$. In some embodiments, the composite matrix is $Y_{0.05}Tb_{0.95}B_{12}$.

In some embodiments, the composite matrix is $Sc_{0.95}Tb_{0.05}B_{12}$. In some embodiments, the composite matrix is $Sc_{0.90}Tb_{0.10}B_{12}$. In some embodiments, the composite matrix is $Sc_{0.85}Tb_{0.15}B_{12}$. In some embodiments, the composite matrix is $Sc_{0.80}Tb_{0.20}B_{12}$. In some embodiments, the composite matrix is $Sc_{0.75}Tb_{0.25}B_{12}$. In some embodiments, the composite matrix is $Sc_{0.70}Tb_{0.30}B_{12}$. In some embodiments, the composite matrix is $Sc_{0.65}Tb_{0.35}B_{12}$. In some embodiments, the composite matrix is $Sc_{0.60}Tb_{0.40}B_{12}$. In some embodiments, the composite matrix is $Sc_{0.55}Tb_{0.45}B_{12}$. In some embodiments, the composite matrix is $Sc_{0.50}Tb_{0.50}B_{12}$. In some embodiments, the composite matrix is $Sc_{0.45}Tb_{0.55}B_{12}$. In some embodiments, the composite matrix is $Sc_{0.40}Tb_{0.60}B_{12}$. In some embodiments, the composite matrix is $Sc_{0.35}Tb_{0.65}B_{12}$. In some embodiments, the composite matrix is $Sc_{0.30}Tb_{0.70}B_{12}$. In some embodiments, the composite matrix is $Sc_{0.25}Tb_{0.75}B_{12}$. In some embodiments, the composite matrix is $Sc_{0.20}Tb_{0.0312}$. In some embodiments, the composite matrix is $Sc_{0.15}Tb_{0.85}B_{12}$. In some embodiments, the composite matrix is $Sc_{0.10}Tb_{0.90}B_{12}$. In some embodiments, the composite matrix is $Sc_{0.05}Tb_{0.95}B_{12}$.

In some embodiments M is Dy, and x is at least 0.001 and less than 0.999. In some embodiments M is Dy, and x is at least 0.100 and less than 0.900. In some embodiments M is Dy, and x is at least 0.200 and less than 0.800. In some embodiments M is Dy, and x is at least 0.300 and less than 0.700. In some embodiments M is Dy, and x is at least 0.400 and less than 0.600.

In some embodiments, the composite matrix is $Zr_{0.95}Dy_{0.05}B_{12}$. In some embodiments, the composite matrix is $Zr_{0.90}Dy_{0.10}B_{12}$. In some embodiments, the composite matrix is $Zr_{0.85}Dy_{0.15}B_{12}$. In some embodiments, the composite matrix is $Zr_{0.80}Dy_{0.20}B_{12}$. In some embodiments, the composite matrix is $Zr_{0.75}Dy_{0.25}B_{12}$. In some embodiments, the composite matrix is $Zr_{0.70}Dy_{0.30}B_{12}$. In some embodiments, the composite matrix is $Zr_{0.65}Dy_{0.35}B_{12}$. In some embodiments, the composite matrix is $Zr_{0.60}Dy_{0.40}B_{12}$. In some embodiments, the composite matrix is $Zr_{0.55}Dy_{0.45}B_{12}$. In some embodiments, the composite matrix is $Zr_{0.50}Dy_{0.50}B_{12}$. In some embodiments, the composite matrix is $Zr_{0.45}Dy_{0.55}B_{12}$. In some embodiments, the composite matrix is $Zr_{0.40}Dy_{0.60}B_{12}$. In some embodiments, the composite matrix is $Zr_{0.35}Dy_{0.65}B_{12}$. In some embodiments, the composite matrix is $Zr_{0.30}Dy_{0.70}B_{12}$. In some embodiments, the composite matrix is $Zr_{0.25}Dy_{0.75}B_{12}$. In some embodiments, the composite matrix is $Zr_{0.20}Dy_{0.80}B_{12}$. In some embodiments, the composite matrix is $Zr_{0.15}Dy_{0.0312}$. In some embodiments, the composite matrix is $Zr_{0.10}Dy_{0.90}B_{12}$. In some embodiments, the composite matrix is $Zr_{0.05}Dy_{0.95}B_{12}$.

In some embodiments, the composite matrix is $Y_{0.95}Dy_{0.05}B_{12}$. In some embodiments, the composite matrix is $Y_{0.90}Dy_{0.10}B_{12}$. In some embodiments, the composite matrix is $Y_{0.85}Dy_{0.15}B_{12}$. In some embodiments, the composite matrix is $Y_{0.80}Dy_{0.20}B_{12}$. In some embodiments, the composite matrix is $Y_{0.75}Dy_{0.25}B_{12}$. In some embodiments, the composite matrix is $Y_{0.70}Dy_{0.30}B_{12}$. In some embodiments, the composite matrix is $Y_{0.65}Dy_{0.35}B_{12}$. In some embodiments, the composite matrix is $Y_{0.60}Dy_{0.40}B_{12}$. In some embodiments, the composite matrix is $Y_{0.55}Dy_{0.45}B_{12}$. In some embodiments, the composite matrix is $Y_{0.50}Dy_{0.50}B_{12}$. In some embodiments, the composite matrix is $Y_{0.45}Dy_{0.55}B_{12}$. In some embodiments, the composite matrix is $Y_{0.40}Dy_{0.60}B_{12}$. In some embodiments, the composite matrix is $Y_{0.35}Dy_{0.65}B_{12}$. In some embodiments, the composite matrix is $Y_{0.30}Dy_{0.70}B_{12}$. In some embodiments, the composite matrix is $Y_{0.25}Dy_{0.75}B_{12}$. In some embodiments, the composite matrix is $Y_{0.20}Dy_{0.0312}$. In some embodiments, the composite matrix is $Y_{0.15}Dy_{0.85}B_{12}$. In some embodiments, the composite matrix is $Y_{0.10}Dy_{0.90}B_{12}$. In some embodiments, the composite matrix is $Y_{0.05}Dy_{0.95}B_{12}$.

In some embodiments, the composite matrix is $Sc_{0.95}Dy_{0.05}B_{12}$. In some embodiments, the composite matrix is $Sc_{0.90}Dy_{0.10}B_{12}$. In some embodiments, the composite matrix is $Sc_{0.85}Dy_{0.15}B_{12}$. In some embodiments, the composite matrix is $Sc_{0.80}Dy_{0.20}B_{12}$. In some embodiments, the composite matrix is $Sc_{0.75}Dy_{0.25}B_{12}$. In some embodiments, the composite matrix is $Sc_{0.70}Dy_{0.30}B_{12}$. In some embodiments, the composite matrix is $Sc_{0.65}Dy_{0.35}B_{12}$. In some embodiments, the composite matrix is $Sc_{0.60}Dy_{0.40}B_{12}$. In some embodiments, the composite matrix is $Sc_{0.55}Dy_{0.45}B_{12}$. In some embodiments, the composite matrix is $Sc_{0.50}Dy_{0.50}B_{12}$. In some embodiments, the composite matrix is $Sc_{0.45}Dy_{0.55}B_{12}$. In some embodiments, the composite matrix is $Sc_{0.40}Dy_{0.60}B_{12}$. In some embodiments, the composite matrix is $Sc_{0.35}Dy_{0.65}B_{12}$. In some embodiments, the composite matrix is $Sc_{0.30}Dy_{0.70}B_{12}$. In some embodiments, the composite matrix is $Sc_{0.25}Dy_{0.75}B_{12}$. In some embodiments, the composite matrix is $Sc_{0.20}Dy_{0.0312}$. In some embodiments, the composite matrix is $Sc_{0.15}Dy_{0.03}B_{12}$. In some embodiments, the composite matrix is $Sc_{0.10}Dy_{0.90}B_{12}$. In some embodiments, the composite matrix is $Sc_{0.05}Dy_{0.95}B_{12}$.

In some embodiments M is Ho, and x is at least 0.001 and less than 0.999. In some embodiments M is Ho, and x is at least 0.100 and less than 0.900. In some embodiments M is Ho, and x is at least 0.200 and less than 0.800. In some embodiments M is Ho, and x is at least 0.300 and less than 0.700. In some embodiments M is Ho, and x is at least 0.400 and less than 0.600.

In some embodiments, the composite matrix is $Zr_{0.95}Ho_{0.05}B_{12}$. In some embodiments, the composite matrix is $Zr_{0.90}Ho_{0.10}B_{12}$. In some embodiments, the composite matrix is $Zr_{0.85}Ho_{0.15}B_{12}$. In some embodiments, the composite matrix is $Zr_{0.80}Ho_{0.20}B_{12}$. In some embodiments, the composite matrix is $Zr_{0.75}Ho_{0.25}B_{12}$. In some embodiments, the composite matrix is $Zr_{0.70}Ho_{0.30}B_{12}$. In some embodiments, the composite matrix is $Zr_{0.65}Ho_{0.35}B_{12}$. In some embodiments, the composite matrix is $Zr_{0.60}Ho_{0.40}B_{12}$. In some embodiments, the composite matrix is $Zr_{0.55}Ho_{0.45}B_{12}$. In some embodiments, the composite matrix is $Zr_{0.50}Ho_{0.50}B_{12}$. In some embodiments, the composite matrix is $Zr_{0.45}Ho_{0.55}B_{12}$. In some embodiments, the composite matrix is $Zr_{0.40}Ho_{0.60}B_{12}$. In some embodiments, the composite matrix is $Zr_{0.35}Ho_{0.65}B_{12}$. In some embodiments, the composite matrix is $Zr_{0.30}Ho_{0.70}B_{12}$. In some embodiments, the composite matrix is $Zr_{0.25}Ho_{0.75}B_{12}$. In some embodiments, the composite matrix is $Zr_{0.20}Ho_{0.80}B_{12}$. In some embodiments, the composite matrix is $Zr_{0.15}Ho_{0.85}B_{12}$. In some embodiments, the composite matrix is $Zr_{0.10}Ho_{0.90}B_{12}$. In some embodiments, the composite matrix is $Zr_{0.05}Ho_{0.95}B_{12}$.

In some embodiments, the composite matrix is $Y_{0.95}Ho_{0.05}B_{12}$. In some embodiments, the composite matrix is $Y_{0.90}Ho_{0.10}B_{12}$. In some embodiments, the composite matrix is $Y_{0.85}Ho_{0.15}B_{12}$. In some embodiments, the composite matrix is $Y_{0.80}Ho_{0.20}B_{12}$. In some embodiments, the composite matrix is $Y_{0.75}Ho_{0.25}B_{12}$. In some embodiments, the composite matrix is $Y_{0.70}Ho_{0.30}B_{12}$. In some embodiments, the composite matrix is $Y_{0.65}Ho_{0.35}B_{12}$. In some embodiments, the composite matrix is $Y_{0.60}Ho_{0.40}B_{12}$. In some embodiments, the composite matrix is $Y_{0.55}Ho_{0.45}B_{12}$. In some embodiments, the composite matrix is $Y_{0.50}Ho_{0.50}B_{12}$. In some embodiments, the composite matrix is $Y_{0.45}Ho_{0.55}B_{12}$. In some embodiments, the composite matrix is $Y_{0.40}Ho_{0.60}B_{12}$. In some embodiments, the composite matrix is $Y_{0.35}Ho_{0.65}B_{12}$. In some embodiments, the composite matrix is $Y_{0.30}Ho_{0.70}B_{12}$. In some embodiments, the composite matrix is $Y_{0.25}Ho_{0.75}B_{12}$. In some embodiments, the composite matrix is $Y_{0.20}Ho_{0.0312}$. In some embodiments, the composite matrix is $Y_{0.15}Ho_{0.85}B_{12}$. In some embodiments, the composite matrix is $Y_{0.10}Ho_{0.90}B_{12}$. In some embodiments, the composite matrix is $Y_{0.05}Ho_{0.95}B_{12}$.

In some embodiments, the composite matrix is $Sc_{0.95}Ho_{0.05}B_{12}$. In some embodiments, the composite matrix is $Sc_{0.90}Ho_{0.10}B_{12}$. In some embodiments, the composite matrix is $Sc_{0.85}Ho_{0.15}B_{12}$. In some embodiments, the composite matrix is $Sc_{0.80}Ho_{0.20}B_{12}$. In some embodiments, the composite matrix is $Sc_{0.75}Ho_{0.25}B_{12}$. In some embodiments, the composite matrix is $Sc_{0.70}Ho_{0.30}B_{12}$. In some embodiments, the composite matrix is $Sc_{0.65}Ho_{0.35}B_{12}$. In some embodiments, the composite matrix is $Sc_{0.60}Ho_{0.40}B_{12}$. In some embodiments, the composite matrix is $Sc_{0.55}Ho_{0.45}B_{12}$. In some embodiments, the composite matrix is $Sc_{0.50}Ho_{0.50}B_{12}$. In some embodiments, the composite matrix is $Sc_{0.45}Ho_{0.55}B_{12}$. In some embodiments, the composite matrix is $Sc_{0.40}Ho_{0.60}B_{12}$. In some embodiments, the composite matrix is $Sc_{0.35}Ho_{0.65}B_{12}$. In some embodiments, the composite matrix is $Sc_{0.30}Ho_{0.70}B_{12}$. In some embodiments, the composite matrix is $Sc_{0.25}Ho_{0.75}B_{12}$. In some embodiments, the composite matrix is $Sc_{0.20}Ho_{0.80}B_{12}$. In some embodiments, the composite matrix is $Sc_{0.15}Ho_{0.0312}$. In some embodiments, the composite matrix is $Sc_{0.10}Ho_{0.90}B_{12}$. In some embodiments, the composite matrix is $Sc_{0.05}Ho_{0.95}B_{12}$.

In some embodiments M is Er, and x is at least 0.001 and less than 0.999. In some embodiments M is Er, and x is at least 0.100 and less than 0.900. In some embodiments M is Er, and x is at least 0.200 and less than 0.800. In some embodiments M is Er, and x is at least 0.300 and less than 0.700. In some embodiments M is Er, and x is at least 0.400 and less than 0.600.

In some embodiments, the composite matrix is $Zr_{0.95}Er_{0.05}B_{12}$. In some embodiments, the composite matrix is $Zr_{0.90}Er_{0.10}B_{12}$. In some embodiments, the composite matrix is $Zr_{0.85}Er_{0.15}B_{12}$. In some embodiments, the composite matrix is $Zr_{0.80}Er_{0.20}B_{12}$. In some embodiments, the composite matrix is $Zr_{0.75}Er_{0.25}B_{12}$. In some embodiments, the composite matrix is $Zr_{0.70}Er_{0.30}B_{12}$. In some embodiments, the composite matrix is $Zr_{0.65}Er_{0.35}B_{12}$. In some embodiments, the composite matrix is $Zr_{0.60}Er_{0.40}B_{12}$. In some embodiments, the composite matrix is $Zr_{0.55}Er_{0.45}B_{12}$. In some embodiments, the composite matrix is $Zr_{0.50}Er_{0.50}B_{12}$. In some embodiments, the composite matrix is $Zr_{0.45}Er_{0.55}B_{12}$. In some embodiments, the composite matrix is $Zr_{0.40}Er_{0.60}B_{12}$. In some embodiments, the composite matrix is $Zr_{0.35}Er_{0.65}B_{12}$. In some embodiments, the composite matrix is $Zr_{0.30}Er_{0.70}B_{12}$. In some embodiments, the composite matrix is $Zr_{0.25}Er_{0.75}B_{12}$. In some embodiments, the composite matrix is $Zr_{0.20}Er_{0.80}B_{12}$. In some embodiments, the composite matrix is $Zr_{0.15}Er_{0.85}B_{12}$. In some embodiments, the composite matrix is $Zr_{0.10}Er_{0.90}B_{12}$. In some embodiments, the composite matrix is $Zr_{0.05}Er_{0.95}B_{12}$.

In some embodiments, the composite matrix is $Y_{0.95}Er_{0.05}B_{12}$. In some embodiments, the composite matrix is $Y_{0.90}Er_{0.10}B_{12}$. In some embodiments, the composite matrix is $Y_{0.85}Er_{0.15}B_{12}$. In some embodiments, the composite matrix is $Y_{0.80}Er_{0.20}B_{12}$. In some embodiments, the composite matrix is $Y_{0.75}Er_{0.25}B_{12}$. In some embodiments, the composite matrix is $Y_{0.70}Er_{0.30}B_{12}$. In some embodiments, the composite matrix is $Y_{0.65}Er_{0.35}B_{12}$. In some embodiments, the composite matrix is $Y_{0.60}Er_{0.40}B_{12}$. In some embodiments, the composite matrix is $Y_{0.55}Er_{0.45}B_{12}$. In some embodiments, the composite matrix is $Y_{0.50}Er_{0.50}B_{12}$. In some embodiments, the composite matrix is $Y_{0.45}Er_{0.55}B_{12}$. In some embodiments, the composite matrix is $Y_{0.40}Er_{0.60}B_{12}$. In some embodiments, the composite matrix is $Y_{0.35}Er_{0.65}B_{12}$. In some embodiments, the composite matrix is $Y_{0.30}Er_{0.70}B_{12}$. In some embodiments, the composite matrix is $Y_{0.25}Er_{0.75}B_{12}$. In some embodiments, the composite matrix is $Y_{0.20}Er_{0.80}B_{12}$. In some embodiments, the composite matrix is $Y_{0.15}Er_{0.85}B_{12}$. In some embodiments, the composite matrix is $Y_{0.10}Er_{0.90}B_{12}$. In some embodiments, the composite matrix is $Y_{0.05}Er_{0.95}B_{12}$.

In some embodiments, the composite matrix is $Sc_{0.95}Er_{0.05}B_{12}$. In some embodiments, the composite matrix is $Sc_{0.90}Er_{0.10}B_{12}$. In some embodiments, the composite matrix is $Sc_{0.85}Er_{0.15}B_{12}$. In some embodiments, the composite matrix is $Sc_{0.80}Er_{0.20}B_{12}$. In some embodiments, the composite matrix is $Sc_{0.75}Er_{0.25}B_{12}$. In some embodiments, the composite matrix is $Sc_{0.70}Er_{0.30}B_{12}$. In some embodiments, the composite matrix is $Sc_{0.65}Er_{0.35}B_{12}$. In some embodiments, the composite matrix is $Sc_{0.60}Er_{0.40}B_{12}$. In some embodiments, the composite matrix is $Sc_{0.55}Er_{0.45}B_{12}$. In some embodiments, the composite matrix is $Sc_{0.50}Er_{0.50}B_{12}$. In some embodiments, the composite matrix is $Sc_{0.45}Er_{0.55}B_{12}$. In some embodiments, the composite matrix is $Sc_{0.40}Er_{0.60}B_{12}$. In some embodiments, the composite matrix is $Sc_{0.35}Er_{0.65}B_{12}$. In some embodiments, the composite matrix is $Sc_{0.30}Er_{0.70}B_{12}$. In some embodiments, the composite matrix is $Sc_{0.25}Er_{0.75}B_{12}$. In some embodiments, the composite matrix is $Sc_{0.20}Er_{0.03_{12}}$. In some embodiments, the composite matrix is $Sc_{0.15}Er_{0.85}B_{12}$. In some embodiments, the composite matrix is $Sc_{0.10}Er_{0.90}B_{12}$. In some embodiments, the composite matrix is $Sc_{0.05}Er_{0.95}B_{12}$.

In some embodiments M is Tm, and x is at least 0.001 and less than 0.999. In some embodiments M is Tm, and x is at least 0.100 and less than 0.900. In some embodiments M is Tm, and x is at least 0.200 and less than 0.800. In some embodiments M is Tm, and x is at least 0.300 and less than 0.700. In some embodiments M is Tm, and x is at least 0.400 and less than 0.600.

In some embodiments, the composite matrix is $Zr_{0.95}Tm_{0.05}B_{12}$. In some embodiments, the composite matrix is $Zr_{0.90}Tm_{0.10}B_{12}$. In some embodiments, the composite matrix is $Zr_{0.85}Tm_{0.15}B_{12}$. In some embodiments, the composite matrix is $Zr_{0.80}Tm_{0.20}B_{12}$. In some embodiments, the composite matrix is $Zr_{0.75}Tm_{0.25}B_{12}$. In some embodiments, the composite matrix is $Zr_{0.70}Tm_{0.30}B_{12}$. In some embodiments, the composite matrix is $Zr_{0.65}Tm_{0.35}B_{12}$. In some embodiments, the composite matrix is $Zr_{0.60}Tm_{0.40}B_{12}$. In some embodiments, the composite matrix is $Zr_{0.55}Tm_{0.45}B_{12}$. In some embodiments, the composite matrix is $Zr_{0.50}Tm_{0.50}B_{12}$. In some embodiments, the composite matrix is $Zr_{0.45}Tm_{0.55}B_{12}$. In some embodiments, the composite matrix is $Zr_{0.40}Tm_{0.60}B_{12}$. In some embodiments, the composite matrix is $Zr_{0.35}Tm_{0.65}B_{12}$. In some embodiments, the composite matrix is $Zr_{0.30}Tm_{0.70}B_{12}$. In some embodiments, the composite matrix is $Zr_{0.25}Tm_{0.75}B_{12}$. In some embodiments, the composite matrix is $Zr_{0.20}Tm_{0.80}B_{12}$. In some embodiments, the composite matrix is $Zr_{0.15}Tm_{0.03_{12}}$. In some embodiments, the composite matrix is $Zr_{0.10}Tm_{0.90}B_{12}$. In some embodiments, the composite matrix is $Zr_{0.05}Tm_{0.95}B_{12}$.

In some embodiments, the composite matrix is $Y_{0.95}Tm_{0.05}B_{12}$. In some embodiments, the composite matrix is $Y_{0.90}Tm_{0.10}B_{12}$. In some embodiments, the composite matrix is $Y_{0.85}Tm_{0.15}B_{12}$. In some embodiments, the composite matrix is $Y_{0.80}Tm_{0.20}B_{12}$. In some embodiments, the composite matrix is $Y_{0.75}Tm_{0.25}B_{12}$. In some embodiments, the composite matrix is $Y_{0.70}Tm_{0.30}B_{12}$. In some embodiments, the composite matrix is $Y_{0.65}Tm_{0.35}B_{12}$. In some embodiments, the composite matrix is $Y_{0.60}Tm_{0.40}B_{12}$. In some embodiments, the composite matrix is $Y_{0.55}Tm_{0.45}B_{12}$. In some embodiments, the composite matrix is $Y_{0.50}Tm_{0.50}B_{12}$. In some embodiments, the composite matrix is $Y_{0.45}Tm_{0.55}B_{12}$. In some embodiments, the composite matrix is $Y_{0.40}Tm_{0.60}B_{12}$. In some embodiments, the composite matrix is $Y_{0.35}Tm_{0.65}B_{12}$. In some embodiments, the composite matrix is $Y_{0.30}Tm_{0.70}B_{12}$. In some embodiments, the composite matrix is $Y_{0.25}Tm_{0.75}B_{12}$. In some embodiments, the composite matrix is $Y_{0.20}Tm_{0.80}B_{12}$. In some embodiments, the composite matrix is $Y_{0.15}Tm_{0.85}B_{12}$. In some embodiments, the composite matrix is $Y_{0.10}Tm_{0.90}B_{12}$. In some embodiments, the composite matrix is $Y_{0.05}Tm_{0.95}B_{12}$.

In some embodiments, the composite matrix is $Sc_{0.95}Tm_{0.05}B_{12}$. In some embodiments, the composite matrix is $Sc_{0.90}Tm_{0.10}B_{12}$. In some embodiments, the composite matrix is $Sc_{0.85}Tm_{0.15}B_{12}$. In some embodiments, the composite matrix is $Sc_{0.80}Tm_{0.20}B_{12}$. In some embodiments, the composite matrix is $Sc_{0.75}Tm_{0.25}B_{12}$. In some embodiments, the composite matrix is $Sc_{0.70}Tm_{0.30}B_{12}$. In some embodiments, the composite matrix is $Sc_{0.65}Tm_{0.35}B_{12}$. In some embodiments, the composite matrix is $Sc_{0.60}Tm_{0.40}B_{12}$. In some embodiments, the composite matrix is $Sc_{0.55}Tm_{0.45}B_{12}$. In some embodiments, the composite matrix is $Sc_{0.50}Tm_{0.50}B_{12}$. In some embodiments, the composite matrix is $Sc_{0.45}Tm_{0.55}B_{12}$. In some embodiments, the composite matrix is $Sc_{0.40}Tm_{0.60}B_{12}$. In some embodiments, the composite matrix is $Sc_{0.35}Tm_{0.65}B_{12}$. In some embodiments, the composite matrix is $Sc_{0.30}Tm_{0.70}B_{12}$. In some embodiments, the composite matrix is $Sc_{0.25}Tm_{0.75}B_{12}$. In some embodiments, the composite matrix is $Sc_{0.20}Tm_{0.03_{12}}$. In some embodiments, the composite matrix is $Sc_{0.15}Tm_{0.85}B_{12}$. In some embodiments, the composite matrix is $Sc_{0.10}Tm_{0.90}B_{12}$. In some embodiments, the composite matrix is $Sc_{0.05}Tm_{0.95}B_{12}$.

In some embodiments M is Yb, and x is at least 0.001 and less than 0.999. In some embodiments M is Yb, and x is at least 0.100 and less than 0.900. In some embodiments M is Yb, and x is at least 0.200 and less than 0.800. In some embodiments M is Yb, and x is at least 0.300 and less than 0.700. In some embodiments M is Yb, and x is at least 0.400 and less than 0.600.

In some embodiments, the composite matrix is $Zr_{0.95}Yb_{0.05}B_{12}$. In some embodiments, the composite matrix is $Zr_{0.90}Yb_{0.10}B_{12}$. In some embodiments, the composite matrix is $Zr_{0.85}Yb_{0.15}B_{12}$. In some embodiments, the composite matrix is $Zr_{0.80}Yb_{0.20}B_{12}$. In some embodiments, the composite matrix is $Zr_{0.75}Yb_{0.25}B_{12}$. In some embodiments, the composite matrix is $Zr_{0.70}Yb_{0.30}B_{12}$. In some embodiments, the composite matrix is $Zr_{0.65}Yb_{0.35}B_{12}$. In some embodiments, the composite matrix is $Zr_{0.60}Yb_{0.40}B_{12}$. In some embodiments, the composite matrix is $Zr_{0.55}Yb_{0.45}B_{12}$. In some embodiments, the composite matrix is $Zr_{0.50}Yb_{0.50}B_{12}$. In some embodiments, the composite matrix is $Zr_{0.45}Yb_{0.55}B_{12}$. In some embodiments, the composite matrix is $Zr_{0.40}Yb_{0.60}B_{12}$. In some embodiments, the composite matrix is $Zr_{0.35}Yb_{0.65}B_{12}$. In some embodiments, the composite matrix is $Zr_{0.30}Yb_{0.70}B_{12}$. In some embodiments, the composite matrix is $Zr_{0.25}Yb_{0.75}B_{12}$. In some embodiments, the composite matrix is $Zr_{0.20}Yb_{0.80}B_{12}$. In some embodiments, the composite matrix is $Zr_{0.15}Yb_{0.03_{12}}$. In some embodiments, the composite matrix is $Zr_{0.10}Yb_{0.90}B_{12}$. In some embodiments, the composite matrix is $Zr_{0.05}Yb_{0.95}B_{12}$.

In some embodiments, the composite matrix is $Y_{0.95}Yb_{0.05}B_{12}$. In some embodiments, the composite matrix is $Y_{0.90}Yb_{0.10}B_{12}$. In some embodiments, the composite matrix is $Y_{0.85}Yb_{0.15}B_{12}$. In some embodiments, the composite matrix is $Y_{0.80}Yb_{0.20}B_{12}$. In some embodiments, the composite matrix is $Y_{0.75}Yb_{0.25}B_{12}$. In some embodiments, the composite matrix is $Y_{0.70}Yb_{0.30}B_{12}$. In some embodiments, the composite matrix is $Y_{0.65}Yb_{0.35}B_{12}$. In some embodiments, the composite matrix is $Y_{0.60}Yb_{0.40}B_{12}$. In some embodiments, the composite matrix is $Y_{0.55}Yb_{0.45}B_{12}$. In some embodiments, the composite matrix is $Y_{0.50}Yb_{0.50}B_{12}$. In some embodiments, the composite matrix is $Y_{0.45}Yb_{0.55}B_{12}$. In some embodiments, the composite matrix is $Y_{0.40}Yb_{0.60}B_{12}$. In some embodiments, the composite matrix is $Y_{0.35}Yb_{0.65}B_{12}$. In some embodiments, the composite matrix is $Y_{0.30}Yb_{0.70}B_{12}$. In some embodiments, the composite matrix is $Y_{0.25}Yb_{0.75}B_{12}$. In some embodiments, the composite matrix is $Y_{0.20}Yb_{0.0312}$. In some embodiments, the composite matrix is $Y_{0.15}Yb_{0.85}B_{12}$. In some embodiments, the composite matrix is $Y_{0.10}Yb_{0.90}B_{12}$. In some embodiments, the composite matrix is $Y_{0.05}Yb_{0.95}B_{12}$.

In some embodiments, the composite matrix is $Sc_{0.95}Yb_{0.05}B_{12}$. In some embodiments, the composite matrix is $Sc_{0.90}Yb_{0.10}B_{2}$. In some embodiments, the composite matrix is $Sc_{0.85}Yb_{0.15}B_{12}$. In some embodiments, the composite matrix is $Sc_{0.80}Yb_{0.20}B_{12}$. In some embodiments, the composite matrix is $Sc_{0.75}Yb_{0.25}B_{12}$. In some embodiments, the composite matrix is $Sc_{0.70}Yb_{0.30}B_{12}$. In some embodiments, the composite matrix is $Sc_{0.65}Yb_{0.35}B_{12}$. In some embodiments, the composite matrix is $Sc_{0.60}Yb_{0.40}B_{12}$. In some embodiments, the composite matrix is $Sc_{0.55}Yb_{0.45}B_{12}$. In some embodiments, the composite matrix is $Sc_{0.50}Yb_{0.50}B_{12}$. In some embodiments, the composite matrix is $Sc_{0.45}Yb_{0.55}B_{12}$. In some embodiments, the composite matrix is $Sc_{0.40}Yb_{0.60}B_{12}$. In some embodiments, the composite matrix is $Sc_{0.35}Yb_{0.65}B_{12}$. In some embodiments, the composite matrix is $Sc_{0.30}Yb_{0.70}B_{12}$. In some embodiments, the composite matrix is $Sc_{0.25}Yb_{0.75}B_{12}$. In some embodiments, the composite matrix is $Sc_{0.20}Yb_{0.80}B_{12}$. In some embodiments, the composite matrix is $Sc_{0.15}Yb_{0.0312}$. In some embodiments, the composite matrix is $Sc_{0.10}Yb_{0.90}B_{12}$. In some embodiments, the composite matrix is $Sc_{0.05}Yb_{0.95}B_{12}$.

In some embodiments M is Lu, and x is at least 0.001 and less than 0.999. In some embodiments M is Lu, and x is at least 0.100 and less than 0.900. In some embodiments M is Lu, and x is at least 0.200 and less than 0.800. In some embodiments M is Lu, and x is at least 0.300 and less than 0.700. In some embodiments M is Lu, and x is at least 0.400 and less than 0.600.

In some embodiments, the composite matrix is $Zr_{0.95}Lu_{0.05}B_{12}$. In some embodiments, the composite matrix is $Zr_{0.90}Lu_{0.10}B_{12}$. In some embodiments, the composite matrix is $Zr_{0.85}Lu_{0.15}B_{12}$. In some embodiments, the composite matrix is $Zr_{0.80}Lu_{0.20}B_{12}$. In some embodiments, the composite matrix is $Zr_{0.75}Lu_{0.25}B_{12}$. In some embodiments, the composite matrix is $Zr_{0.70}Lu_{0.30}B_{12}$. In some embodiments, the composite matrix is $Zr_{0.65}Lu_{0.35}B_{12}$. In some embodiments, the composite matrix is $Zr_{0.60}Lu_{0.40}B_{12}$. In some embodiments, the composite matrix is $Zr_{0.55}Lu_{0.45}B_{12}$. In some embodiments, the composite matrix is $Zr_{0.50}Lu_{0.50}B_{12}$. In some embodiments, the composite matrix is $Zr_{0.45}Lu_{0.55}B_{12}$. In some embodiments, the composite matrix is $Zr_{0.40}Lu_{0.60}B_{12}$. In some embodiments, the composite matrix is $Zr_{0.35}Lu_{0.65}B_{12}$. In some embodiments, the composite matrix is $Zr_{0.30}Lu_{0.70}B_{12}$. In some embodiments, the composite matrix is $Zr_{0.25}Lu_{0.75}B_{12}$. In some embodiments, the composite matrix is $Zr_{0.20}Lu_{0.80}B_{12}$. In some embodiments, the composite matrix is $Zr_{0.15}Lu_{0.85}B_{12}$. In some embodiments, the composite matrix is $Zr_{0.10}Lu_{0.90}B_{12}$. In some embodiments, the composite matrix is $Zr_{0.05}Lu_{0.95}B_{12}$.

In some embodiments, the composite matrix is $Y_{0.95}Lu_{0.05}B_{12}$. In some embodiments, the composite matrix is $Y_{0.90}Lu_{0.10}B_{12}$. In some embodiments, the composite matrix is $Y_{0.85}Lu_{0.15}B_{12}$. In some embodiments, the composite matrix is $Y_{0.80}Lu_{0.20}B_{12}$. In some embodiments, the composite matrix is $Y_{0.75}Lu_{0.25}B_{12}$. In some embodiments, the composite matrix is $Y_{0.70}Lu_{0.30}B_{12}$. In some embodiments, the composite matrix is $Y_{0.65}Lu_{0.35}B_{12}$. In some embodiments, the composite matrix is $Y_{0.60}Lu_{0.40}B_{12}$. In some embodiments, the composite matrix is $Y_{0.55}Lu_{0.45}B_{12}$. In some embodiments, the composite matrix is $Y_{0.50}Lu_{0.50}B_{12}$. In some embodiments, the composite matrix is $Y_{0.45}Lu_{0.55}B_{12}$. In some embodiments, the composite matrix is $Y_{0.40}Lu_{0.60}B_{12}$. In some embodiments, the composite matrix is $Y_{0.35}Lu_{0.65}B_{12}$. In some embodiments, the composite matrix is $Y_{0.30}Lu_{0.70}B_{12}$. In some embodiments, the composite matrix is $Y_{0.25}Lu_{0.75}B_{12}$. In some embodiments, the composite matrix is $Y_{0.20}Lu_{0.80}B_{12}$. In some embodiments, the composite matrix is $Y_{0.15}Lu_{0.85}B_{12}$. In some embodiments, the composite matrix is $Y_{0.10}Lu_{0.90}B_{12}$. In some embodiments, the composite matrix is $Y_{0.05}Lu_{0.95}B_{12}$.

In some embodiments, the composite matrix is $Sc_{0.95}Lu_{0.05}B_{12}$. In some embodiments, the composite matrix is $Sc_{0.90}Lu_{0.10}B_{12}$. In some embodiments, the composite matrix is $Sc_{0.85}Lu_{0.15}B_{12}$. In some embodiments, the composite matrix is $Sc_{0.80}Lu_{0.20}B_{12}$. In some embodiments, the composite matrix is $Sc_{0.75}Lu_{0.25}B_{12}$. In some embodiments, the composite matrix is $Sc_{0.70}Lu_{0.30}B_{12}$. In some embodiments, the composite matrix is $Sc_{0.65}Lu_{0.35}B_{12}$. In some embodiments, the composite matrix is $Sc_{0.60}Lu_{0.40}B_{12}$. In some embodiments, the composite matrix is $Sc_{0.55}Lu_{0.45}B_{12}$. In some embodiments, the composite matrix is $Sc_{0.50}Lu_{0.50}B_{12}$. In some embodiments, the composite matrix is $Sc_{0.45}Lu_{0.55}B_{12}$. In some embodiments, the composite matrix is $Sc_{0.40}Lu_{0.60}B_{12}$. In some embodiments, the composite matrix is $Sc_{0.35}Lu_{0.65}B_{12}$. In some embodiments, the composite matrix is $Sc_{0.30}Lu_{0.70}B_{12}$. In some embodiments, the composite matrix is $Sc_{0.25}Lu_{0.75}B_{12}$. In some embodiments, the composite matrix is $Sc_{0.20}Lu_{0.80}B_{12}$. In some embodiments, the composite matrix is $Sc_{0.15}Lu_{0.85}B_{12}$. In some embodiments, the composite matrix is $Sc_{0.10}Lu_{0.90}B_{12}$. In some embodiments, the composite matrix is $Sc_{0.05}Lu_{0.95}B_{12}$.

In some embodiments, the hardness described herein is measured by a Vickers hardness test. In some embodiments, the hardness is measured under a load of 0.49 Newton (N).

In some embodiments, a composite matrix described herein has a hardness of about 10 to about 70 GPa. In some embodiments, a composite matrix described herein has a hardness of about 10 to about 60 GPa, about 10 to about 50 GPa, about 10 to about 40 GPa, about 10 to about 30 GPa, about 20 to about 70 GPa, about 20 to about 60 GPa, about 20 to about 50 GPa, about 20 to about 40 GPa, about 20 to about 30 GPa, about 30 to about 70 GPa, about 30 to about 60 GPa, about 30 to about 50 GPa, about 30 to about 45 GPa, about 30 to about 40 GPa, about 30 to about 35 GPa, about 35 to about 70 GPa, about 35 to about 60 GPa, about 35 to about 50 GPa, about 35 to about 40 GPa, about 40 to about 70 GPa, about 40 to about 60 GPa, about 40 to about 50 GPa, about 45 to about 60 GPa or about 45 to about 50 GPa. In some embodiments, a composite matrix described herein has a hardness of about 30 to about 50 GPa, about 30 to about 45 GPa, about 30 to about 40 GPa, about 30 to about 35 GPa, about 35 to about 50 GPa, about 35 to about 40 GPa, about 40 to about 50 GPa, or about 45 to about 50 GPa.

In some embodiments, a composite matrix described herein has a hardness of about 10 GPa, about 15 GPa, about 20 GPa, about 25 GPa, about 30 GPa, about 31 GPa, about 32 GPa, about 33 GPa, about 34 GPa, about 35 GPa, about 36 GPa, about 37 GPa, about 38 GPa, about 39 GPa, about 40 GPa, about 41 GPa, about 42 GPa, about 43 GPa, about 44 GPa, about 45 GPa, about 46 GPa, about 47 GPa, about 48 GPa, about 49 GPa, about 50 GPa, about 51 GPa, about 52 GPa, about 53 GPa, about 54 GPa, about 55 GPa, about 56 GPa, about 57 GPa, about 58 GPa, about 59 GPa, about 60 GPa or higher. In some embodiments, a composite matrix described herein has a hardness of about 10 GPa or higher. In some embodiments, a composite matrix described herein has a hardness of about 15 GPa or higher. In some embodiments, a composite matrix described herein has a hardness of about 20 GPa or higher. In some embodiments, a composite matrix described herein has a hardness of about 25 GPa or higher. In some embodiments, a composite matrix described herein has a hardness of about 30 GPa or higher. In some embodiments, a composite matrix described herein has a hardness of about 31 GPa or higher. In some embodiments, a composite matrix described herein has a hardness of about 32 GPa or higher. In some embodiments, a composite matrix described herein has a hardness of about 33 GPa or higher. In some embodiments, a composite matrix described herein has a hardness of about 34 GPa or higher. In some embodiments, a composite matrix described herein has a hardness of about 35 GPa or higher. In some embodiments, a composite matrix described herein has a hardness of about 36 GPa or higher. In some embodiments, a composite matrix described herein has a hardness of about 37 GPa or higher. In some embodiments, a composite matrix described herein has a hardness of about 38 GPa or higher. In some embodiments, a composite matrix described herein has a hardness of about 39 GPa or higher. In some embodiments, a composite matrix described herein has a hardness of about 40 GPa or higher. In some embodiments, a composite matrix described herein has a hardness of about 41 GPa or higher. In some embodiments, a composite matrix described herein has a hardness of about 42 GPa or higher. In some embodiments, a composite matrix described herein has a hardness of about 43 GPa or higher. In some embodiments, a composite matrix described herein has a hardness of about 44 GPa or higher. In some embodiments, a composite matrix described herein has a hardness of about 45 GPa or higher. In some embodiments, a composite matrix described herein has a hardness of about 46 GPa or higher. In some embodiments, a composite matrix described herein has a hardness of about 47 GPa or higher. In some embodiments, a composite matrix described herein has a hardness of about 48 GPa or higher. In some embodiments, a composite matrix described herein has a hardness of about 49 GPa or higher. In some embodiments, a composite matrix described herein has a hardness of about 50 GPa or higher. In some embodiments, a composite matrix described herein has a hardness of about 51 GPa or higher. In some embodiments, a composite matrix described herein has a hardness of about 52 GPa or higher. In some embodiments, a composite matrix described herein has a hardness of about 53 GPa or higher. In some embodiments, a composite matrix described herein has a hardness of about 54 GPa or higher. In some embodiments, a composite matrix described herein has a hardness of about 55 GPa or higher. In some embodiments, a composite matrix described herein has a hardness of about 56 GPa or higher. In some embodiments, a composite matrix described herein has a hardness of about 57 GPa or higher. In some embodiments, a composite matrix described herein has a hardness of about 58 GPa or higher. In some embodiments, a composite matrix described herein has a hardness of about 59 GPa or higher. In some embodiments, a composite matrix described herein has a hardness of about 60 GPa or higher.

In some embodiments, a composite matrix described herein has a hardness between 38.0 and 52.0 GPa.

In some embodiments, a composite matrix is $Zr_{1-x}Y_xB_{12}$ and has a hardness between 38.0 and 52.0 GPa. In some embodiments, a composite matrix is $Zr_{1-x}Y_xB_{12}$ and has a hardness between 40.0 and 50.0 GPa. In some embodiments, a composite matrix is $Zr_{1-x}Y_xB_{12}$ and has a hardness between 42.0 and 48.0 GPa. In some embodiments, a composite matrix is $Zr_{1-x}Y_xB_{12}$ and has a hardness between 44.0 and 48.0 GPa. In some embodiments, a composite matrix is $Zr_{1-x}Y_xB_{12}$ and has a hardness between 45.0 and 46.0 GPa.

In some embodiments, a composite matrix is $Zr_{1-x}Sc_xB_{12}$ and has a hardness between 38.0 and 52.0 GPa. In some embodiments, a composite matrix is $Zr_{1-x}Sc_xB_{12}$ and has a hardness between 45.0 and 51.0 GPa. In some embodiments, a composite matrix is $Zr_{1-x}Sc_xB_{12}$ and has a hardness between 46.0 and 50.0 GPa. In some embodiments, a composite matrix is $Zr_{1-x}Sc_xB_{12}$ and has a hardness between 47.0 and 49.0 GPa.

In some embodiments, a composite matrix is $Y_{1-x}Sc_xB_{12}$ and has a hardness between 38.0 and 52.0 GPa. In some embodiments, a composite matrix is $Y_{1-x}Sc_xB_{12}$ and has a hardness between 40.0 and 50.0 GPa. In some embodiments, a composite matrix is $Y_{1-x}Sc_xB_{12}$ and has a hardness between 42.0 and 48.0 GPa. In some embodiments, a composite matrix is $Y_{1-x}Sc_xB_{12}$ and has a hardness between 44.0 and 46.0 GPa.

In some embodiments, a composite matrix is $Zr_{1-x}Gd_xB_{12}$ and has a hardness between 38.0 and 52.0 GPa. In some embodiments, a composite matrix is $Zr_{1-x}Gd_xB_{12}$ and has a hardness between 38.0 and 45.0 GPa. In some embodiments, a composite matrix is $Zr_{1-x}Gd_xB_{12}$ and has a hardness between 39.0 and 44.0 GPa. In some embodiments, a composite matrix is $Zr_{1-x}Gd_xB_{12}$ and has a hardness between 40.0 and 44.0 GPa. In some embodiments, a composite matrix is $Zr_{1-x}Gd_xB_{12}$ and has a hardness between 41.0 and 43.0 GPa.

In some embodiments, a composite matrix described herein has a grain size of about 20 µm or less. In some embodiments, the composite matrix has a grain size of about 15 µm or less, about 12 µm or less, about 10 µm or less, about 8 µm or less, about 5 µm or less, about 2 µm or less or about 1 µm or less. In some embodiments, the composite matrix has a grain size of about 15 µm or less. In some embodiments, the composite matrix has a grain size of about 12 µm or less. In some embodiments, the composite matrix has a grain size of about 10 µm or less. In some embodiments, the composite matrix has a grain size of about 9 µm or less. In some embodiments, the composite matrix has a grain size of about 8 µm or less. In some embodiments, the composite matrix has a grain size of about 7 µm or less. In some embodiments, the composite matrix has a grain size of about 6 µm or less. In some embodiments, the composite matrix has a grain size of about 5 µm or less. In some embodiments, the composite matrix has a grain size of about 4 µm or less. In some embodiments, the composite matrix has a grain size of about 3 µm or less. In some embodiments, the composite matrix has a grain size of about 2 µm or less. In some embodiments, the composite matrix has a grain size of about 1 µm or less.

In some embodiments, the grain size is an averaged grain size. In some embodiments, a composite matrix described herein has an averaged grain size of about 20 µm or less. In some embodiments, the composite matrix has an averaged grain size of about 15 µm or less, about 12 µm or less, about 10 µm or less, about 8 µm or less, about 5 µm or less, about 2 μm or less or about 1 μm or less. In some embodiments, the composite matrix has an averaged grain size of about 15 μm or less. In some embodiments, the composite matrix has an averaged grain size of about 12 μm or less. In some embodiments, the composite matrix has an averaged grain size of about 10 μm or less. In some embodiments, the composite matrix has an averaged grain size of about 9 μm or less. In some embodiments, the composite matrix has an averaged grain size of about 8 μm or less. In some embodiments, the composite matrix has an averaged grain size of about 7 μm or less. In some embodiments, the composite matrix has an averaged grain size of about 6 μm or less. In some embodiments, the composite matrix has an averaged grain size of about 5 μm or less. In some embodiments, the composite matrix has an averaged grain size of about 4 μm or less. In some embodiments, the composite matrix has an averaged grain size of about 3 μm or less. In some embodiments, the composite matrix has an averaged grain size of about 2 μm or less. In some embodiments, the composite matrix has an averaged grain size of about 1 μm or less.

In some embodiments, a composite matrix described herein is a densified composite matrix. In some embodiments, a composite matrix described herein has a density of 10.0 g/cm$^3$ or less. In some embodiments, a composite matrix described herein has a density of 9.0 g/cm$^3$ or less. In some embodiments, a composite matrix described herein has a density of 8.0 g/cm$^3$ or less. In some embodiments, a composite matrix described herein has a density of 7.0 g/cm$^3$ or less. In some embodiments, a composite matrix described herein has a density of 6.0 g/cm$^3$ or less. In some embodiments, a composite matrix described herein has a density of 5.0 g/cm$^3$ or less. In some embodiments, a composite matrix described herein has a density of 4.0 g/cm$^3$ or less. In some embodiments, a composite matrix described herein has a density of 3.55 g/cm$^3$ or less. In some embodiments, a composite matrix described herein has a density of 3.0 g/cm$^3$ or less.

In some embodiments, a composite matrix described herein has a density of or between 0.1-10.0 g/cm$^3$. In some embodiments, a composite matrix described herein has a density of or between 1.0-9.0 g/cm$^3$. In some embodiments, a composite matrix described herein has a density of or between 1.0-8.0 g/cm$^3$. In some embodiments, a composite matrix described herein has a density of or between 1.0-7.0 g/cm$^3$. In some embodiments, a composite matrix described herein has a density of or between 2.0-6.0 g/cm$^3$. In some embodiments, a composite matrix described herein has a density of or between 2.0-5.0 g/cm$^3$. In some embodiments, a composite matrix described herein has a density of or between 2.5-4.5 g/cm$^3$. In some embodiments, a composite matrix described herein has a density of or between 3.0-4.0 g/cm$^3$.

In some embodiments, a composite matrix of $Zr_{1-x}Y_xB_{12}$ has a density of 6.0 g/cm$^3$ or less. In some embodiments, a composite matrix of $Zr_{1-x}Y_xB_{12}$ has a density of 5.0 g/cm$^3$ or less. In some embodiments, a composite matrix of $Zr_{1-x}Y_xB_{12}$ has a density of 4.5 g/cm$^3$ or less. In some embodiments, a composite matrix of $Zr_{1-x}Y_xB_{12}$ has a density of 4.0 g/cm$^3$ or less. In some embodiments, a composite matrix of $Zr_{1-x}Y_xB_{12}$ has a density of 3.75 g/cm$^3$ or less. In some embodiments, a composite matrix of $Zr_{1-x}Y_xB_{12}$ has a density of 3.55 g/cm$^3$ or less. In some embodiments, a composite matrix of $Zr_{1-x}Y_xB_{12}$ has a density of 3.4 g/cm$^3$ or less. In some embodiments, a composite matrix of $Zr_{1-x}Y_xB_{12}$ has a density of 3.0 g/cm$^3$ or less. In some embodiments, a composite matrix of $Zr_{1-x}Y_xB_{12}$ has a density of 2.5 g/cm$^3$ or less. In some embodiments, a composite matrix of $Zr_{1-x}Y_xB_{12}$ has a density of 2.0 g/cm$^3$ or less.

In some embodiments, a composite matrix of $Zr_{1-x}Sc_xB_{12}$ has a density of 6.0 g/cm$^3$ or less. In some embodiments, a composite matrix of $Zr_{1-x}Sc_xB_{12}$ has a density of 5.0 g/cm$^3$ or less. In some embodiments, a composite matrix of $Zr_{1-x}Sc_xB_{12}$ has a density of 4.0 g/cm$^3$ or less. In some embodiments, a composite matrix of $Zr_{1-x}Sc_xB_{12}$ has a density of 3.5 g/cm$^3$ or less. In some embodiments, a composite matrix of $Zr_{1-x}Sc_xB_{12}$ has a density of 3.35 g/cm$^3$ or less. In some embodiments, a composite matrix of $Zr_{1-x}Sc_xB_{12}$ has a density of 3.1 g/cm$^3$ or less. In some embodiments, a composite matrix of $Zr_{1-x}Sc_xB_{12}$ has a density of 3.0 g/cm$^3$ or less. In some embodiments, a composite matrix of $Zr_{1-x}Sc_xB_{12}$ has a density of 2.5 g/cm$^3$ or less. In some embodiments, a composite matrix of $Zr_{1-x}Sc_xB_{12}$ has a density of 2.0 g/cm$^3$ or less.

In some embodiments, a composite matrix of $Y_{1-x}Sc_xB_{12}$ has a density of 6.0 g/cm$^3$ or less. In some embodiments, a composite matrix of $Y_{1-x}Sc_xB_{12}$ has a density of 5.0 g/cm$^3$ or less. In some embodiments, a composite matrix of $Y_{1-x}Sc_xB_{12}$ has a density of 4.0 g/cm$^3$ or less. In some embodiments, a composite matrix of $Y_{1-x}Sc_xB_{12}$ has a density of 3.5 g/cm$^3$ or less. In some embodiments, a composite matrix of $Y_{1-x}Sc_xB_{12}$ has a density of 3.3 g/cm$^3$ or less. In some embodiments, a composite matrix of $Y_{1-x}Sc_xB_{12}$ has a density of 3.21 g/cm$^3$ or less. In some embodiments, a composite matrix of $Y_{1-x}Sc_xB_{12}$ has a density of 3.1 g/cm$^3$ or less. In some embodiments, a composite matrix of $Y_{1-x}Sc_xB_{12}$ has a density of 3.0 g/cm$^3$ or less. In some embodiments, a composite matrix of $Y_{1-x}Sc_xB_{12}$ has a density of 2.75 g/cm$^3$ or less. In some embodiments, a composite matrix of $Y_{1-x}Sc_xB_{12}$ has a density of 2.50 g/cm$^3$ or less. In some embodiments, a composite matrix of $Y_{1-x}Sc_xB_{12}$ has a density of 2.0 g/cm$^3$ or less.

In some embodiments, a composite material described herein is resistant to oxidation. In some embodiments, the composite matrix is resistant to oxidation below 550° C. In some embodiments, the composite matrix is resistant to oxidation below 570° C. In some embodiments, the composite matrix is resistant to oxidation below 590° C. In some embodiments, the composite matrix is resistant to oxidation below 600° C. In some embodiments, the composite matrix is resistant to oxidation below 610° C. In some embodiments, the composite matrix is resistant to oxidation below 620° C. In some embodiments, the composite matrix is resistant to oxidation below 630° C. In some embodiments, the composite matrix is resistant to oxidation below 640° C. In some embodiments, the composite matrix is resistant to oxidation below 650° C. In some embodiments, the composite matrix is resistant to oxidation below 660° C. In some embodiments, the composite matrix is resistant to oxidation below 665° C. In some embodiments, the composite matrix is resistant to oxidation below 670° C. In some embodiments, the composite matrix is resistant to oxidation below 675° C. In some embodiments, the composite matrix is resistant to oxidation below 680° C. In some embodiments, the composite matrix is resistant to oxidation below 685° C. In some embodiments, the composite matrix is resistant to oxidation below 690° C. In some embodiments, the composite matrix is resistant to oxidation below 695° C. In some embodiments, the composite matrix is resistant to oxidation below 700° C. In some embodiments, the composite matrix is resistant to oxidation below 725° C. In some embodiments, the composite matrix is resistant to oxidation below 750° C. In some embodiments, the composite matrix is resistant to oxidation below 775° C. In some embodiments, the composite matrix is resistant to oxidation below 800° C. In some embodiments, the composite matrix is resistant to oxidation below 825° C. In some embodiments, the composite matrix is resistant to oxidation below 850° C. In some embodiments, the composite matrix is resistant to oxidation below 875° C. In some embodiments, the composite matrix is resistant to oxidation below 900° C.

In some embodiments, the composite matrix is $Zr_{1-x}Y_xB_{12}$ and resistant to oxidation below 600° C. In some embodiments, the composite matrix is $Zr_{1-x}Y_xB_{12}$ and resistant to oxidation below 610° C. In some embodiments, the composite matrix is $Zr_{1-x}Y_xB_{12}$ and resistant to oxidation below 620° C. In some embodiments, the composite matrix is $Zr_{1-x}Y_xB_{12}$ and resistant to oxidation below 630° C. In some embodiments, the composite matrix is $Zr_{1-x}Y_xB_{12}$ and resistant to oxidation below 640° C. In some embodiments, the composite matrix is $Zr_{1-x}Y_xB_{12}$ and resistant to oxidation below 650° C.

In some embodiments, the composite matrix is $Zr_{1-x}Sc_xB_{12}$ and resistant to oxidation below 600° C. In some embodiments, the composite matrix is $Zr_{1-x}Sc_xB_{12}$ and resistant to oxidation below 620° C. In some embodiments, the composite matrix is $Zr_{1-x}Sc_xB_{12}$ and resistant to oxidation below 640° C. In some embodiments, the composite matrix is $Zr_{1-x}Sc_xB_{12}$ and resistant to oxidation below 660° C. In some embodiments, the composite matrix is $Zr_{1-x}Sc_xB_{12}$ and resistant to oxidation below 670° C. In some embodiments, the composite matrix is $Zr_{1-x}Sc_xB_{12}$ and resistant to oxidation below 675° C. In some embodiments, the composite matrix is $Zr_{1-x}Sc_xB_{12}$ and resistant to oxidation below 680° C. In some embodiments, the composite matrix is $Zr_{1-x}Sc_xB_{12}$ and resistant to oxidation below 700° C.

In some embodiments, the composite matrix is $Y_{1-x}Sc_xB_{12}$ and resistant to oxidation below 600° C. In some embodiments, the composite matrix is $Y_{1-x}Sc_xB_{12}$ and resistant to oxidation below 620° C. In some embodiments, the composite matrix is $Y_{1-x}Sc_xB_{12}$ and resistant to oxidation below 640° C. In some embodiments, the composite matrix is $Y_{1-x}Sc_xB_{12}$ and resistant to oxidation below 660° C. In some embodiments, the composite matrix is $Y_{1-x}Sc_xB_{12}$ and resistant to oxidation below 670° C. In some embodiments, the composite matrix is $Y_{1-x}Sc_xB_{12}$ and resistant to oxidation below 675° C. In some embodiments, the composite matrix is $Y_{1-x}Sc_xB_{12}$ and resistant to oxidation below 680° C. In some embodiments, the composite matrix is $Y_{1-x}Sc_xB_{12}$ and resistant to oxidation below 685° C. In some embodiments, the composite matrix is $Y_{1-x}Sc_xB_{12}$ and resistant to oxidation below 690° C. In some embodiments, the composite matrix is $Y_{1-x}Sc_xB_{12}$ and resistant to oxidation below 695° C. In some embodiments, the composite matrix is $Y_{1-x}Sc_xB_{12}$ and resistant to oxidation below 700° C. In some embodiments, the composite matrix is $Y_{1-x}Sc_xB_{12}$ and resistant to oxidation below 710° C. In some embodiments, the composite matrix is $Y_{1-x}Sc_xB_{12}$ and resistant to oxidation below 720° C.

In some embodiments, a composite material described herein is resistant to oxidation. In some embodiments, a composite material described herein has anti-oxidation property. For example, when the composite material is coated on the surface of a tool, the composite material reduces the rate of oxidation of the tool in comparison to a tool not coated with the composite material. In an alternative example, when the composite material is coated on the surface of a tool, the composite material prevents oxidation of the tool in comparison to a tool not coated with the composite material. In some embodiments, the composite material inhibits the formation of oxidation or reduces the rate of oxidation.

In some embodiments, a composite matrix described herein is cubic or tetragonal as determined and characterized by X-ray diffraction. In some embodiments, a composite matrix described herein is cubic. In some embodiments, a composite matrix described herein is cubic and the length of a is between 7.350 and 7.550 Å, where a is the length between two adjacent vertices in the unit cell.

In some embodiments, a composite matrix described herein is tetragonal. In some embodiments, a composite matrix is tetragonal and the length of a is between 5.150 and 5.450 Å, where a is the shortest length between two adjacent vertices in the unit cell, and the length of c is between 7.350 and 7.550 Å, where c is the longest length between two adjacent vertices in the unit cell.

In some embodiments, a composite matrix $Zr_{1-x}Y_xB_{12}$ is cubic and the length of a is between 7.350 and 7.550 Å, where a is the length between two adjacent vertices in the unit cell. In some embodiments, a composite matrix $Zr_{1-x}Gd_xB_{12}$ is cubic and the length of a is between 7.350 and 7.550 Å, where a is the length between two adjacent vertices in the unit cell. In some embodiments, a composite matrix $Zr_{1-x}Sm_xB_{12}$ is cubic and the length of a is between 7.350 and 7.550 Å, where a is the length between two adjacent vertices in the unit cell. In some embodiments, a composite matrix $Zr_{1-x}Nd_xB_{12}$ is cubic and the length of a is between 7.350 and 7.550 Å, where a is the length between two adjacent vertices in the unit cell. In some embodiments, a composite matrix $Zr_{1-x}Pr_xB_{12}$ is cubic and the length of a is between 7.350 and 7.550 Å, where a is the length between two adjacent vertices in the unit cell. In some embodiments, a composite matrix $Zr_{1-x}Sc_xB_{12}$ is tetragonal and the length of a is between 5.150 and 5.450 Å, where a is the shortest length between two adjacent vertices in the unit cell, and the length of c is between 7.350 and 7.550 Å, where c is the longest length between two adjacent vertices in the unit cell. In some embodiments, a composite matrix $Y_{1-x}Sc_xB_{12}$ is tetragonal and the length of a is between 5.150 and 5.450 Å, where a is the shortest length between two adjacent vertices in the unit cell, and the length of c is between 7.350 and 7.550 Å, where c is the longest length between two adjacent vertices in the unit cell.

In some embodiments, a composite matrix described herein comprises a solid solution phase. In some embodiments, a composite material described herein forms a solid solution.

Methods of Manufacture

Certain embodiments described herein include methods of making a composite matrix. Some embodiments described herein comprise a method of preparing an oxidative resistant composite matrix, which comprises (a) blending together the boron and metals for a time sufficient to produce a powder mixture; (b) pressing the powder mixture under a pressure sufficient to generate a pellet; and (c) sintering the pellet at a temperature sufficient to produce a densified composite matrix.

In some embodiments, the blending time is about 5 minutes to about 6 hours. In some embodiments, the blending time is about 5 minutes, about 10 minutes, about 15 minutes, about 20 minutes, about 30 minutes, about 45 minutes, about 1 hour, about 1.5 hour, about 2 hours, about 3 hours, about 4 hours, about 5 hours, or about 6 hours.

In some embodiments, the blending time is at least 5 minutes or more. In some embodiments, the blending time is about 10 minutes or more. In some embodiments, the blending time is about 20 minutes or more. In some embodiments, the blending time is about 30 minutes or more. In some embodiments, the blending time is about 45 minutes or more. In some embodiments, the blending time is about 1 hour or more. In some embodiments, the blending time is about 2 hours or more. In some embodiments, the blending time is about 3 hours or more. In some embodiments, the blending time is about 4 hours or more. In some embodiments, the blending time is about 5 hours or more. In some embodiments, the blending time is about 6 hours or more. In some embodiments, the blending time is about 8 hours or more. In some embodiments, the blending time is about 10 hours or more. In some embodiments, the blending time is about 12 hours or more.

In some embodiments, a pressure of up to 36,000 psi is utilized to generate a pellet. In some embodiments, the pressure is up to 34,000 psi. In some embodiments, the pressure is up to 32,000 psi. In some embodiments, the pressure is up to 30,000 psi. In some embodiments, the pressure is up to 28,000 psi. In some embodiments, the pressure is up to 26,000 psi. In some embodiments, the pressure is up to 24,000 psi. In some embodiments, the pressure is up to 22,000 psi. In some embodiments, the pressure is up to 20,000 psi. In some embodiments, the pressure is up to 18,000 psi. In some embodiments, the pressure is up to 16,000 psi. In some embodiments, the pressure is up to 15,000 psi. In some embodiments, the pressure is up to 14,000 psi. In some embodiments, the pressure is up to 10,000 psi.

In some embodiments, the pellets are compressed using a hydraulic press. In some embodiments, the powder is compressed under a 1-20 ton load. In some embodiments, the powder is compressed under a 2-18 ton load. In some embodiments, the powder is compressed under a 4-16 ton load. In some embodiments, the powder is compressed under a 6-14 ton load. In some embodiments, the powder is compressed under a 8-12 ton load. In some embodiments, the powder is compressed under a 9-11 ton load.

In some embodiments, the pellets are compressed using a hydraulic press. In some embodiments, the powder is compressed under a 1 ton load. In some embodiments, the powder is compressed under a 2 ton load. In some embodiments, the powder is compressed under a 3 ton load. In some embodiments, the powder is compressed under a 4 ton load. In some embodiments, the powder is compressed under a 5 ton load. In some embodiments, the powder is compressed under a 6 ton load. In some embodiments, the powder is compressed under a 7 ton load. In some embodiments, the powder is compressed under an 8 ton load. In some embodiments, the powder is compressed under a 9 ton load. In some embodiments, the powder is compressed under a 10 ton load. In some embodiments, the powder is compressed under a 11 ton load. In some embodiments, the powder is compressed under a 12 ton load. In some embodiments, the powder is compressed under a 13 ton load. In some embodiments, the powder is compressed under a 14 ton load. In some embodiments, the powder is compressed under a 15 ton load. In some embodiments, the powder is compressed under a 20 ton load.

In some embodiments, the metal and boron are compressed into a form that is not a pellet.

In some embodiments, a method described herein further comprises a sintering step. In some embodiments, the sintering step generates a densified composite matrix. In some embodiments, the sintering step is carried out at elevated temperatures. In some embodiments, the temperature during sintering is from 1000° C. to 2000° C. In some embodiments, the temperature during sintering is from 1000° C. to 1900° C. In some embodiments, the temperature during sintering is from 1200° C. to 1900° C. In some embodiments, the temperature during sintering is from 1300° C. to 1900° C. In some embodiments, the temperature during sintering is from 1400° C. to 1900° C. In some embodiments, the temperature during sintering is from 1000° C. to 1800° C. In some embodiments, the temperature during sintering is from 1000° C. to 1700° C. In some embodiments, the temperature during sintering is from 1200° C. to 1800° C. In some embodiments, the temperature during sintering is from 1300° C. to 1700° C. In some embodiments, the temperature during sintering is from 1000° C. to 1600° C. In some embodiments, the temperature during sintering is from 1500° C. to 1800° C. In some embodiments, the temperature during sintering is from 1500° C. to 1700° C. In some embodiments, the temperature during sintering is from 1500° C. to 1600° C. In some embodiments, the temperature during sintering is from 1600° C. to 2000° C. In some embodiments, the temperature during sintering is from 1600° C. to 1900° C. In some embodiments, the temperature during sintering is from 1600° C. to 1800° C. In some embodiments, the temperature during sintering is from 1600° C. to 1700° C. In some embodiments, the temperature during sintering is from 1700° C. to 2000° C. In some embodiments, the temperature during sintering is from 1700° C. to 1900° C. In some embodiments, the temperature during sintering is from 1700° C. to 1800° C. In some embodiments, the temperature during sintering is from 1800° C. to 2000° C. In some embodiments, the temperature during sintering is from 1800° C. to 1900° C. In some embodiments, the temperature during sintering is from 1900° C. to 2000° C.

In some embodiments, the temperature is about 1000° C., about 1100° C., about 1200° C., about 1300° C., about 1400° C., about 1500° C., about 1600° C., about 1700° C., about 1800° C., about 1900° C. or about 2000° C. In some embodiments, the temperature is about 1000° C. In some embodiments, the temperature is about 1100° C. In some embodiments, the temperature is about 1200° C. In some embodiments, the temperature is about 1300° C. In some embodiments, the temperature is about 1400° C. In some embodiments, the temperature is about 1500° C. In some embodiments, the temperature is about 1600° C. In some embodiments, the temperature is about 1700° C. In some embodiments, the temperature is about 1800° C. In some embodiments, the temperature is about 1900° C. In some embodiments, the temperature is about 2000° C.

In some embodiments, sintering is carried out using by electrical current. In some embodiments, sintering is carried out by arc-melting. In some embodiments, arc melting is carried out with a current (I) of 50 Amps (A) or more. In some embodiments, arc melting is carried out with a I of 60 A or more. In some embodiments, arc melting is carried out with a I of 65 A or more. In some embodiments, arc melting is carried out with a I of 70 A or more. In some embodiments, arc melting is carried out with a I of 75 A or more. In some embodiments, arc melting is carried out with a I of 80 A or more. In some embodiments, arc melting is carried out with a I of 90 A or more. In some embodiments, arc melting is carried out with a I of 100 A or more.

In some embodiments, arc melting is performed in and argon atmosphere. In some embodiments, arc melting is performed in an ultrapure argon atmosphere.

In some embodiments, arc melting is performed for 0.01-10 mins. In some embodiments, arc melting is performed for 0.01-8 mins. In some embodiments, arc melting is performed for 0.01-6 mins. In some embodiments, arc melting is performed for 0.01-5 mins. In some embodiments, arc melting is performed for 0.01-4 mins. In some embodiments, arc melting is performed for 0.5-3 mins. In some embodiments, arc melting is performed for 0.8-2.5 mins. In some embodiments, arc melting is performed for 1-2 mins.

In some embodiments, sintering is carried out at room temperature.

In some embodiment, a sintering step described herein involves an elevated temperature and an elevated pressure, e.g., hot pressing. Hot pressing is a process involving a simultaneous application of pressure and high temperature, which can accelerate the rate of densification of a material (e.g., a composite matrix described herein). In some embodiments, a temperature from 1000° C. to 2000° C. and a pressure of up to 36,000 psi are used during hot pressing.

In other embodiments, a sintering step described herein involves an elevated pressure and room temperature, e.g., cold pressing. In such embodiments, pressure of up to 36,000 psi is used.

Tools and Abrasive Materials

In some embodiments, a composite matrix described herein is used to make, modify, or coat a tool or an abrasive material. In some embodiments, a composite matrix described herein is coated onto the surface of a tool or an abrasive material. In some embodiments, the surface of a tool or an abrasive material is modified with a composite matrix described herein. In some embodiments, the surface of a tool or abrasive material comprises a composite matrix described herein.

In some embodiments, a tool or abrasive material comprises a cutting tool. In some embodiments, a tool or abrasive material comprises a tool or a component of a tool for cutting, drilling, etching, engraving, grinding, carving, or polishing. In some embodiments, a tool or abrasive material comprises a metal bond abrasive tool, for example, such as a metal bond abrasive wheel or grinding wheel. In some embodiments, a tool or abrasive material comprises drilling tools. In some embodiments, a tool or abrasive material comprises drill bits, inserts or dies. In some embodiments, a tool or abrasive material comprises tools or components used in downhole tooling. In some embodiments, a tool or abrasive material comprises an etching tool. In some embodiments, a tool or abrasive material comprises an engraving tool. In some embodiments, a tool or abrasive material comprises a grinding tool. In some embodiments, a tool or abrasive material comprises a carving tool. In some embodiments, a tool or abrasive material comprises a polishing tool.

Certain Terminologies

Unless defined otherwise, all technical and scientific terms used herein have the same meaning as is commonly understood by one of skill in the art to which the claimed subject matter belongs. It is to be understood that the detailed description are exemplary and explanatory only and are not restrictive of any subject matter claimed. In this application, the use of the singular includes the plural unless specifically stated otherwise. It must be noted that, as used in the specification, the singular forms "a," "an" and "the" include plural referents unless the context clearly dictates otherwise. In this application, the use of "or" means "and/or" unless stated otherwise. Furthermore, use of the term "including" as well as other forms, such as "include", "includes," and "included," is not limiting.

Although various features of the disclosure may be described in the context of a single embodiment, the features may also be provided separately or in any suitable combination. Conversely, although the disclosure may be described herein in the context of separate embodiments for clarity, the disclosure may also be implemented in a single embodiment.

Reference in the specification to "some embodiments", "an embodiment", "one embodiment" "another embodiment" or "other embodiments" means that a particular feature, structure, or characteristic described in connection with the embodiments is included in at least some embodiments, but not necessarily all embodiments, of the disclosure.

As used herein, ranges and amounts can be expressed as "about" a particular value or range. About also includes the exact amount. Hence "about 5 GPa" means "about 5 GPa" and also "5 GPa." Generally, the term "about" includes an amount that would be expected to be within experimental error, e.g., ±5%, ±10% or ±15%. In some embodiments, "about" includes ±5%. In some embodiments, "about" includes ±10%. In some embodiments, "about" includes ±15%.

The section headings used herein are for organizational purposes only and are not to be construed as limiting the subject matter described.

EXAMPLES

These examples are provided for illustrative purposes only and not to limit the scope of the claims provided herein.

Example 1. X-Ray Diffraction

Prepared ingots were bisected using a diamond saw (Ameritool Inc., U.S.A.). One half was crushed into a sub 325 (45 µm) mesh powder and used for powder X-ray diffraction (PXRD) analysis; the other half was used for energy-dispersive X-ray spectroscopy (EDS) analysis and Vicker's hardness measurements. For the latter two, the samples were encapsulated in epoxy using an epoxy/hardener set (Allied High Tech Products Inc., U.S.A.). In order to achieve an optically flat surface, the samples were polished on a semi-automated polisher (South Bay Technology Inc., U.S.A.), using the following abrasives: SiC discs of 120-1200 grit sizes (Allied High Tech Products Inc., U.S.A.) and 30-1 micron particle diamond films (South Bay Technology Inc., U.S.A.).

Powder XRD was carried out on a Bruker D8 Discover Powder X-ray Diffractometer (Bruker Corporation, Germany) utilizing $Cu_{K\alpha}$ X-ray radiation ($\lambda$=1.5418 Å). The following scan parameters were used: 5-100° 2θ range, time per step of 0.3 sec, step size of 0.0353° with a scan speed of 0.1055°/sec. In order to determine the phases present in the powder X-ray diffraction data, the Joint Committee on Powder Diffraction Standards (JCPDS) database was utilized. The composition and purity of the samples were determined on an FEI Nova 230 high resolution scanning electron microscope (FEI Company, U.S.A.) with an Ultra-Dry EDS detector (Thermo Scientific, U.S.A.). Rietveld refinement utilizing Maud software was carried out to determine the cell parameters.

$ZrB_{12}$, $YB_{12}$ and $ScB_{12}$ are completely soluble in each other. $Zr_{1-x}Sc_xB_{12}$ and $Y_{1-x}Sc_xB_{12}$ undergo a solid-state phase transition between a cubic and tetragonal cells at 90-95 at % Sc.

Table 1 shows unit cell data for $Zr_{1-x}Y_xB_{12}$. X-ray powder diffractograms of $Zr_{1-x}Y_xB_{12}$ are shown in FIG. 1.

TABLE 1

| Compound | Concentration of Y in ZrB$_{12}$ (at. % Y)[a] | Cubic (Fm$\bar{3}$m) a (Å)[b] | a (Å)[c] |
|---|---|---|---|
| ZrB$_{12}$ | — | 7.412(2) | 7.412 |
| Zr$_{0.95}$Y$_{0.05}$B$_{12}$ | 2.91 (0.10) | 7.418(3) | 7.417 |
| Zr$_{0.75}$Y$_{0.25}$B$_{12}$ | 20.29 (0.12) | 7.438(4) | 7.435 |
| Zr$_{0.50}$Y$_{0.50}$B$_{12}$ | 47.81 (0.55) | 7.454(5) | 7.459 |
| Zr$_{0.25}$Y$_{0.75}$B$_{12}$ | 70.89 (0.46) | 7.481(6) | 7.482 |
| Zr$_{0.05}$Y$_{0.95}$B$_{12}$ | 91.24 (0.41) | 7.502(3) | 7.500 |
| YB$_{12}$ | — | 7.505(4) | 7.505 |

Figure 2:
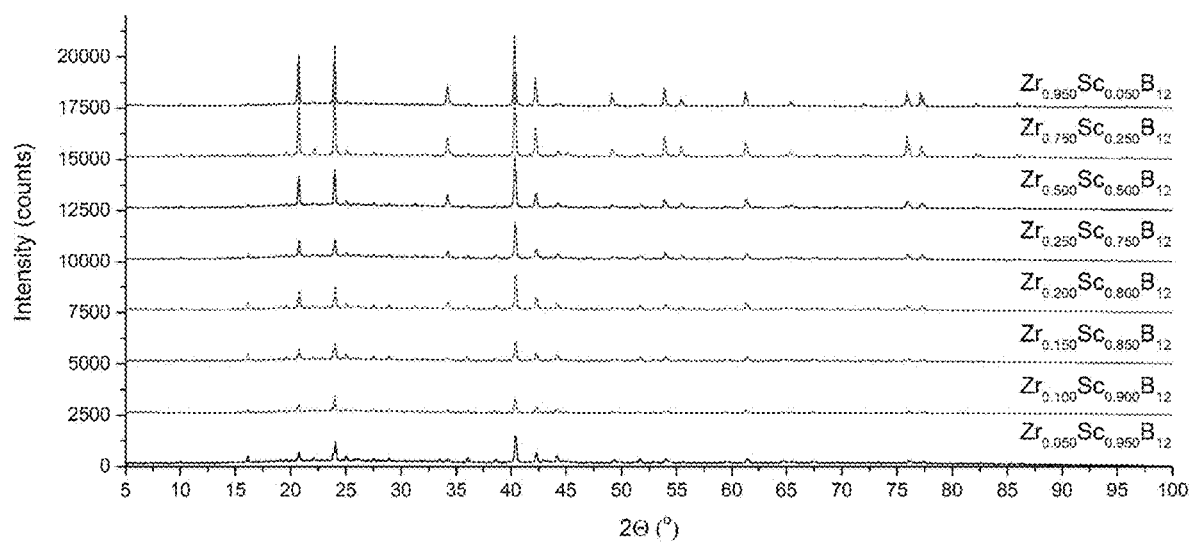
FIG. 2 shows X-ray powder diffractograms of $Zr_{1-x}Sc_xB_{12}$.

[a] calculated from EDS analysis; errors are given in brackets
[b] from cell refinement using Maud; errors are given in brackets
[c] calculated using Vegard's Law Table 2 shows unit cell data for Zr$_{1-x}$Sc$_x$B$_{12}$. X-ray powder diffractograms of Zr$_{1-x}$Sc$_x$B$_{12}$ are shown in FIG. 2.

TABLE 2

| Compound | Concentration of Sc in ZrB$_{12}$ (at. % Sc)[a] | Cubic (Fm$\bar{3}$m) a (Å)[b] | Tetragonal (I4/mmm) a (Å)[b] | c (Å)[b] |
|---|---|---|---|---|
| ZrB$_{12}$ | — | 7.412(2) | — | — |
| Zr$_{0.95}$Sc$_{0.05}$B$_{12}$ | 2.20 (0.09) | 7.412(4) | 5.241(2) | 7.411(3) |
| Zr$_{0.75}$Sc$_{0.25}$B$_{12}$ | 15.14 (0.16) | 7.410(3) | 5.240(3) | 7.410(4) |
| Zr$_{0.50}$Sc$_{0.50}$B$_{12}$ | 38.66 (0.28) | 7.408(3) | 5.237(4) | 7.408(5) |
| Zr$_{0.25}$Sc$_{0.75}$B$_{12}$ | 65.16 (0.39) | 7.405(4) | 5.235(2) | 7.405(4) |
| Zr$_{0.20}$Sc$_{0.80}$B$_{12}$ | 67.49 (0.26) | 7.403(2) | 5.234(5) | 7.402(3) |
| Zr$_{0.15}$Sc$_{0.85}$B$_{12}$ | 87.17 (0.33) | 7.402(5) | 5.233(3) | 7.393(3) |
| Zr$_{0.10}$Sc$_{0.90}$B$_{12}$ | 90.51 (0.69) | 7.398(3) | 5.233(4) | 7.389(4) |
| Zr$_{0.05}$Sc$_{0.95}$B$_{12}$ | 94.97 (0.44) | 7.395(3) | 5.232(3) | 7.385(3) |
| ScB$_{12}$ | — | — | 5.232(3) | 7.361(4) |

Figure 3:
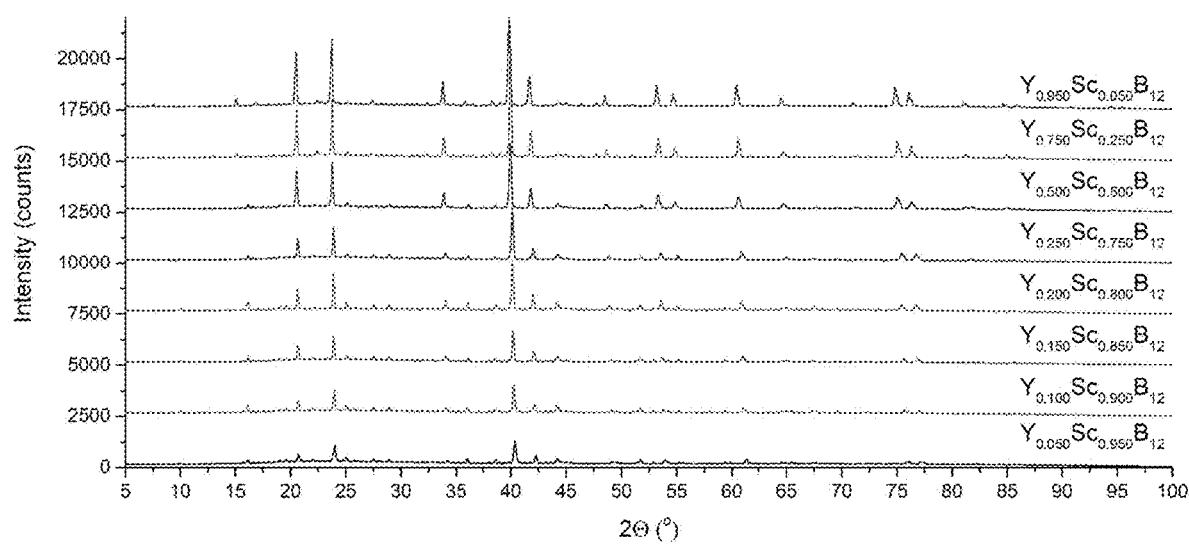
FIG. 3 shows X-ray powder diffractograms of $Y_{1-x}Sc_xB_{12}$.

[a] calculated from EDS analysis; errors are given in brackets
[b] from cell refinement using Maud; errors are given in brackets Table 3 shows unit cell data for Y$_{1-x}$Sc$_x$B$_{12}$. X-ray powder diffractograms of Y$_{1-x}$Sc$_x$B$_{12}$ are shown in FIG. 3.

TABLE 3

| Compound | Concentration of Sc in YB$_{12}$ (at. % Sc)[a] | Cubic (Fm$\bar{3}$m) a (Å)[b] | Tetragonal (I4/mmm) a (Å)[b] | c (Å)[b] |
|---|---|---|---|---|
| YB$_{12}$ | — | 7.505(4) | — | — |
| Y$_{0.95}$Sc$_{0.05}$B$_{12}$ | 4.36 (0.17) | 7.504(3) | 5.306(2) | 7.503(3) |
| Y$_{0.75}$Sc$_{0.25}$B$_{12}$ | 26.45 (0.22) | 7.486(2) | 5.292(3) | 7.486(2) |
| Y$_{0.50}$Sc$_{0.50}$B$_{12}$ | 40.57 (0.28) | 7.486(2) | 5.291(4) | 7.486(3) |
| Y$_{0.25}$Sc$_{0.75}$B$_{12}$ | 65.79 (0.23) | 7.455(3) | 5.272(4) | 7.452(4) |
| Y$_{0.20}$Sc$_{0.80}$B$_{12}$ | 67.40 (0.31) | 7.448(4) | 5.255(5) | 7.449(5) |
| Y$_{0.15}$Sc$_{0.85}$B$_{12}$ | 73.90 (0.30) | 7.442(5) | 5.247(5) | 7.439(5) |
| Y$_{0.10}$Sc$_{0.90}$B$_{12}$ | 81.03 (0.39) | 7.428(6) | 5.243(3) | 7.426(6) |
| Y$_{0.05}$Sc$_{0.95}$B$_{12}$ | 92.38 (0.30) | 7.402(5) | 5.235(2) | 7.389(3) |
| ScB$_{12}$ | — | — | 5.232(3) | 7.361(4) |

Figure 4:
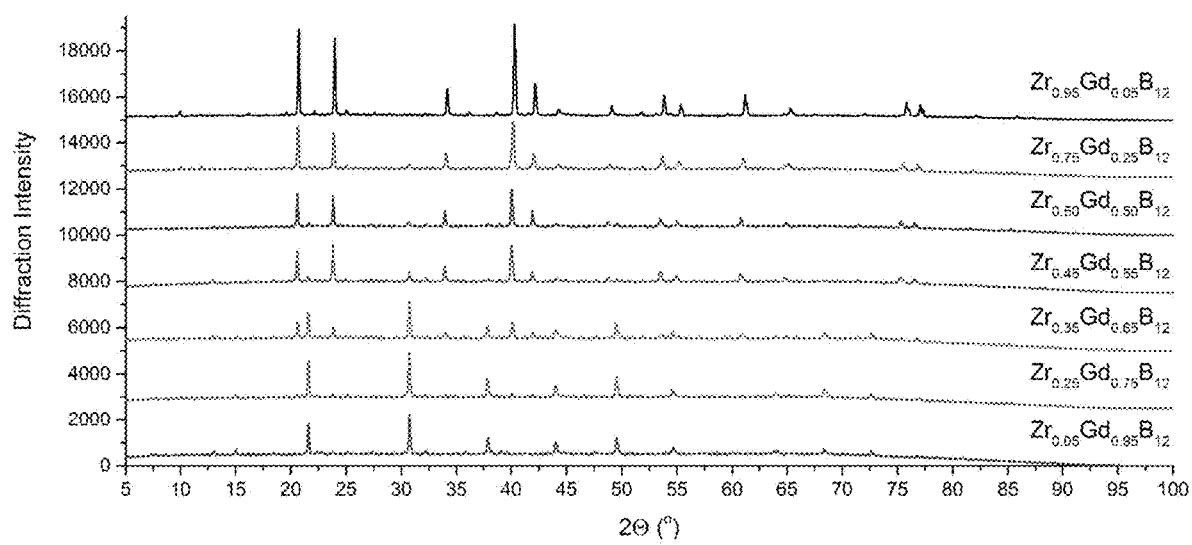
FIG. 4 shows X-ray powder diffractograms of $Zr_{1-x}Gd_xB_{12}$.

[a] calculated from EDS analysis; errors are given in brackets
[b] from cell refinement using Maud; errors are given in brackets Table 4 shows unit cell data for Zr$_{1-x}$Gd$_x$B$_{12}$. X-ray powder diffractograms of Zr$_{1-x}$Gd$_x$B$_{12}$ are shown in FIG. 4.

TABLE 4

| Compound | Concentration of Gd in ZB$_{12}$ (at % Gd) by EDS | Cubic (Fm$\bar{3}$m) α, Å | Vegard's Law |
|---|---|---|---|
| ZrB$_{12}$ | — | 7.412(2) | 7.412 |
| Zr$_{0.95}$Gd$_{0.05}$B$_{12}$ | 3.38 (0.23) | 7.420(3) | 7.418 |
| Zr$_{0.75}$Gd$_{0.25}$B$_{12}$ | 18.56 (0.31) | 7.444(3) | 7.440 |
| Zr$_{0.50}$Gd$_{0.50}$B$_{12}$ | 50.83 (0.80) | 7.464(2) | 7.468 |
| Zr$_{0.45}$Gd$_{0.55}$B$_{12}$ | 53.70 (0.64) | 7.468(2) | 7.474 |
| Zr$_{0.35}$Gd$_{0.65}$B$_{12}$ | — | 7.453(2) | 7.485 |
| Zr$_{0.25}$Gd$_{0.75}$B$_{12}$ | — | — | 7.496 |
| Zr$_{0.05}$Gd$_{0.95}$B$_{12}$ | — | — | 7.518 |
| GdB$_{12}$ | — | 7.524 | 7.524 |

Figure 5:
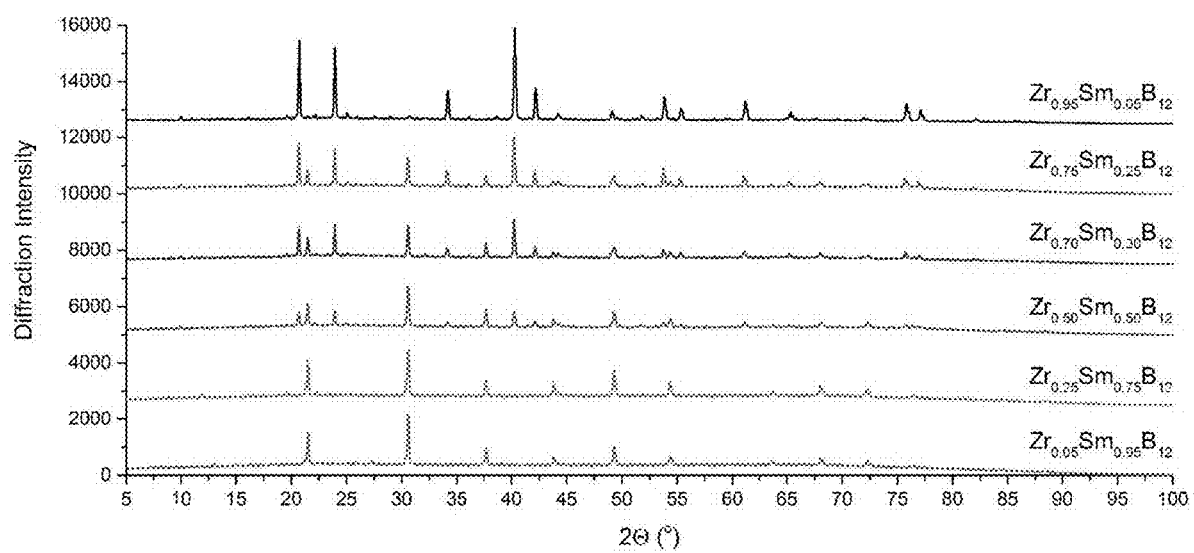
FIG. 5 shows X-ray powder diffractograms of $Zr_{1-x}Sm_xB_{12}$.

Table 5 shows unit cell data for Zr$_{1-x}$Sm$_x$B$_{12}$. X-ray powder diffractograms of Zr$_{1-x}$Sm$_x$B$_{12}$ are shown in FIG. 5.

TABLE 5

| Compound | Concentration of Sm in ZB$_{12}$ (at % Sm) by EDS | Cubic (Fm$\bar{3}$m) α, Å |
|---|---|---|
| ZrB$_{12}$ | — | 7.412(2) |
| Zr$_{0.95}$Sm$_{0.05}$B$_{12}$ | 2.93 (0.42) | 7.419(3) |
| Zr$_{0.75}$Sm$_{0.25}$B$_{12}$ | 14.94 (0.24) | 7.433(3) |
| Zr$_{0.70}$Sm$_{0.30}$B$_{12}$ | 13.99 (0.23) | 7.431(4) |
| Zr$_{0.65}$Sm$_{0.35}$B$_{12}$ | — | 7.429(2) |
| Zr$_{0.50}$Sm$_{0.50}$B$_{12}$ | — | 7.428(3) |
| SmB$_{12}$ | — | 7.543 |

Figure 6:
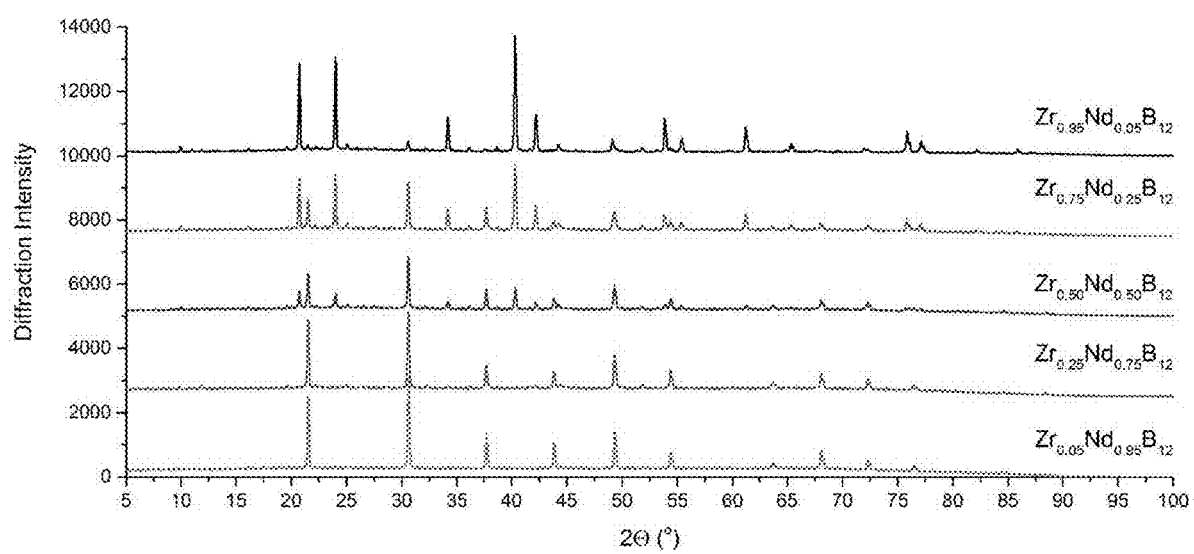
FIG. 6 shows X-ray powder diffractograms of $Zr_{1-x}Nd_xB_{12}$.

Table 6 shows unit cell data for Zr$_{1-x}$Nd$_x$B$_{12}$. X-ray powder diffractograms of Zr$_{1-x}$Nd$_x$B$_{12}$ are shown in FIG. 6.

TABLE 6

| Compound | Concentration of Nd in ZB$_{12}$ (at % Nd) by EDS | Cubic (Fm$\bar{3}$m) a, Å |
|---|---|---|
| ZrB$_{12}$ | — | 7.412(2) |
| Zr$_{0.95}$Nd$_{0.05}$B$_{12}$ | 1.76 (0.11) | 7.413(3) |
| Zr$_{0.75}$Nd$_{0.25}$B$_{12}$ | 7.17 (0.28) | 7.421(2) |
| Zr$_{0.50}$Nd$_{0.50}$B$_{12}$ | — | 7.419(3) |

Figure 7:
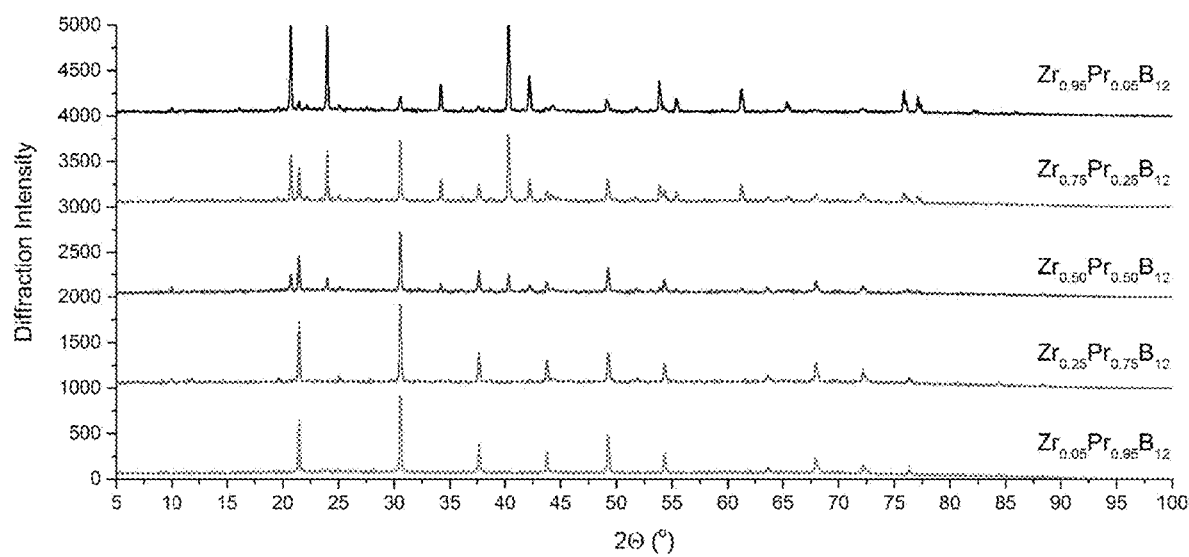
FIG. 7 shows X-ray powder diffractograms of $Zr_{1-x}Pr_xB_{12}$.

Table 7 shows unit cell data for Zr$_{1-x}$Pr$_x$B$_{12}$. X-ray powder diffractograms of Zr$_{1-x}$Pr$_x$B$_{12}$ are shown in FIG. 7.

TABLE 7

| Compound | Concentration of Pr in ZB$_{12}$ (at % Pr) by EDS | Cubic (Fm$\bar{3}$m) a, Å |
|---|---|---|
| ZrB$_{12}$ | — | 7.412(2) |
| Zr$_{0.95}$Pr$_{0.05}$B$_{12}$ | 1.61 (0.22) | 7.415(2) |
| Zr$_{0.75}$Pr$_{0.25}$B$_{12}$ | 4.12 (0.27) | 7.418(4) |
| Zr$_{0.50}$Pr$_{0.50}$B$_{12}$ | — | 7.418(3) |

The solubility limit of Gd in ZrB$_{12}$ is 54 at. % Gd. The solubility limit of Sm in ZrB$_{12}$ is ~15 at. % Sm. The solubility limit of Pr in ZrB$_{12}$ is 4 at. % Pr. The solubility limit of Nd in ZrB$_{12}$ is ~7 at. % Nd. With increasing concentration of Gd, Sm, Nd and Pr, the dodecaboride (MB$_{12}$) phase concentration decreases while the hexaboride (MB$_6$) phase increases. In most cases, the higher boride phases ZrB$_{50}$, GdB$_{66}$, SmB$_{66}$ or NdB$_{66}$ can be observed in the XRPD diffractograms as they accompany the dodecaboride phases at higher metal to boron ratios (1:20).

Table 8 shows the hkl, 2Theta and intensity values for a cubic dodecaboride alloy of the formula Zr$_{1-x}$Y$_x$B$_{12}$. X-ray powder diffractograms of Zr$_{1-x}$Y$_x$B$_{12}$ are shown in FIG. 1.

TABLE 8

| | | | | $Zr_{0.95}Y_{0.05}B_{12}$ | | $Zr_{0.75}Y_{0.25}B_{12}$ | | $Zr_{0.50}Y_{0.50}B_{12}$ | |
|---|---|---|---|---|---|---|---|---|---|
| # | h | k | l | $2\Theta°$ | $I_{rel}$ (%) | $2\Theta°$ | $I_{rel}$ (%) | $2\Theta°$ | $I_{rel}$ (%) |
| 1 | 1 | 1 | 1 | 20.7026 | 65.05 | 20.6860 | 37.89 | 20.6081 | 69.57 |
| 2 | 2 | 0 | 0 | 23.9694 | 64.27 | 23.9341 | 54.40 | 23.8622 | 77.51 |
| 3 | 2 | 2 | 0 | 34.1433 | 21.65 | 34.0958 | 24.04 | 34.0068 | 27.27 |
| 4 | 3 | 1 | 1 | 40.2907 | 100.00 | 40.2119 | 100.00 | 40.0759 | 100.00 |
| 5 | 2 | 2 | 2 | 42.1499 | 26.40 | 42.0686 | 19.27 | 41.9283 | 23.75 |
| 6 | 4 | 0 | 0 | 49.0685 | 7.41 | 48.9665 | 6.47 | 48.8023 | 8.91 |
| 7 | 3 | 3 | 1 | 53.8300 | 24.41 | 53.6957 | 22.82 | 53.5130 | 16.60 |
| 8 | 4 | 2 | 0 | 55.3357 | 13.16 | 55.2003 | 7.92 | 55.0155 | 12.68 |
| 9 | 4 | 2 | 2 | 61.1600 | 24.42 | 61.0321 | 17.54 | 60.7954 | 22.83 |
| 10 | 5 | 1 | 1 | 65.3232 | 7.13 | 65.1830 | 6.34 | 64.9327 | 7.28 |
| 11 | 4 | 4 | 0 | 72.0237 | 1.56 | 71.8198 | 1.38 | 71.6078 | 2.42 |
| 12 | 5 | 3 | 1 | 75.8257 | 24.75 | 75.6271 | 18.14 | 75.5588 | 19.34 |
| 13 | 4 | 4 | 2 | 76.0645 | 13.42 | 76.9139 | 10.46 | 75.5950 | 13.97 |
| 14 | 6 | 2 | 0 | 77.0849 | 12.89 | 77.0707 | 7.95 | 76.8519 | 10.56 |
| 15 | 5 | 3 | 3 | 82.1129 | 4.88 | 81.8678 | 3.52 | 81.7783 | 5.01 |
| 16 | 6 | 2 | 2 | 85.8314 | 3.67 | 85.5586 | 2.30 | 86.6318 | 1.18 |

| | | | | $Zr_{0.25}Y_{0.75}B_{12}$ | | $Zr_{0.05}Y_{0.95}B_{12}$ | |
|---|---|---|---|---|---|---|---|
| # | h | k | l | $2\Theta°$ | $I_{rel}$ (%) | $2\Theta°$ | $I_{rel}$ (%) |
| 1 | 1 | 1 | 1 | 20.5293 | 89.17 | 20.5005 | 54.05 |
| 2 | 2 | 0 | 0 | 23.7543 | 78.40 | 23.6942 | 57.73 |
| 3 | 2 | 2 | 0 | 33.8576 | 35.08 | 33.7629 | 24.24 |
| 4 | 3 | 1 | 1 | 39.9183 | 100.00 | 39.8357 | 100.00 |
| 5 | 2 | 2 | 2 | 41.7846 | 32.82 | 41.6885 | 26.07 |
| 6 | 4 | 0 | 0 | 48.6299 | 8.44 | 48.5042 | 7.22 |
| 7 | 3 | 3 | 1 | 53.3210 | 28.35 | 53.1733 | 22.49 |
| 8 | 4 | 2 | 0 | 54.8221 | 17.32 | 54.6886 | 12.24 |
| 9 | 4 | 2 | 2 | 60.5763 | 26.41 | 60.4185 | 19.78 |
| 10 | 5 | 1 | 1 | 64.6989 | 15.25 | 64.4951 | 6.53 |
| 11 | 4 | 4 | 0 | 71.2255 | 3.49 | 71.0455 | 2.07 |
| 12 | 5 | 3 | 1 | 75.0477 | 20.23 | 74.8398 | 17.22 |
| 13 | 4 | 4 | 2 | 76.3177 | 18.68 | 76.0826 | 11.69 |
| 14 | 6 | 2 | 0 | 81.2397 | 6.12 | 81.0299 | 4.42 |
| 15 | 5 | 3 | 3 | 84.9269 | 5.11 | 84.6614 | 5.16 |
| 16 | 6 | 2 | 2 | 86.1455 | 2.02 | 85.8526 | 2.00 |

Table 9 shows the hkl, 2Theta and intensity values for a cubic dodecaboride alloy of the formula $Zr_{1-x}Sc_xB_{12}$. X-ray powder diffractograms of $Zr_{1-x}Sc_xB_{12}$ are shown in FIG. 2.

TABLE 9

| | | | | $Zr_{0.95}Sc_{0.05}B_{12}$ | | $Zr_{0.75}Sc_{0.25}B_{12}$ | | $Zr_{0.50}Sc_{0.50}B_{12}$ | |
|---|---|---|---|---|---|---|---|---|---|
| # | h | k | l | $2\Theta°$ | $I_{rel}$ (%) | $2\Theta°$ | $I_{rel}$ (%) | $2\Theta°$ | $I_{rel}$ (%) |
| 1 | 1 | 1 | 1 | 20.7178 | 58.46 | 20.7398 | 85.98 | 20.7361 | 57.70 |
| 2 | 2 | 0 | 0 | 23.9943 | 93.95 | 23.9757 | 85.23 | 23.9854 | 69.11 |
| 3 | 2 | 2 | 0 | 34.1912 | 31.37 | 34.1908 | 25.12 | 34.2016 | 24.02 |
| 4 | 3 | 1 | 1 | 40.3082 | 100.00 | 40.3168 | 100.00 | 40.3385 | 100.00 |
| 5 | 2 | 2 | 2 | 42.1836 | 22.92 | 42.1884 | 36.65 | 42.2354 | 26.93 |
| 6 | 4 | 0 | 0 | 49.1145 | 11.95 | 49.1069 | 9.17 | 49.1542 | 6.04 |
| 7 | 3 | 3 | 1 | 53.8591 | 23.18 | 53.8572 | 25.82 | 53.8745 | 14.22 |
| 8 | 4 | 2 | 0 | 55.3704 | 14.53 | 55.3652 | 13.17 | 55.3818 | 6.77 |
| 9 | 4 | 2 | 2 | 61.1900 | 27.28 | 61.1908 | 20.34 | 61.2867 | 15.71 |
| 10 | 5 | 1 | 1 | 65.4171 | 7.55 | 65.3704 | 6.57 | 65.4610 | 4.79 |
| 11 | 4 | 4 | 0 | 72.1084 | 2.43 | 72.1090 | 1.86 | 72.0250 | 0.89 |
| 12 | 5 | 3 | 1 | 75.8802 | 19.46 | 75.8806 | 26.93 | 75.8868 | 12.03 |
| 13 | 4 | 4 | 2 | 77.1615 | 18.47 | 77.1456 | 14.45 | 77.1449 | 7.27 |
| 14 | 6 | 2 | 0 | 77.3937 | 10.51 | 77.3910 | 7.38 | 82.0000 | 0.89 |
| 15 | 5 | 3 | 3 | 82.2883 | 3.16 | 82.1628 | 4.53 | 85.9550 | 1.06 |
| 16 | 6 | 2 | 2 | 85.9958 | 2.58 | 85.8891 | 3.36 | 87.4250 | 0.45 |

| | | | | $Zr_{0.25}Sc_{0.75}B_{12}$ | | $Zr_{0.20}Sc_{0.80}B_{12}$ | | $Zr_{0.15}Sc_{0.85}B_{12}$ | |
|---|---|---|---|---|---|---|---|---|---|
| # | h | k | l | $2\Theta°$ | $I_{rel}$ (%) | $2\Theta°$ | $I_{rel}$ (%) | $2\Theta°$ | $I_{rel}$ (%) |
| 1 | 1 | 1 | 1 | 20.7626 | 44.77 | 20.7630 | 43.33 | 20.7648 | 48.83 |
| 2 | 2 | 0 | 0 | 24.0221 | 49.49 | 24.0289 | 68.73 | 24.0413 | 70.87 |
| 3 | 2 | 2 | 0 | 34.2209 | 16.61 | 34.2293 | 18.19 | 34.2271 | 16.89 |
| 4 | 3 | 1 | 1 | 40.3772 | 100.00 | 40.3784 | 100.00 | 40.3824 | 100.00 |

TABLE 9-continued

| | | | | | | | | | |
|---|---|---|---|---|---|---|---|---|---|
| 5 | 2 | 2 | 2 | 42.2572 | 25.52 | 42.2533 | 29.31 | 42.2827 | 37.10 |
| 6 | 4 | 0 | 0 | 49.3728 | 3.66 | 49.5156 | 3.62 | 49.4817 | 6.04 |
| 7 | 3 | 3 | 1 | 53.9280 | 18.53 | 53.9717 | 16.72 | 53.9719 | 20.02 |
| 8 | 4 | 2 | 0 | 55.4717 | 7.39 | 55.5050 | 31.28 | 55.5050 | 23.59 |
| 9 | 4 | 2 | 2 | 61.2527 | 14.18 | 61.3084 | 16.90 | 61.3268 | 20.89 |
| 10 | 5 | 1 | 1 | 65.1090 | 3.08 | 65.1321 | 2.84 | 65.0131 | 4.84 |
| 11 | 4 | 4 | 0 | 72.2350 | 1.38 | 72.0628 | 6.45 | 72.2350 | 18.08 |
| 12 | 5 | 3 | 1 | 75.9964 | 13.67 | 75.9738 | 12.33 | 75.9878 | 13.78 |
| 13 | 4 | 4 | 2 | 77.2635 | 9.98 | 77.3572 | 5.72 | 77.2838 | 10.53 |
| 14 | 6 | 2 | 0 | 82.5950 | 0.75 | | | | |
| 15 | 5 | 3 | 3 | 85.9833 | 2.19 | | | | |
| 16 | 6 | 2 | 2 | | | | | | |

Table 10 shows the hkl, 2Theta and intensity values for a tetragonal dodecaboride alloy of the formula X-ray powder diffractograms of $Zr_{1-x}Sc_xB_{12}$ are shown in FIG. 2.

TABLE 10

| | | | | $Zr_{0.10}Sc_{0.90}B_{12}$ | | $Zr_{0.05}Sc_{0.95}B_{12}$ | |
|---|---|---|---|---|---|---|---|
| No. | h | k | l | 2Θ° | $I_{rel}$ (%) | 2Θ° | $I_{rel}$ (%) |
| 1 | 1 | 0 | 1 | 20.7899 | 29.49 | 20.7772 | 31.36 |
| 2 | 1 | 1 | 0 | 23.8350 | 44.55 | 23.8350 | 49.04 |
| 3 | 0 | 0 | 2 | 24.0564 | 54.16 | 24.0513 | 70.20 |
| 4 | 2 | 0 | 0 | 34.2377 | 11.90 | 33.9100 | 6.69 |
| 5 | 1 | 1 | 2 | 34.5400 | 7.24 | 34.2402 | 11.58 |
| 6 | 2 | 1 | 1 | 40.4064 | 100.00 | 40.3898 | 100.00 |
| 7 | 1 | 0 | 3 | 40.7377 | 10.13 | 40.7000 | 28.20 |
| 8 | 2 | 0 | 2 | 42.2998 | 23.22 | 42.2791 | 35.66 |
| 9 | 2 | 2 | 0 | 49.3360 | 6.21 | 49.3193 | 8.80 |

TABLE 10-continued

| | | | | $Zr_{0.10}Sc_{0.90}B_{12}$ | | $Zr_{0.05}Sc_{0.95}B_{12}$ | |
|---|---|---|---|---|---|---|---|
| No. | h | k | l | 2Θ° | $I_{rel}$ (%) | 2Θ° | $I_{rel}$ (%) |
| 10 | 0 | 0 | 4 | 49.4133 | 14.18 | 49.6600 | 9.44 |
| 11 | 3 | 0 | 1 | 54.0191 | 15.30 | 53.6500 | 8.57 |
| 12 | 2 | 1 | 3 | 54.3280 | 12.89 | 54.0017 | 13.96 |
| 13 | 3 | 1 | 0 | 55.0850 | 10.11 | 55.2600 | 0.96 |
| 14 | 2 | 2 | 2 | 55.2961 | 8.18 | 55.5413 | 10.74 |
| 15 | 1 | 1 | 4 | 55.5050 | 12.19 | 56.0454 | 6.90 |
| 16 | 3 | 1 | 2 | 61.3601 | 16.07 | 61.3731 | 15.03 |
| 17 | 2 | 0 | 4 | 61.7989 | 7.05 | 61.8050 | 6.29 |
| 18 | 3 | 2 | 1 | 65.0957 | 4.68 | 65.2700 | 8.15 |
| 19 | 3 | 0 | 3 | 65.5681 | 12.43 | 65.7882 | 6.16 |

Table 11 shows the hkl, 2Theta and intensity values for a cubic dodecaboride alloy of the formula $Y_{1-x}Sc_xB_{12}$. X-ray powder diffractograms of $Y_{1-x}Sc_xB_{12}$ are shown in FIG. 3.

TABLE 11

| | | | | $Y_{0.95}Sc_{0.05}B_{12}$ | | $Y_{0.75}Sc_{0.25}B_{12}$ | | $Y_{0.50}Sc_{0.50}B_{12}$ | |
|---|---|---|---|---|---|---|---|---|---|
| # | h | k | l | 2Θ° | $I_{rel}$ (%) | 2Θ° | $I_{rel}$ (%) | 2Θ° | $I_{rel}$ (%) |
| 1 | 1 | 1 | 1 | 20.4964 | 58.91 | 20.5313 | 24.38 | 20.5203 | 57.33 |
| 2 | 2 | 0 | 0 | 23.6981 | 69.81 | 23.7549 | 28.92 | 23.7511 | 67.95 |
| 3 | 2 | 2 | 0 | 33.7648 | 26.79 | 33.8449 | 9.91 | 33.8601 | 23.15 |
| 4 | 3 | 1 | 1 | 39.8090 | 100.00 | 39.9113 | 52.32 | 39.9198 | 100.00 |
| 5 | 2 | 2 | 2 | 41.6500 | 31.96 | 41.8200 | 100.00 | 41.7777 | 30.08 |
| 6 | 4 | 0 | 0 | 48.4679 | 10.35 | 48.6098 | 3.31 | 48.6623 | 7.08 |
| 7 | 3 | 3 | 1 | 53.1722 | 22.19 | 53.3092 | 9.14 | 53.3144 | 20.98 |
| 8 | 4 | 2 | 0 | 54.6635 | 12.91 | 54.8020 | 4.65 | 54.8313 | 10.35 |
| 9 | 4 | 2 | 2 | 60.3876 | 22.63 | 60.5436 | 9.69 | 60.6240 | 17.76 |
| 10 | 5 | 1 | 1 | 64.4640 | 8.20 | 64.6994 | 2.10 | 64.7165 | 6.65 |
| 11 | 4 | 4 | 0 | 71.0483 | 3.13 | 71.2645 | 0.94 | 71.2974 | 2.12 |
| 12 | 5 | 3 | 1 | 74.7960 | 20.36 | 75.0107 | 8.10 | 75.0668 | 17.48 |
| 13 | 4 | 4 | 2 | 76.0474 | 14.68 | 76.2729 | 6.06 | 76.3554 | 10.94 |
| 14 | 6 | 2 | 0 | 80.9737 | 4.60 | 81.3056 | 1.28 | 81.2300 | 5.22 |
| 15 | 5 | 3 | 3 | 84.6176 | 3.89 | 84.8937 | 0.74 | 85.0192 | 2.50 |
| 16 | 6 | 2 | 2 | 85.8930 | 1.54 | | | | |

| | | | | $Zr_{0.25}Sc_{0.75}B_{12}$ | | $Zr_{0.20}Sc_{0.80}B_{12}$ | | $Zr_{0.15}Sc_{0.85}B_{12}$ | |
|---|---|---|---|---|---|---|---|---|---|
| # | h | k | l | 2Θ° | $I_{rel}$ (%) | 2Θ° | $I_{rel}$ (%) | 2Θ° | $I_{rel}$ (%) |
| 1 | 1 | 1 | 1 | 20.6260 | 36.04 | 20.6223 | 43.59 | 20.6693 | 46.39 |
| 2 | 2 | 0 | 0 | 23.8742 | 59.79 | 23.8791 | 73.79 | 23.8890 | 76.43 |
| 3 | 2 | 2 | 0 | 34.0158 | 13.77 | 34.0136 | 16.58 | 34.0796 | 13.94 |
| 4 | 3 | 1 | 1 | 40.0964 | 100.00 | 40.0985 | 100.00 | 40.1674 | 100.00 |
| 5 | 2 | 2 | 2 | 41.9741 | 21.08 | 41.9675 | 30.89 | 42.0556 | 31.36 |
| 6 | 4 | 0 | 0 | 48.8722 | 6.71 | 48.8909 | 7.82 | 48.9411 | 7.33 |
| 7 | 3 | 3 | 1 | 53.5244 | 13.88 | 53.5698 | 17.62 | 53.6881 | 12.43 |
| 8 | 4 | 2 | 0 | 55.0798 | 8.18 | 55.0734 | 7.11 | 55.1616 | 5.71 |
| 9 | 4 | 2 | 2 | 60.8667 | 16.75 | 60.8407 | 18.16 | 60.9368 | 17.02 |
| 10 | 5 | 1 | 1 | 64.9627 | 4.05 | 64.8644 | 4.90 | 65.0012 | 3.82 |
| 11 | 4 | 4 | 0 | 71.5700 | 1.42 | 71.5206 | 5.16 | 71.5700 | 1.17 |
| 12 | 5 | 3 | 1 | 75.4180 | 14.93 | 75.3873 | 11.57 | 75.5552 | 12.63 |
| 13 | 4 | 4 | 2 | 76.6782 | 12.64 | 76.6810 | 11.11 | 76.8241 | 12.74 |

TABLE 11-continued

| | | | | | | | |
|---|---|---|---|---|---|---|---|
| 14 | 6 | 2 | 0 | 81.4400 | 0.69 | 81.5800 | 1.52 |
| 15 | 5 | 3 | 3 | 85.2900 | 1.02 | 85.3950 | 2.11 |
| 16 | 6 | 2 | 2 | | | | |

Table 12 shows the hkl, 2Theta and intensity values for a tetragonal dodecaboride alloy of the formula $Y_{1-x}Sc_xB_{12}$. X-ray powder diffractograms of $Y_{1-x}Sc_xB_{12}$ are shown in FIG. 3.

TABLE 12

| | | | | $Y_{0.10}Sc_{0.90}B_{12}$ | | $Y_{0.05}Sc_{0.95}B_{12}$ | |
|---|---|---|---|---|---|---|---|
| No. | h | k | l | 2Θ° | $I_{rel}$ (%) | 2Θ° | $I_{rel}$ (%) |
| 1 | 1 | 0 | 1 | 20.6812 | 41.26 | 20.7148 | 41.80 |
| 2 | 1 | 1 | 0 | 23.5581 | 11.32 | 23.9050 | 81.86 |
| 3 | 0 | 0 | 2 | 23.9516 | 55.72 | 24.2200 | 37.24 |
| 4 | 2 | 0 | 0 | 33.7700 | 5.68 | 33.8900 | 8.78 |
| 5 | 1 | 1 | 2 | 34.1744 | 11.65 | 34.1939 | 20.50 |
| 6 | 2 | 1 | 1 | 40.2395 | 100.00 | 40.3298 | 100.00 |
| 7 | 1 | 0 | 3 | 40.5600 | 21.25 | 40.6726 | 17.35 |
| 8 | 2 | 0 | 2 | 42.1047 | 32.41 | 42.2141 | 42.34 |
| 9 | 2 | 2 | 0 | 49.0650 | 15.93 | 49.1700 | 28.96 |
| 10 | 0 | 0 | 4 | 49.4813 | 13.99 | 49.4740 | 24.64 |
| 11 | 3 | 0 | 1 | 52.9850 | 12.70 | 53.9185 | 15.60 |
| 12 | 2 | 1 | 3 | 53.7835 | 16.46 | 54.3885 | 22.43 |
| 13 | 3 | 1 | 0 | 54.7227 | 6.22 | 55.3699 | 13.83 |
| 14 | 2 | 2 | 2 | 55.2600 | 11.79 | 55.7155 | 10.26 |
| 15 | 1 | 1 | 4 | 55.6966 | 5.79 | 55.8742 | 11.52 |
| 16 | 3 | 1 | 2 | 61.0459 | 18.75 | 61.2640 | 16.93 |
| 17 | 2 | 0 | 4 | 61.4550 | 10.68 | 61.3500 | 31.17 |
| 18 | 3 | 2 | 1 | 64.9498 | 4.16 | 65.2267 | 11.14 |
| 19 | 3 | 0 | 3 | 65.3774 | 8.52 | 65.5369 | 14.65 |

Table 13 shows the hkl, 2Theta and intensity values for a cubic dodecaboride alloy of the formula $Zr_{1-x}Gd_xB_{12}$. X-ray powder diffractograms of $Zr_{1-x}Gd_xB_{12}$ are shown in FIG. 4.

TABLE 13

| | | | | $Zr_{0.95}Gd_{0.05}B_{12}$ | | $Zr_{0.75}Gd_{0.25}B_{12}$ | | $Zr_{0.50}Gd_{0.50}B_{12}$ | |
|---|---|---|---|---|---|---|---|---|---|
| # | h | k | l | 2Θ° | $I_{rel}$ (%) | 2Θ° | $I_{rel}$ (%) | 2Θ° | $I_{rel}$ (%) |
| 1 | 1 | 1 | 1 | 20.7399 | 95.93 | 20.6788 | 87.10 | 20.6085 | 93.87 |
| 2 | 2 | 0 | 0 | 24.0003 | 85.05 | 23.9010 | 73.41 | 23.8416 | 83.62 |
| 3 | 2 | 2 | 0 | 34.1848 | 29.59 | 34.0788 | 32.10 | 33.9797 | 41.84 |
| 4 | 3 | 1 | 1 | 40.3161 | 100.00 | 40.1971 | 100.00 | 40.0610 | 100.00 |
| 5 | 2 | 2 | 2 | 42.1798 | 35.81 | 42.0875 | 31.49 | 41.9272 | 43.00 |
| 6 | 4 | 0 | 0 | 49.1039 | 10.79 | 48.9955 | 7.29 | 48.7397 | 11.55 |
| 7 | 3 | 3 | 1 | 53.8340 | 20.77 | 53.6851 | 26.60 | 53.5045 | 23.29 |
| 8 | 4 | 2 | 0 | 55.3630 | 11.94 | 55.2286 | 13.31 | 55.0078 | 13.05 |
| 9 | 4 | 2 | 2 | 61.1759 | 22.15 | 61.0029 | 23.17 | 60.7900 | 34.39 |
| 10 | 5 | 1 | 1 | 65.3611 | 8.13 | 65.1884 | 10.34 | 64.9650 | 7.17 |
| 11 | 4 | 4 | 0 | 72.0117 | 2.51 | 71.7155 | 9.94 | 71.4914 | 13.80 |
| 12 | 5 | 3 | 1 | 75.8327 | 14.63 | 75.5956 | 16.24 | 75.3063 | 28.32 |
| 13 | 4 | 4 | 2 | 76.0695 | 7.55 | 76.8649 | 13.25 | 76.5720 | 23.79 |
| 14 | 6 | 2 | 0 | 77.1034 | 12.00 | 77.0441 | 12.19 | 81.5100 | 5.09 |
| 15 | 5 | 3 | 3 | 82.1064 | 2.63 | 81.8641 | 2.97 | 85.1850 | 4.84 |
| 16 | 6 | 2 | 2 | 85.8590 | 2.35 | 85.6050 | 1.97 | 86.5150 | 2.00 |

| | | | | $Zr_{0.55}Gd_{0.45}B_{12}$ | | $Zr_{0.65}Gd_{0.35}B_{12}$ | |
|---|---|---|---|---|---|---|---|
| # | h | k | l | 2Θ° | $I_{rel}$ (%) | 2Θ° | $I_{rel}$ (%) |
| 1 | 1 | 1 | 1 | 20.6071 | 83.86 | 20.6387 | 100.00 |
| 2 | 2 | 0 | 0 | 23.8274 | 100.00 | 23.8697 | 65.41 |
| 3 | 2 | 2 | 0 | 33.9574 | 42.05 | 34.0230 | 38.09 |
| 4 | 3 | 1 | 1 | 40.0382 | 95.84 | 40.1173 | 97.72 |
| 5 | 2 | 2 | 2 | 41.8981 | 24.82 | 42.0336 | 32.66 |
| 6 | 4 | 0 | 0 | 48.8118 | 9.80 | 53.6360 | 19.07 |
| 7 | 3 | 3 | 1 | 53.4668 | 26.08 | 54.6538 | 72.77 |
| 8 | 4 | 2 | 0 | 54.9771 | 18.14 | 60.8403 | 22.59 |
| 9 | 4 | 2 | 2 | 60.7139 | 21.08 | 65.2000 | 35.84 |
| 10 | 5 | 1 | 1 | 64.8691 | 10.12 | 71.6913 | 36.39 |
| 11 | 4 | 4 | 0 | 71.6400 | 14.96 | 75.4766 | 15.27 |
| 12 | 5 | 3 | 1 | 75.2413 | 28.80 | 76.7779 | 15.57 |
| 13 | 4 | 4 | 2 | 76.4965 | 21.71 | | |
| 14 | 6 | 2 | 0 | 81.6850 | 4.64 | | |
| 15 | 5 | 3 | 3 | | | | |
| 16 | 6 | 2 | 2 | | | | |

Table 14 shows the hkl, 2Theta and intensity values for a cubic dodecaboride alloy of the formula $Zr_{1-x}Sm_xB_{12}$. X-ray powder diffractograms of $Zr_{1-x}Sm_xB_{12}$ are shown in FIG. 5.

TABLE 14

| | | | | $Zr_{0.95}Sm_{0.05}B_{12}$ | | $Zr_{0.75}Sm_{0.25}B_{12}$ | | $Zr_{0.70}Sm_{0.30}B_{12}$ | |
|---|---|---|---|---|---|---|---|---|---|
| # | h | k | l | $2\Theta°$ | $I_{rel}$ (%) | $2\Theta°$ | $I_{rel}$ (%) | $2\Theta°$ | $I_{rel}$ (%) |
| 1 | 1 | 1 | 1 | 20.7436 | 85.19 | 20.7049 | 87.59 | 20.7140 | 76.55 |
| 2 | 2 | 0 | 0 | 23.9854 | 77.80 | 23.9708 | 72.65 | 23.9607 | 84.46 |
| 3 | 2 | 2 | 0 | 34.1869 | 31.82 | 34.1242 | 32.90 | 34.1286 | 23.74 |
| 4 | 3 | 1 | 1 | 40.3040 | 100.00 | 40.2444 | 100.00 | 40.2499 | 100.00 |
| 5 | 2 | 2 | 2 | 42.1811 | 34.25 | 42.1192 | 32.38 | 42.1361 | 26.58 |
| 6 | 4 | 0 | 0 | 49.1089 | 9.97 | 49.2909 | 21.98 | 49.2748 | 27.84 |
| 7 | 3 | 3 | 1 | 53.8419 | 24.99 | 53.7459 | 35.20 | 53.7530 | 22.20 |
| 8 | 4 | 2 | 0 | 55.3619 | 13.12 | 55.2524 | 17.75 | 55.3325 | 12.38 |
| 9 | 4 | 2 | 2 | 61.1938 | 20.73 | 61.0529 | 22.71 | 61.1205 | 15.11 |
| 10 | 5 | 1 | 1 | 65.3383 | 8.49 | 65.2486 | 8.04 | 65.2905 | 6.50 |
| 11 | 4 | 4 | 0 | 72.0605 | 1.86 | 72.2724 | 11.71 | 72.2350 | 17.32 |
| 12 | 5 | 3 | 1 | 75.8377 | 19.15 | 75.6644 | 19.66 | 75.6771 | 17.62 |
| 13 | 4 | 4 | 2 | 77.1195 | 11.80 | 76.9350 | 12.94 | 76.9644 | 10.02 |
| 14 | 6 | 2 | 0 | 82.1043 | 2.24 | 81.7900 | 0.81 | 82.2450 | 1.85 |
| 15 | 5 | 3 | 3 | 85.9068 | 1.15 | 82.1400 | 1.39 | | |
| 16 | 6 | 2 | 2 | 87.1150 | 1.01 | 85.7309 | 2.37 | | |

| | | | | $Zr_{0.50}Sm_{0.50}B_{12}$ | |
|---|---|---|---|---|---|
| # | h | k | l | $2\Theta°$ | $I_{rel}$ (%) |
| 1 | 1 | 1 | 1 | 20.7265 | 83.37 |
| 2 | 2 | 0 | 0 | 23.9744 | 90.90 |
| 3 | 2 | 2 | 0 | 34.1616 | 25.18 |
| 4 | 3 | 1 | 1 | 40.2558 | 92.10 |
| 5 | 2 | 2 | 2 | 42.1358 | 45.35 |
| 6 | 4 | 0 | 0 | 49.2995 | 100.00 |
| 7 | 3 | 3 | 1 | 53.7991 | 25.05 |
| 8 | 4 | 2 | 0 | 55.3094 | 16.46 |
| 9 | 4 | 2 | 2 | 61.1152 | 30.72 |
| 10 | 5 | 1 | 1 | 71.6165 | 14.78 |
| 11 | 4 | 4 | 0 | 75.6890 | 20.49 |
| 12 | 5 | 3 | 1 | 76.1900 | 21.82 |
| 13 | 4 | 4 | 2 | | |
| 14 | 6 | 2 | 0 | | |
| 15 | 5 | 3 | 3 | | |
| 16 | 6 | 2 | 2 | | |

Table 15 shows the hkl, 2Theta and intensity values for a cubic dodecaboride alloy of the formula $Zr_{1-x}Nd_xB_{12}$. X-ray powder diffractograms of $Zr_{1-x}Nd_xB_{12}$ are shown in FIG. 6.

TABLE 15

| | | | | $Zr_{0.95}Nd_{0.05}B_{12}$ | | $Zr_{0.75}Nd_{0.25}B_{12}$ | | $Zr_{0.50}Nd_{0.50}B_{12}$ | |
|---|---|---|---|---|---|---|---|---|---|
| # | h | k | l | $2\Theta°$ | $I_{rel}$ (%) | $2\Theta°$ | $I_{rel}$ (%) | $2\Theta°$ | $I_{rel}$ (%) |
| 1 | 1 | 1 | 1 | 20.7586 | 74.00 | 20.7497 | 83.40 | 20.7456 | 72.77 |
| 2 | 2 | 0 | 0 | 24.0140 | 78.92 | 23.9956 | 87.59 | 24.0122 | 57.89 |
| 3 | 2 | 2 | 0 | 34.1997 | 29.66 | 34.1975 | 33.63 | 34.1936 | 28.35 |
| 4 | 3 | 1 | 1 | 40.3216 | 100.00 | 40.3224 | 100.00 | 40.3400 | 87.05 |
| 5 | 2 | 2 | 2 | 42.2093 | 29.42 | 42.1930 | 37.94 | 42.2002 | 27.22 |
| 6 | 4 | 0 | 0 | 49.1216 | 10.30 | 49.3062 | 31.64 | 49.3139 | 100.00 |
| 7 | 3 | 3 | 1 | 53.8682 | 28.24 | 53.8432 | 23.94 | 53.8959 | 19.68 |
| 8 | 4 | 2 | 0 | 55.3969 | 10.73 | 55.3794 | 12.80 | 55.4135 | 26.69 |
| 9 | 4 | 2 | 2 | 61.2063 | 20.87 | 61.1851 | 25.96 | 61.2281 | 14.60 |
| 10 | 5 | 1 | 1 | 65.3797 | 6.37 | 65.3465 | 7.93 | 65.3098 | 16.94 |
| 11 | 4 | 4 | 0 | 72.0496 | 3.01 | 71.7800 | 0.58 | 72.1300 | 22.45 |
| 12 | 5 | 3 | 1 | 75.8700 | 17.10 | 75.8255 | 19.07 | 76.0967 | 7.76 |
| 13 | 4 | 4 | 2 | 77.1479 | 9.71 | 77.0933 | 12.63 | 77.4150 | 2.87 |
| 14 | 6 | 2 | 0 | 82.2448 | 1.78 | 82.1980 | 2.20 | | |
| 15 | 5 | 3 | 3 | 85.8712 | 2.90 | 84.3800 | 0.53 | | |

Table 16 shows the hkl, 2Theta and intensity values for a cubic dodecaboride alloy of the formula $Zr_{1-x}Pr_xB_{12}$. X-ray powder diffractograms of $Zr_{1-x}Pr_xB_{12}$ are shown in FIG. 7.

TABLE 16

| | | | | $Zr_{0.95}Pr_{0.05}B_{12}$ | | $Zr_{0.75}Pr_{0.25}B_{12}$ | | $Zr_{0.50}Pr_{0.50}B_{12}$ | |
|---|---|---|---|---|---|---|---|---|---|
| # | h | k | l | $2\Theta°$ | $I_{rel}$ (%) | $2\Theta°$ | $I_{rel}$ (%) | $2\Theta°$ | $I_{rel}$ (%) |
| 1 | 1 | 1 | 1 | 20.7375 | 92.84 | 20.7495 | 70.17 | 20.7476 | 64.31 |
| 2 | 2 | 0 | 0 | 24.0010 | 93.37 | 24.0094 | 72.41 | 24.0090 | 49.77 |
| 3 | 2 | 2 | 0 | 34.1815 | 25.89 | 34.2048 | 33.50 | 34.2222 | 17.60 |
| 4 | 3 | 1 | 1 | 40.3346 | 100.00 | 40.3362 | 100.00 | 40.3419 | 72.07 |
| 5 | 2 | 2 | 2 | 42.1989 | 37.76 | 42.2141 | 32.24 | 42.2263 | 29.16 |
| 6 | 4 | 0 | 0 | 49.1034 | 11.12 | 49.2052 | 31.88 | 49.2283 | 100.00 |
| 7 | 3 | 3 | 1 | 53.8531 | 31.81 | 53.8757 | 21.71 | 53.5800 | 1.12 |
| 8 | 4 | 2 | 0 | 55.3989 | 14.05 | 55.4408 | 10.53 | 55.7129 | 9.53 |
| 9 | 4 | 2 | 2 | 61.2026 | 23.30 | 61.2064 | 22.90 | 61.2131 | 13.05 |
| 10 | 5 | 1 | 1 | 65.3592 | 8.08 | 65.4264 | 4.81 | 65.4100 | 21.87 |
| 11 | 4 | 4 | 0 | 72.1605 | 2.68 | 72.1542 | 10.53 | 72.2167 | 24.70 |
| 12 | 5 | 3 | 1 | 75.8634 | 22.19 | 75.8540 | 14.84 | 75.8402 | 18.39 |
| 13 | 4 | 4 | 2 | 77.1447 | 16.97 | 77.1039 | 8.19 | 77.2670 | 15.13 |
| 14 | 6 | 2 | 0 | 82.4289 | 1.84 | 82.0000 | 0.95 | 82.3500 | 1.49 |
| 15 | 5 | 3 | 3 | 85.8500 | 2.39 | | | | |

Figure 14:
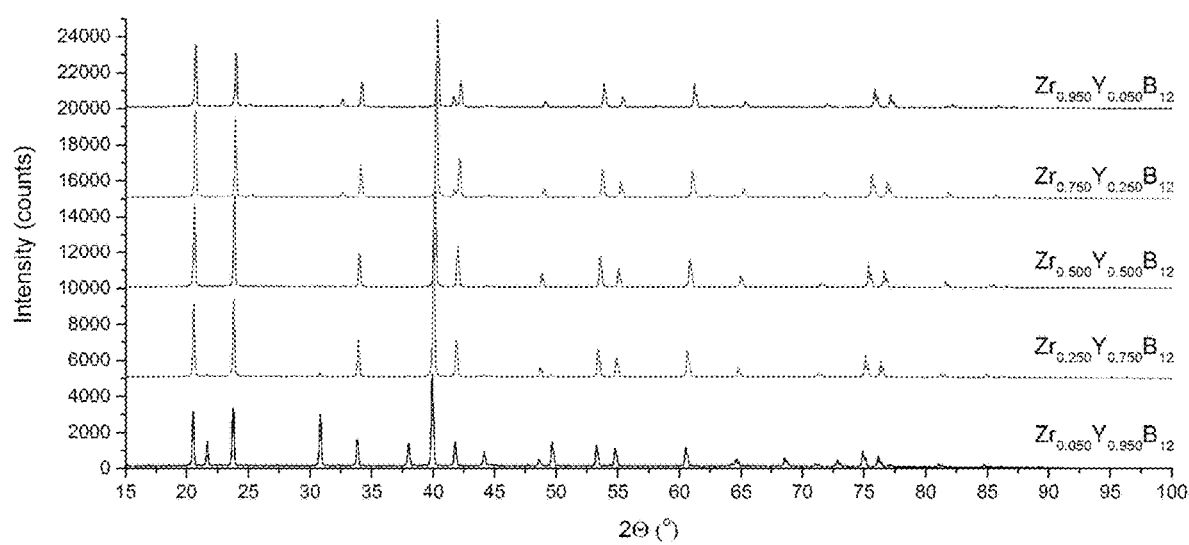
FIG. 14 shows the X-ray powder diffractograms of $Zr_{1-x}Y_xB_{12}$ prepared with a metal to boron ratio of 1:13.

Table 17 shows the hkl, 2Theta and intensity values for a cubic dodecaboride alloy of the formula $Zr_{1-x}Y_xB_{12}$ prepared using a metal to boron ratio of 1 to 13. X-ray powder diffractograms of $Zr_{1-x}Y_xB_{12}$ prepared using a metal to boron ratio of 1 to 13 shown in FIG. 14.

TABLE 17

| | | | | $Zr_{0.95}Y_{0.05}B_{12}$ | | $Zr_{0.75}Y_{0.25}B_{12}$ | | $Zr_{0.50}Y_{0.50}B_{12}$ | |
|---|---|---|---|---|---|---|---|---|---|
| # | h | k | l | $2\Theta°$ | $I_{rel}$ (%) | $2\Theta°$ | $I_{rel}$ (%) | $2\Theta°$ | $I_{rel}$ (%) |
| 1 | 1 | 1 | 1 | 20.7355 | 73.46 | 20.7002 | 71.95 | 20.6212 | 69.98 |
| 2 | 2 | 0 | 0 | 23.9946 | 60.6 | 23.9456 | 65.33 | 23.8571 | 77.65 |
| 3 | 2 | 2 | 0 | 34.1996 | 28.06 | 34.1128 | 25.85 | 33.9807 | 27.32 |
| 4 | 3 | 1 | 1 | 40.3165 | 100 | 40.215 | 100 | 40.075 | 100 |
| 5 | 2 | 2 | 2 | 42.1942 | 28.85 | 42.0944 | 30.99 | 41.9376 | 32.52 |
| 6 | 4 | 0 | 0 | 49.1008 | 6.89 | 48.9676 | 6.71 | 48.8143 | 10.82 |
| 7 | 3 | 3 | 1 | 53.8424 | 27.08 | 53.7116 | 21.46 | 53.5215 | 25.2 |
| 8 | 4 | 2 | 0 | 55.3707 | 12.53 | 55.2221 | 12.41 | 55.0229 | 15.1 |
| 9 | 4 | 2 | 2 | 61.1854 | 26.71 | 61.0171 | 21.66 | 60.809 | 23.52 |
| 10 | 5 | 1 | 1 | 65.3368 | 8.26 | 65.1641 | 6.72 | 64.9404 | 9.71 |
| 11 | 4 | 4 | 0 | 72.0002 | 3.37 | 71.772 | 3.03 | 71.5162 | 2.87 |
| 12 | 5 | 3 | 1 | 75.8539 | 21.49 | 75.6176 | 18.01 | 75.3481 | 19.97 |
| 13 | 4 | 4 | 2 | 76.0955 | 11.12 | 75.8566 | 9.18 | 76.6094 | 15.09 |
| 14 | 6 | 2 | 0 | 77.1219 | 14.7 | 76.8815 | 12.12 | 81.5983 | 4.52 |
| 15 | 5 | 3 | 3 | 82.1404 | 4.03 | 81.8827 | 4.27 | 81.8414 | 2.29 |
| 16 | 6 | 2 | 2 | 85.871 | 2.66 | 85.6007 | 2.79 | 85.5583 | 1.55 |

| | | | | $Zr_{0.25}Y_{0.75}B_{12}$ | | $Zr_{0.05}Y_{0.95}B_{12}$ | |
|---|---|---|---|---|---|---|---|
| # | h | k | l | $2\Theta°$ | $I_{rel}$ (%) | $2\Theta°$ | $I_{rel}$ (%) |
| 1 | 1 | 1 | 1 | 20.5795 | 52.79 | 20.5188 | 61.69 |
| 2 | 2 | 0 | 0 | 23.8051 | 56.88 | 23.7555 | 65.07 |
| 3 | 2 | 2 | 0 | 33.9166 | 26.82 | 33.8219 | 29.93 |
| 4 | 3 | 1 | 1 | 39.9739 | 100 | 39.8751 | 100 |
| 5 | 2 | 2 | 2 | 41.8384 | 26.55 | 41.726 | 26.86 |
| 6 | 4 | 0 | 0 | 48.6771 | 6.93 | 48.5698 | 7.06 |
| 7 | 3 | 3 | 1 | 53.3717 | 19.66 | 53.2352 | 22.3 |
| 8 | 4 | 2 | 0 | 54.8634 | 13.03 | 54.7391 | 18.77 |
| 9 | 4 | 2 | 2 | 60.6127 | 18.23 | 60.4644 | 20.74 |
| 10 | 5 | 1 | 1 | 64.7274 | 6.11 | 64.5777 | 7.42 |
| 11 | 4 | 4 | 0 | 71.2913 | 2.97 | 71.1007 | 2.69 |
| 12 | 5 | 3 | 1 | 75.0889 | 16.1 | 74.8923 | 16.5 |
| 13 | 4 | 4 | 2 | 75.3243 | 8.28 | 76.1436 | 10.82 |
| 14 | 6 | 2 | 0 | 76.3386 | 10.86 | 76.3831 | 5.71 |
| 15 | 5 | 3 | 3 | 81.2894 | 3.03 | 81.0903 | 3.84 |
| 16 | 6 | 2 | 2 | 84.9457 | 2.19 | 84.7505 | 2.73 |

Example 2. Hardness Determination

The hardness of each sample was determined using a MicroMet 2103 Vickers microhardness tester (Buehler Ltd, U.S.A.). Fifteen indents of the following force loading were made in random areas of the sample: 0.49, 0.98, 1.96, 2.94 and 4.9 N (low to high, respectively). The length of the diagonals were measured using a high resolution optical microscope (Zeiss Axiotech 100HD, Carl Zeiss Vision GmbH, Germany) with 500× magnification, and Vickers hardness was calculated using Equation 1:

$$H_v = \frac{1854.4F}{a^2} \quad (1)$$

where F is the loading force applied in Newton (N) and a is the average of the length of the two diagonals of each indent in micrometers.

Figure 8:
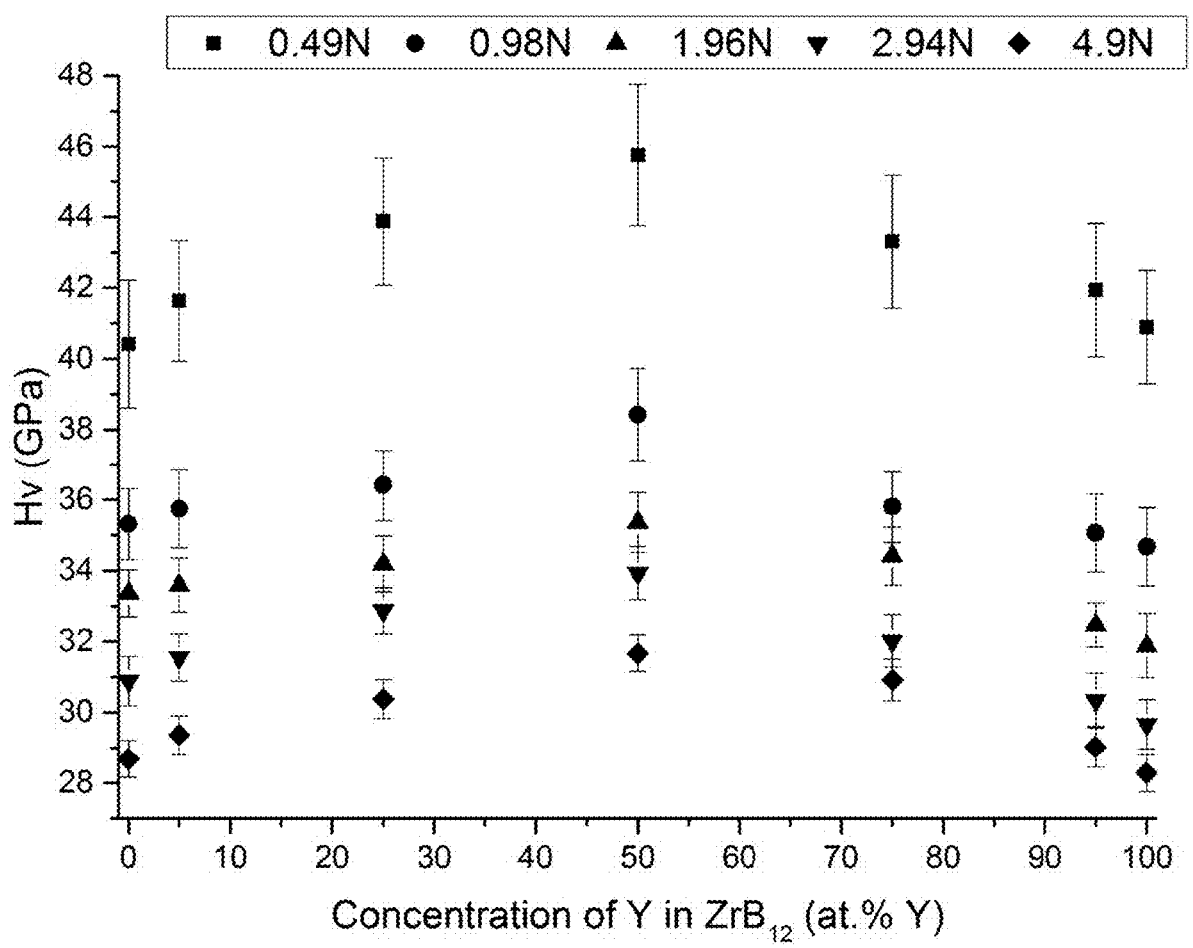
FIG. 8 shows measurements of Vickers microindentation hardness of $Zr_{1-x}Y_xB_{12}$.

Measurements of Vickers microindentation hardness of $Zr_{1-x}Y_xB_{12}$ are shown in FIG. 8.

Figure 9:
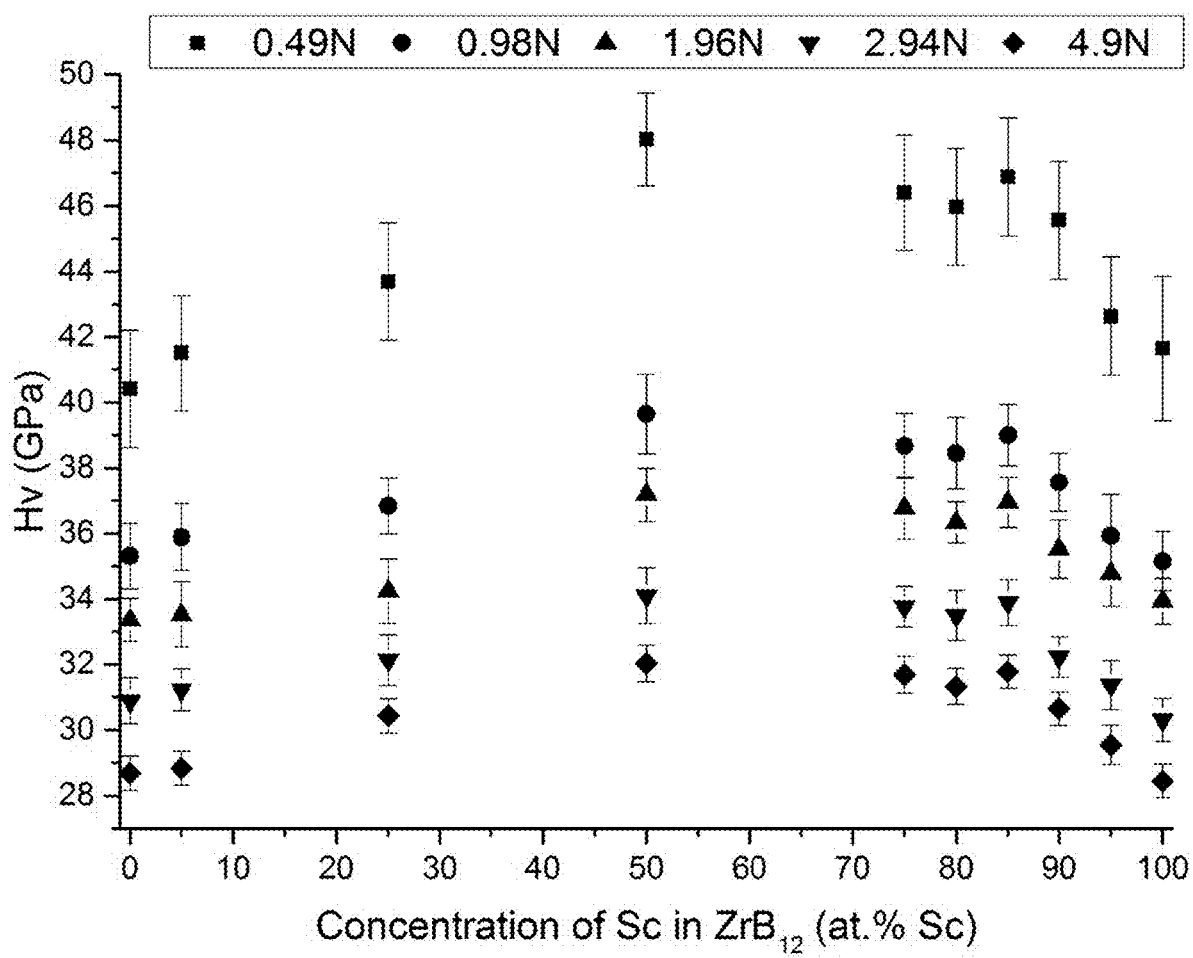
FIG. 9 shows measurements of Vickers microindentation hardness of $Zr_{1-x}Sc_xB_{12}$.

Measurements of Vickers microindentation hardness of $Zr_{1-x}Sc_xB_{12}$ are shown in FIG. 9.

Figure 10:
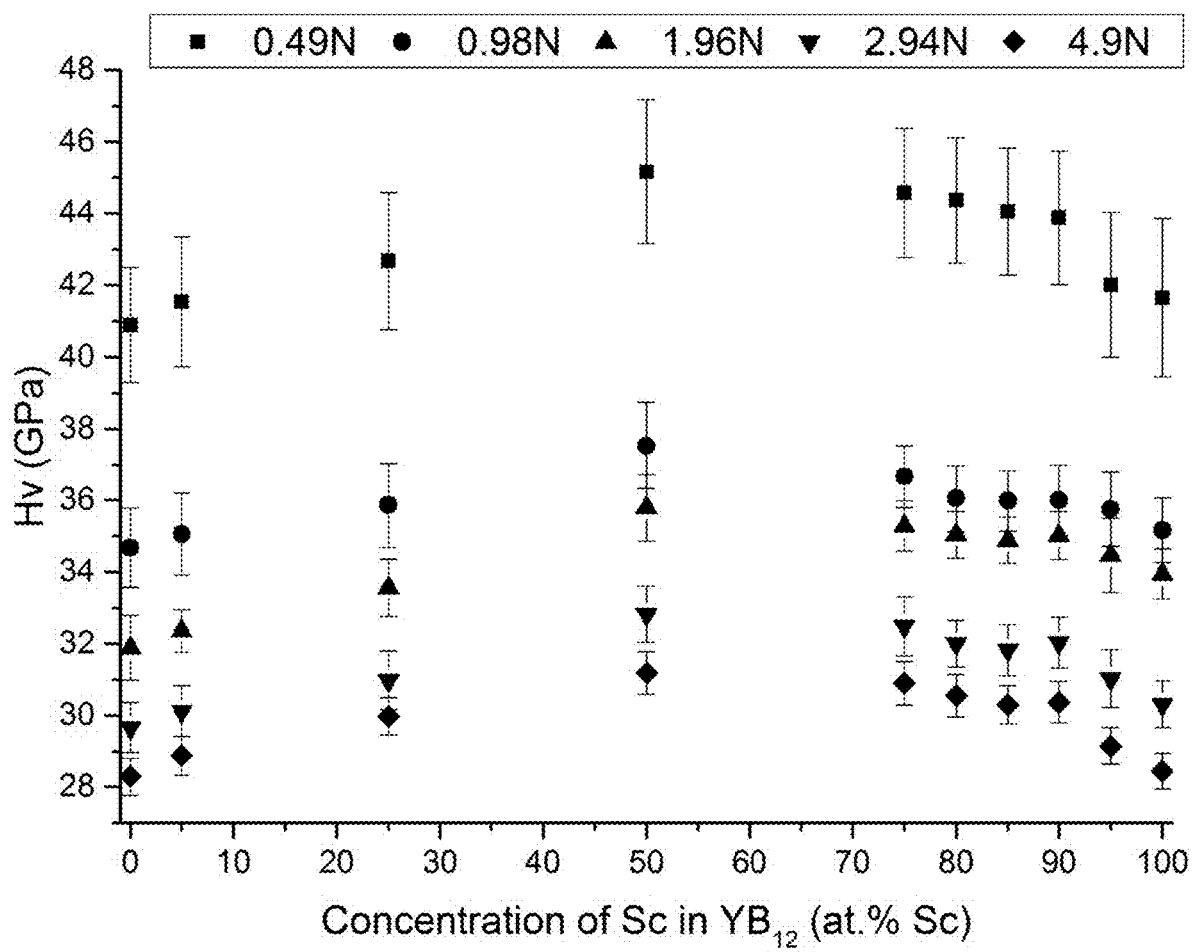
FIG. 10 shows measurements of Vickers microindentation hardness of $Y_{1-x}Sc_xB_{12}$.

Measurements of Vickers microindentation hardness of $Y_{1-x}Sc_xB_{12}$ are shown in FIG. 10.

Figure 11:
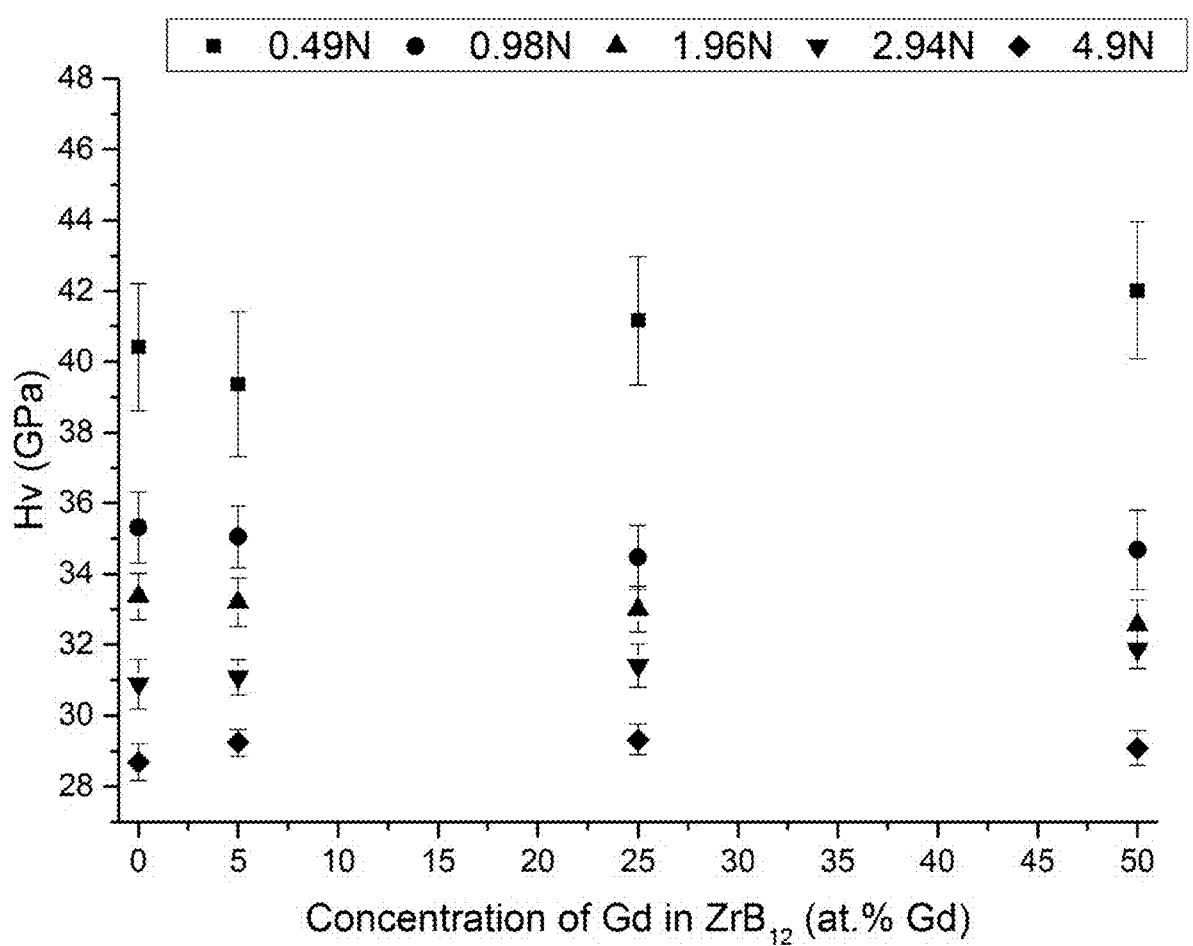
FIG. 11 shows measurements of Vickers microindentation hardness of $Zr_{1-x}Gd_xB_{12}$.

Measurements of Vickers microindentation hardness of $Zr_{1-x}Gd_xB_{12}$ are shown in FIG. 11.

Example 3. Oxidation Resistance

Oxidation resistance was determined via thermogravimetric analysis utilizing a Pyris Diamond TGA/DTA unit (TG-DTA, Perkin-Elmer Instruments, U.S.A.). The following heating/cooling profile was used: heating in air from 25 to 200° C. (at 20° C./min), holding at 200° C. for 30 minutes, heating from 200 to 1000° C. (at 2° C./min), holding at 1000° C. for 120 minutes, cooling 1000 to 25° C. (at 5° C./min).

Figure 12:
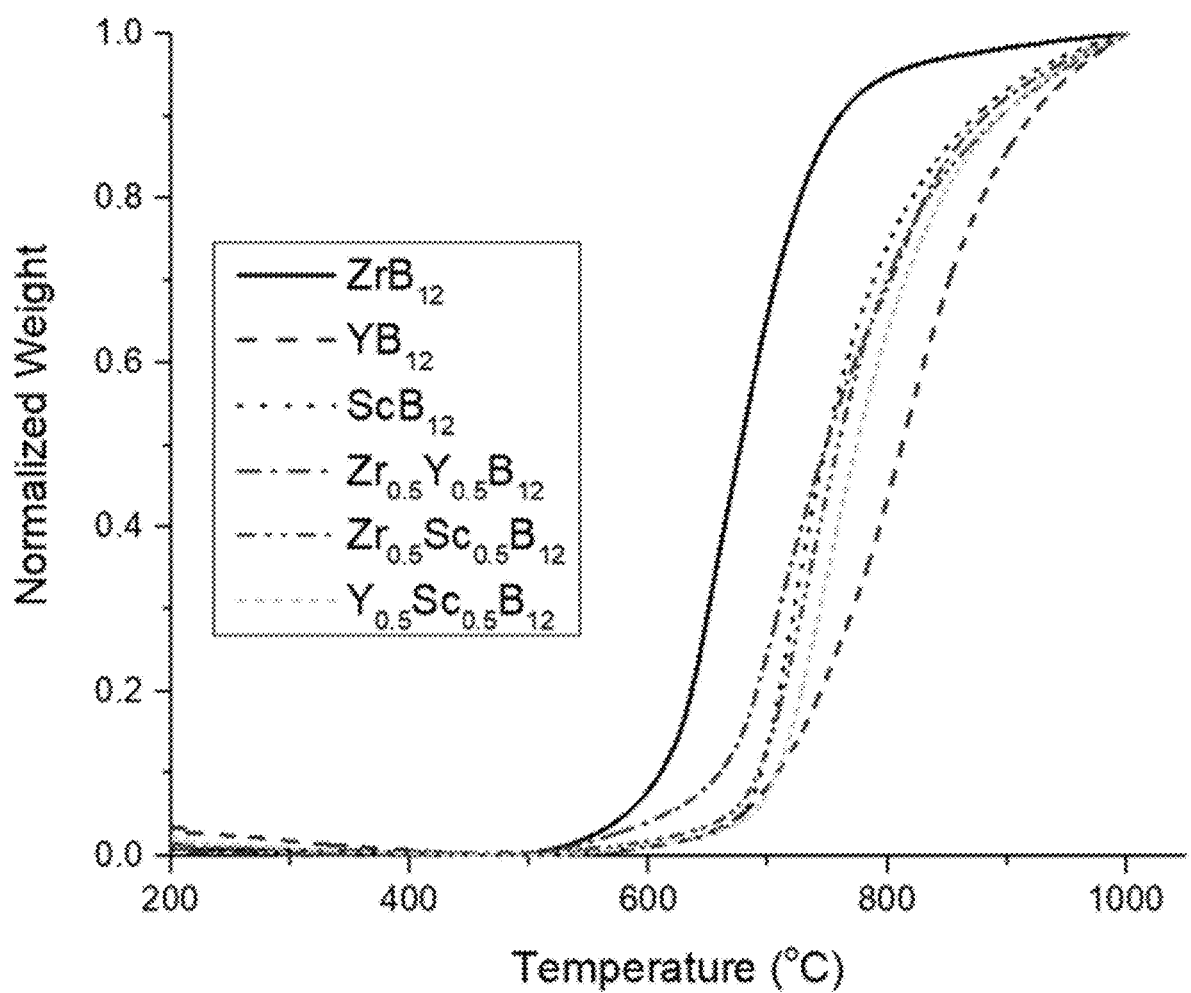
FIG. 12 shows the thermal stability of $Zr_{0.5}Y_{0.5}B_{12}$, $Zr_{0.5}Sc_{0.5}B_{12}$, and $Y_{0.5}Sc_{0.5}B_{12}$ as measured by thermal gravimetric analysis in air.

FIG. 12 shows the thermal stability of pure $ZrB_{12}$, $YB_{12}$ and $ScB_{12}$ and the hardest solid solutions of mixed metal dodecaborides as measured by thermal gravimetric analysis in air. These data show that $Zr_{0.5}Y_{0.5}B_{12}$, $Zr_{0.5}Sc_{0.5}B_{12}$ and $Y_{0.5}Sc_{0.5}B_{12}$ are stable up to ~630° C., ~685° C. and ~695° C., respectively (using the extrapolated oxidation onset), compared to ~610° C. for pure $ZrB_{12}$, ~715° C. for pure $YB_{12}$ and ~685° C. pure $ScB_{12}$.

Figure 13:
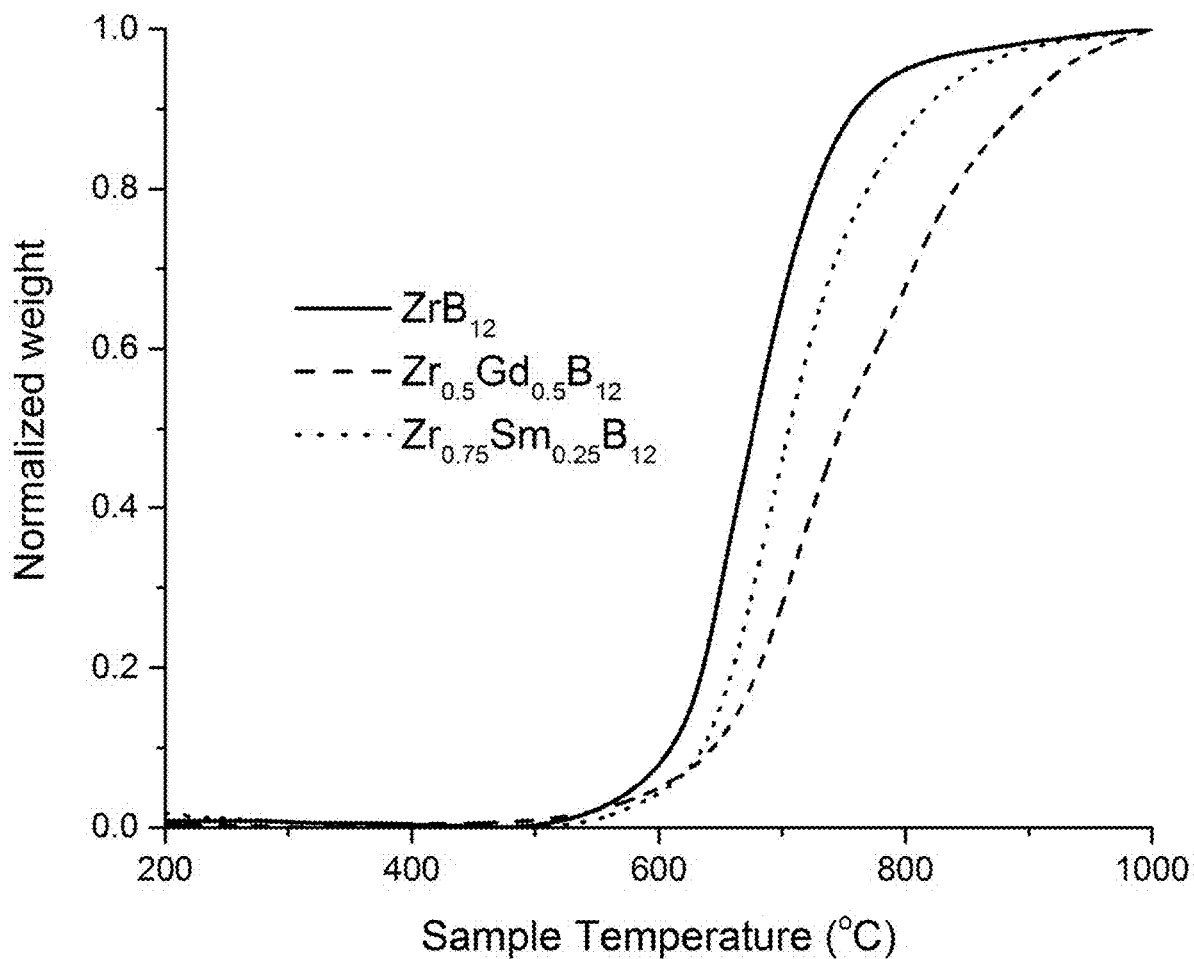
FIG. 13 shows the thermal stability of pure $Zr_{0.5}Gd_{0.5}B_{12}$ and $Zr_{0.75}Sm_{0.25}B_{12}$ as measured by thermal gravimetric analysis in air.

FIG. 13 shows the thermal stability of pure $ZrB_{12}$, $Zr_{0.5}Gd_{0.5}B_{12}$ and $Zr_{0.75}Sm_{0.25}B_{12}$ as measured by thermal gravimetric analysis in air. These data show that $Zr_{0.5}Gd_{0.5}B_{12}$ is stable up to ~630° C., while $Zr_{0.75}Sm_{0.25}B_{12}$ up to ~620° C., compared to ~610° C. for pure $ZrB_{12}$.

Example 4. Preparation

Mixed dodecaboride solid solutions, $Zr_{1-x}Y_xB_{12}$, (x=0.00, 0.05, 0.25, 0.50, 0.75, 0.95 and 1.00), $Zr_{1-y}Sc_yB_{12}$, $Y_{1-y}Sc_yB_{12}$ (y=0.00, 0.05, 0.25, 0.50, 0.75, 0.80, 0.85, 0.90, 0.95 and 1.00), $ScB_{50}$ and $YB_{66}$ were synthesized using metal and boron powders of high-purity: amorphous boron (99+%, Strem Chemicals, U.S.A.), zirconium (99.5%, Strem Chemicals, U.S.A.), yttrium (99.9%, Strem Chemicals, U.S.A.) and scandium (99.9%, Sigma-Aldrich, U.S.A.). In order to prevent the formation of the lower boride phases, a metals to boron ratio of 1:20 was used for the dodecaborides, 1:65 for $ScB_{50}$ and 1:70 for $YB_{66}$. The powders of boron and transition metals were weighed, homogenized in an agate mortar and pestle and pressed into pellets using a hydraulic press (Carver) under a 10 ton load. The samples were then arc-melted (I≥70 amps, t=1-2 mins) in an ultra-high purity argon atmosphere.

Pellets of $Zr_{1-x}Gd_xB_{12}$, $Zr_{1-x}Sm_xB_{12}$, $Zr_{1-x}Pr_xB_{12}$, and $Zr_{1-x}Nd_xB_{12}$ (x=0.05, 0.25, 0.50, 0.75, and 0.95) were prepared using high-purity metal and boron powders: amorphous boron (99+%, Strem Chemicals), gadolinium (99%, Sigma-Aldrich), zirconium (99.5%, Strem Chemicals), samarium (Strem Chemicals, 99.9%), praseodymium (99.9%, Strem Chemicals), and neodymium (99.8%, Strem Chemicals). The metal to boron ratio was kept at a minimum of 1:20 to prevent the formation of lower borides ($MB_6$) as they are the most stable boride phases of Gd, Sm, Nd, and Pr at ambient pressure. The weighed mixtures were homogenized in vials in a vortex mixer for ~1 min, and then consolidated in a hydraulic press (Carver) under 10 tons before being arc melted (I>70 A, T=1-2 min) under a high purity argon atmosphere.

Example 5. Unit Cell Analysis

Metal dodecaborides ($MB_{12}$) constitute a class of boron rich compounds previously studied for their magnetic, optical and electronic properties. The structure of all dodecaborides contains boron cuboctahedron cages composed of 24 atoms, each containing a 12-coordinate metal in its center. The cages are usually arranged in a face-centered cubic close packed arrangement, forming the cubic-$UB_{12}$ (Fm$\bar{3}$m) structure; however, $ScB_{12}$ forms its own structural type—tetragonal-$ScB_{12}$ (I4/mmm), where the cuboctahedra are arranged in a body-centered tetragonal close-packed structure.

Figure 15:
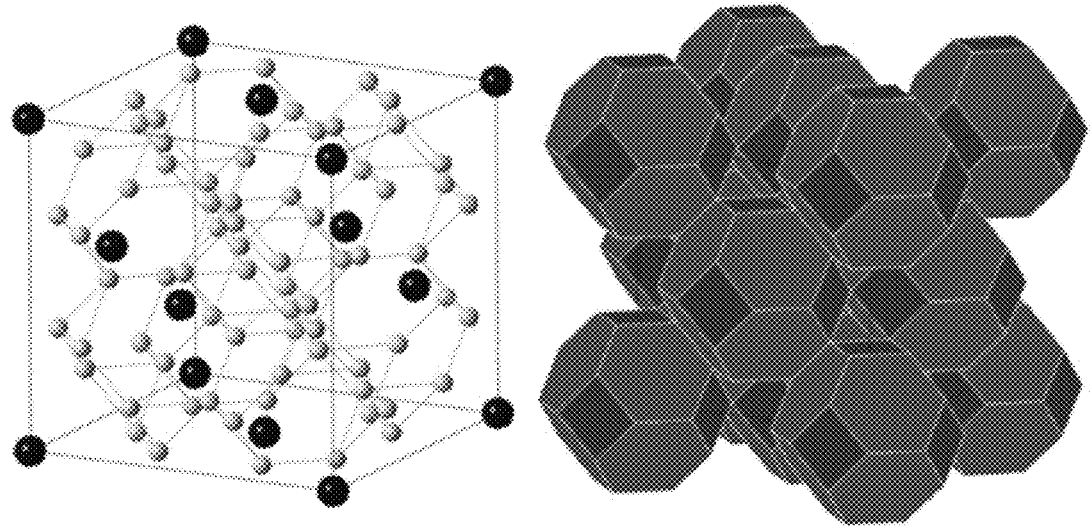
FIG. 15 shows the unit cell of the cubic dodecaboride structure type, cubic-$UB_{12}$ polyhedra model, the unit cell of the tetragonal-$ScB_{12}$ dodecaboride structure type and the tetragonal-$ScB_{12}$ polyhedra model.
Figure 15:
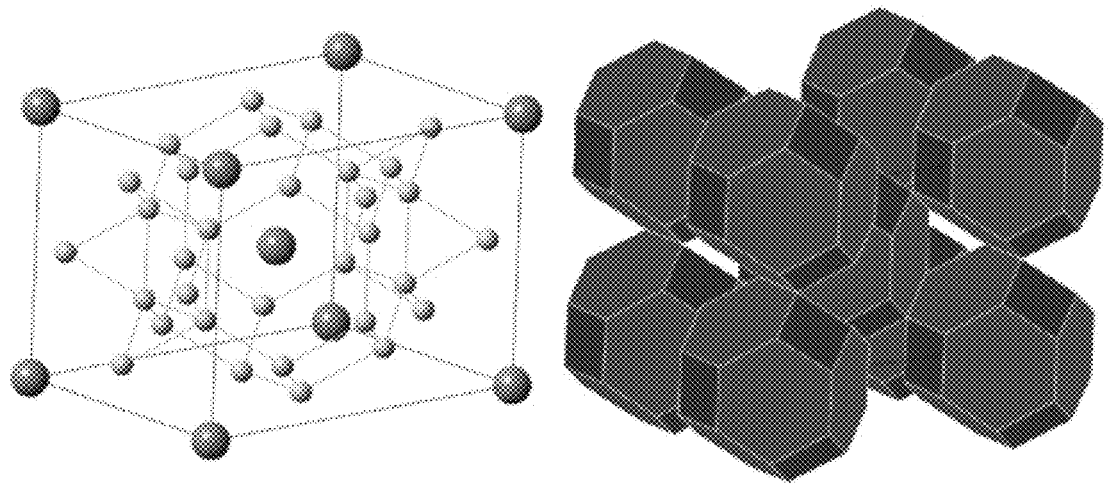

FIG. 15 shows the unit cell of the cubic-$UB_{12}$ (top left) dodecaboride structure type: metal atoms are in blue, B atoms in yellow, (top right) cubic-$UB_{12}$ polyhedra model: face-centered cubic (FCC) lattice of 24 boron atom cuboctahedra boron cages surrounding 12-coordinate metal atoms; (bottom left) the unit cell of the tetragonal-$ScB_{12}$ dodecaboride structure type: metal atoms are in magenta, B atoms in yellow, (bottom right) tetragonal-$ScB_{12}$ polyhedra model: body-centered tetragonal (BCT) lattice of 24 boron atom cuboctahedra boron cages surrounding 12-coordinate metal atoms. Note, while 24 borons surround each metal atom, each metal atom is equidistant from 12 B—B bonds, making it 12-coordinate.

Figure 16:
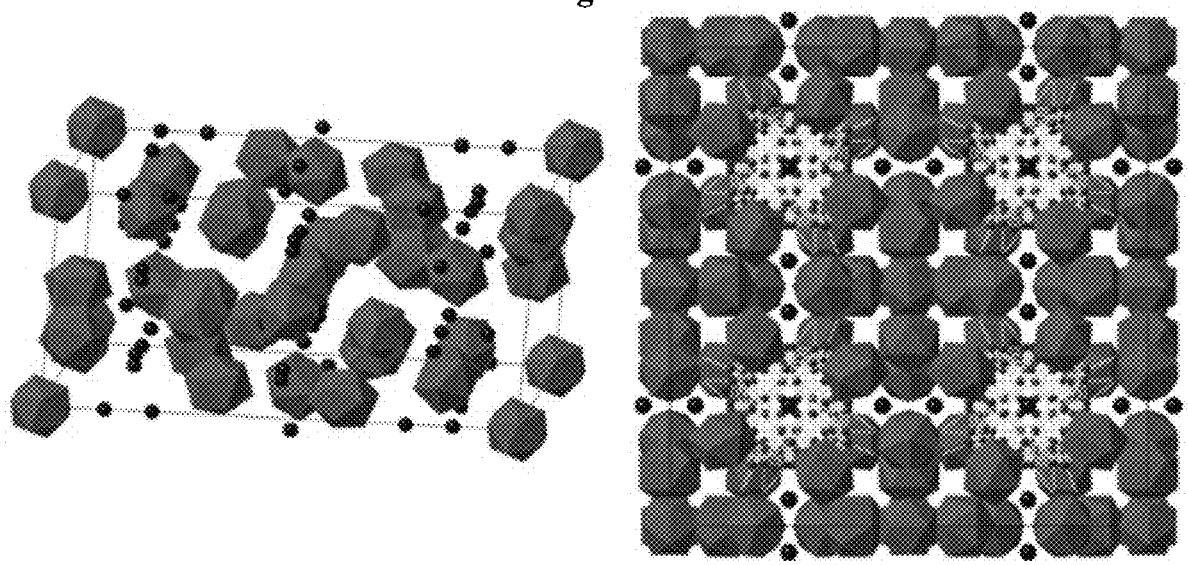
FIG. 16 shows the crystal structure of $ScB_{so}$ and the crystal structure of $YB_{66}$.

FIG. 16 shows the crystal structure of $ScB_{50}$, known as the β-rhombohedral boron doping phase of scandium (Inorganic Crystal Structure Database (ICSD) 2204, space group R$\bar{3}$m), showing characteristic boron icosahedra; (right) crystal structure of $YB_{66}$ (ICSD 23186, space group Fm$\bar{3}$c). (Boron atoms, which are part of $B_{12}$ clusters are shown as green icosahedra, other boron atoms are in dark red, scandium atoms are in violet, yttrium atoms are in teal).

Figure 17:
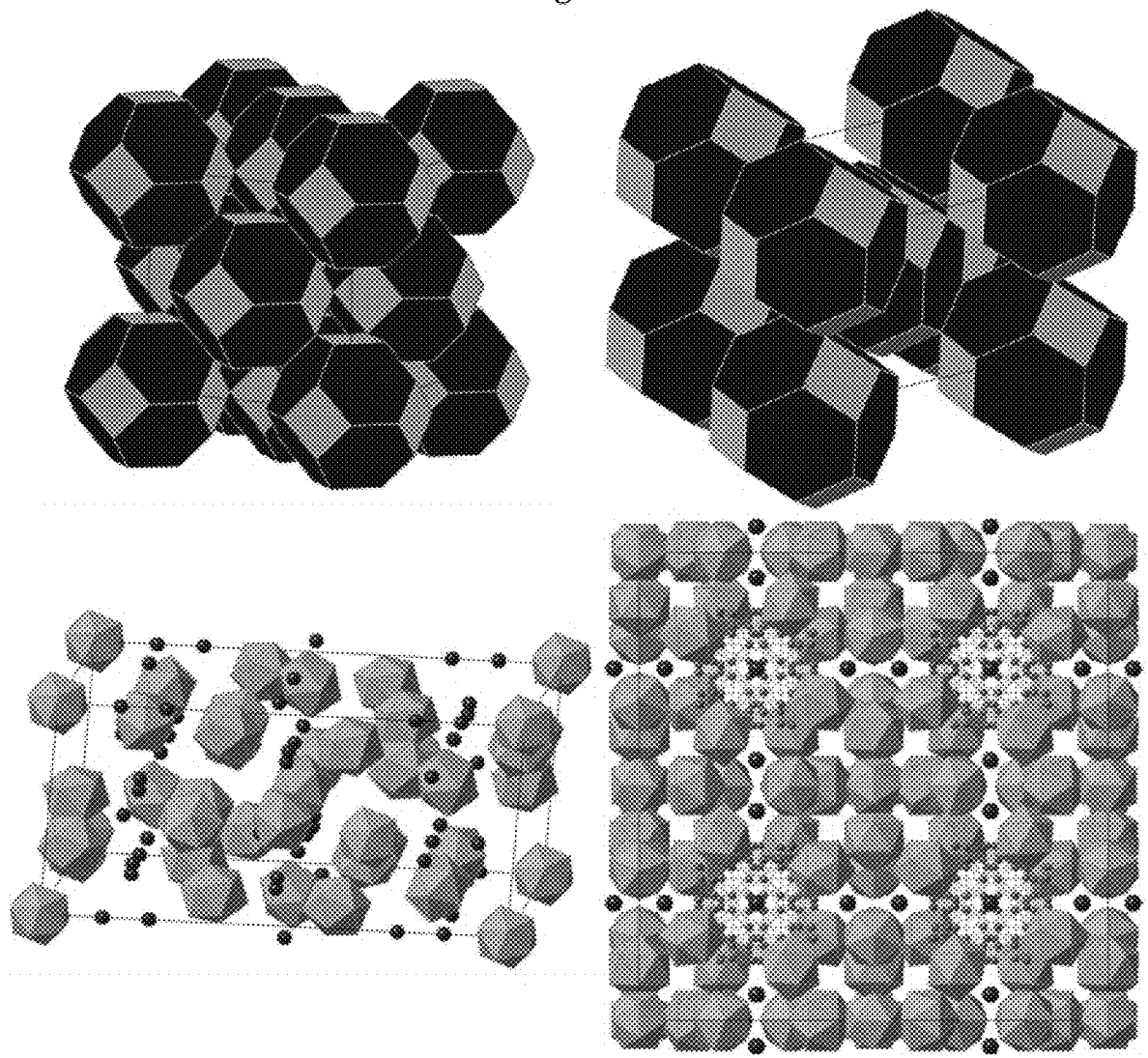
FIG. 17 shows a polyhedra model of the unit cell of a cubic-$UB_{12}$ structural type metal dodecaboride, a polyhedra model of the unit cell of a tetragonal-$ScB_{12}$ structural type metal dodecaboride, a polyhedra model of the unit cell of a rhombohedral-$MB_{50}$ structural type metal boride, and a polyhedra model of the unit cell of a cubic-$YB_{66}$ structural type metal boride.

FIG. 17 shows a polyhedra model of the unit cell of a cubic-$UB_{12}$ structural type metal dodecaboride (top left): 24 boron atom cuboctahedra cages (square faces shown in red, hexagonal face in green) are arranged in a FCC lattice, with a 12-coordinate metal atom in the center of each cage; (top right) polyhedra model of the unit cell of a tetragonal-$ScB_{12}$ structural type metal dodecaboride: 24 boron atom cuboctahedra cages (square faces shown in red, hexagonal facein green) are arranged in a BCT lattice, with a 12-coordinate metal atom in the center of each cage; Note, metals are considered 12-coordinate since 12 boron-boron bonds are equidistant from each metal atom in the 24 boron atom cuboctahedron cage; (bottom left) polyhedra model of the unit cell of a rhombohedral-MB$_{50}$ structural type (solid solution of a metal in β-rhombohedral boron): boron atoms are arranged in B$_{12}$ icosahedral units (shown in green), metal atoms are in blue; (bottom right) polyhedra model of the unit cell of a cubic-YB$_{66}$ structural type metal boride: boron atoms are arranged in B$_{12}$ icosahedral units (shown in green), boron atoms not forming icosahedra are in red, metal atoms are in blue.

Example 6. Energy Dispersive X-Ray Analysis (EDS)

Figure 18:
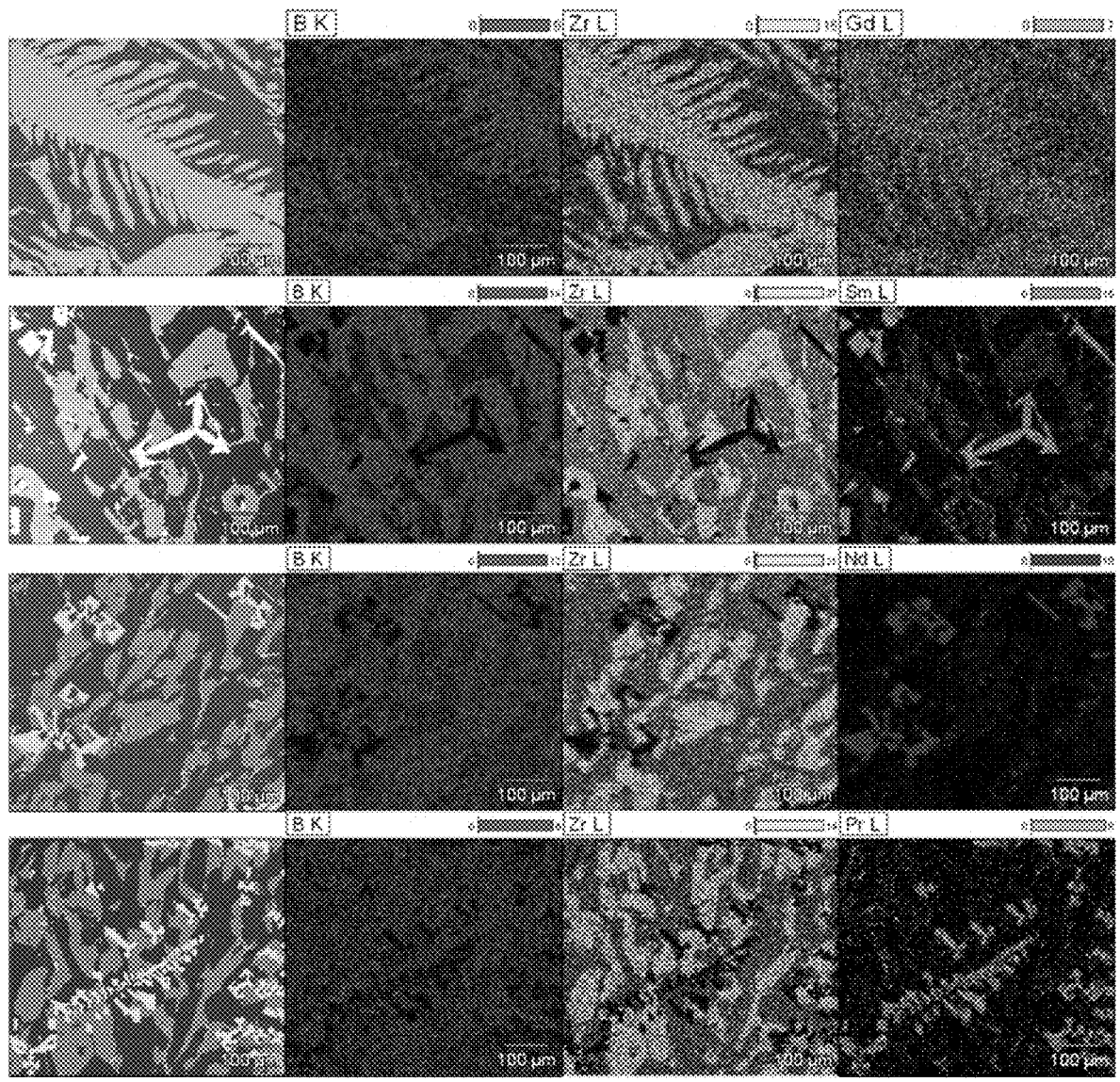
FIG. 18 shows elemental maps and SEM images of selected samples of $Zr_{1-x}Gd_xB_{12}$, $Zr_{1-x}Sm_xB_{12}$, $Zr_{1-x}Nd_xB_{12}$ and $Zr_{1-x}Pr_xB_{12}$ alloys.

Elemental maps and SEM images of selected samples of Zr$_{1-x}$Gd$_x$B$_{12}$, Zr$_{1-x}$Sm$_x$B$_{12}$, Zr$_{1-x}$Nd$_x$B$_{12}$ and Zr$_{1-x}$Pr$_x$B$_{12}$ alloys (x=0.55, 0.30, 0.25 and 0.25 respectively) are presented in FIG. 18. Elemental maps for boron (K line), zirconium (L line) and gadolinium, samarium, neodymium and praseodymium (L lines) of: (a) the Zr$_{0.45}$Gd$_{0.55}$B$_{12}$ solid solution showing the presence of zirconium and gadolinium in the dodecaboride phase. The boron rich areas correspond to a higher boride phase GdB$_{66}$ (cubic, Fm$\overline{3}$c structure, a=23.449 Å, ICSD (Inorganic Crystal Structure Database) 614306); (b) the Zr$_{0.70}$Sm$_{0.30}$B$_{12}$ solid solution showing the presence of zirconium and samarium in the dodecaboride phase. The samarium rich areas correspond to SmB$_6$ (cubic, Pm$\overline{3}$m structure, a=4.133 Å, ICSD 194196), while the boron rich areas correspond to a higher boride phase SmB$_{66}$ (cubic, Fm$\overline{3}$c structure, a=23.468 Å). (c) the Zr$_{0.75}$Nd$_{0.25}$B$_{12}$ solid solution showing the presence of zirconium and neodymium in the dodecaboride phase. The neodymium rich areas correspond to NdB$_6$ (cubic, Pm$\overline{3}$m structure, a=4.127 Å, ICSD 614931), while the boron rich areas correspond to a higher boride phase NdB$_{66}$ (cubic, Fm$\overline{3}$c structure, a=23.476 Å) and ZrB$_{50}$ (rhombohedral, R$\overline{3}$m structure, a=10.932 Å, c=23.849 Å); (d) the Zr$_{0.75}$Pr$_{0.25}$B$_{12}$ solid solution showing the presence of zirconium and praseodymium in the dodecaboride phase. The praseodymium rich areas correspond to PrB$_6$ (cubic, Pm$\overline{3}$m structure, a=4.123 Å, ICSD 615183), while the boron rich areas correspond to a higher boride phase ZrB$_{50}$ (rhombohedral, R$\overline{3}$m structure, a=10.932 Å, c=23.849 Å). The thick horizontal bars represent the intensity as a color legend.

Figure 19:
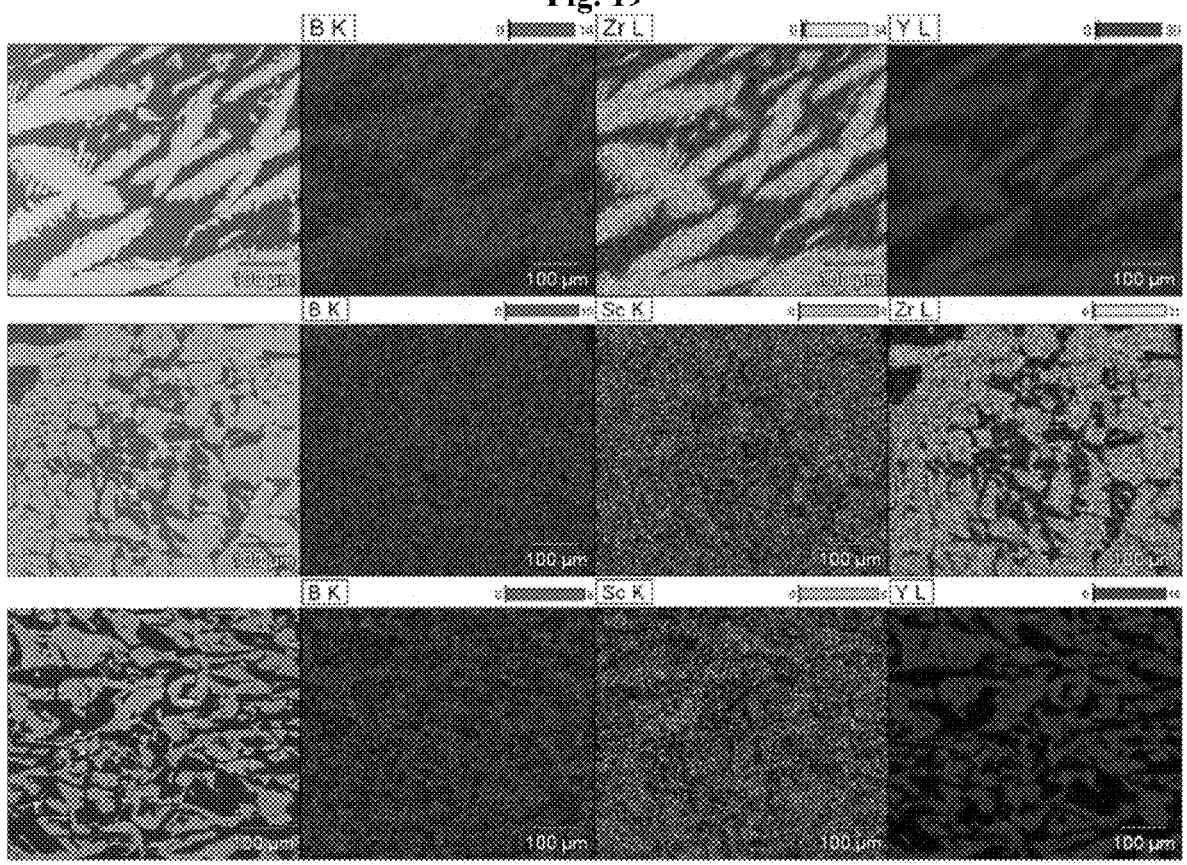
FIG. 19 shows the SEM images and elemental maps for the hardest compositions of the mixed metal dodecaborides: $Zr_{0.5}Y_{0.5}B_{12}$, $Zr_{0.5}Sc_{0.5}B_{12}$ and $Y_{0.5}Sc_{0.5}B_{12}$.

FIG. 19 shows the SEM images and elemental maps for the hardest compositions of the mixed metal dodecaborides: Zr$_{0.5}$Y$_{0.5}$B$_{12}$, Zr$_{0.5}$Sc$_{0.5}$B$_{12}$ and Y$_{0.5}$Sc$_{0.5}$B$_{12}$. For Zr$_{0.5}$Y$_{0.5}$B$_{12}$, both Zr and Y can be observed in the metal dodecaboride phase. In contrast, for the Sc containing dodecaboride solid solutions, Zr$_{0.5}$Sc$_{0.5}$B$_{12}$ and Y$_{0.5}$Sc$_{0.5}$B$_{12}$, while Zr and Y can be seen primarily in the dodecaboride phase, Sc can be seen both in the dodecaboride phase as well as in boron rich areas (as ScB$_{50}$). SEM images and elemental maps for boron (K line), scandium (K line), yttrium (L line), zirconium (L line) for mixed metal dodecaboride solid-solutions: (top) Zr$_{0.5}$Y$_{0.5}$B$_{12}$, (middle) Zr$_{0.5}$Sc$_{0.5}$B$_{12}$, (bottom) Y$_{0.5}$Sc$_{0.5}$B$_{12}$. For Zr$_{0.5}$Y$_{0.5}$B$_{12}$ both zirconium and yttrium can be observed in the metal dodecaboride phase. In contrast, for the scandium containing dodecaboride solid solutions, Zr$_{0.5}$Sc$_{0.5}$B$_{12}$ and Y$_{0.5}$Sc$_{0.5}$B$_{12}$, while yttrium can be seen primarily in the dodecaboride phase, scandium can be seen both in dodecaboride phase as well as in boron rich areas (as ScB$_{50}$). The thick horizontal bars represent the intensity as a color legend.

Example 7. Optical Microscopy

Figure 20:
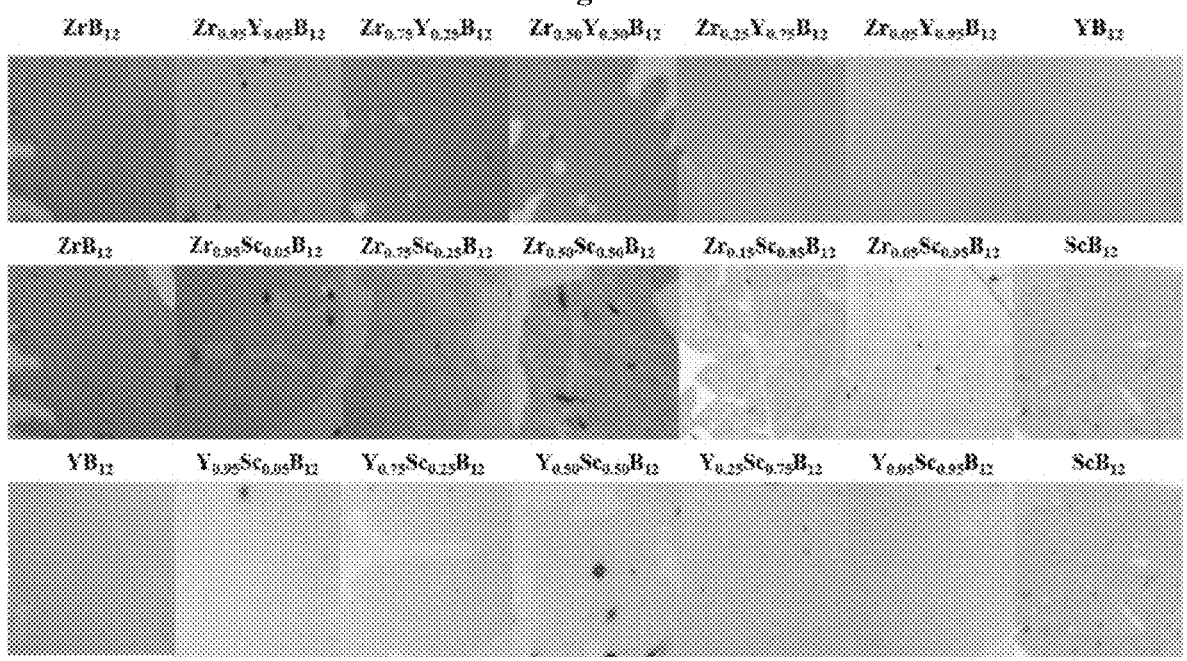
FIG. 20 shows the colors of solid solution samples of the mixed metal dodecaborides $Zr_{1-x}Y_xB_{12}$, $Zr_{1-x}Sc_xB_{12}$, and $Y_{1-x}Sc_xB_{12}$ taken using an optical microscope.

FIG. 20 shows the colors of solid solution samples of the mixed metal dodecaborides taken using an optical microscope. A color change of the dodecaboride phase can be directly observed using a light microscope going from pure ZrB$_{12}$ (violet) to YB$_{12}$ (light-blue) and ScB$_{12}$ (iceberg blue) phase. The color change is most pronounced for the Zr$_{1-x}$Y$_x$B$_{12}$ solid solution, which goes from violet for ZrB$_{12}$ to light blue for YB$_{12}$. The color changes for Zr$_{1-x}$Sc$_x$B$_{12}$ and Y$_{1-x}$Sc$_x$B$_{12}$ are less pronounced due to the similarities of the shades of blue of YB$_{12}$ and ScB$_{12}$.

Figure 21:
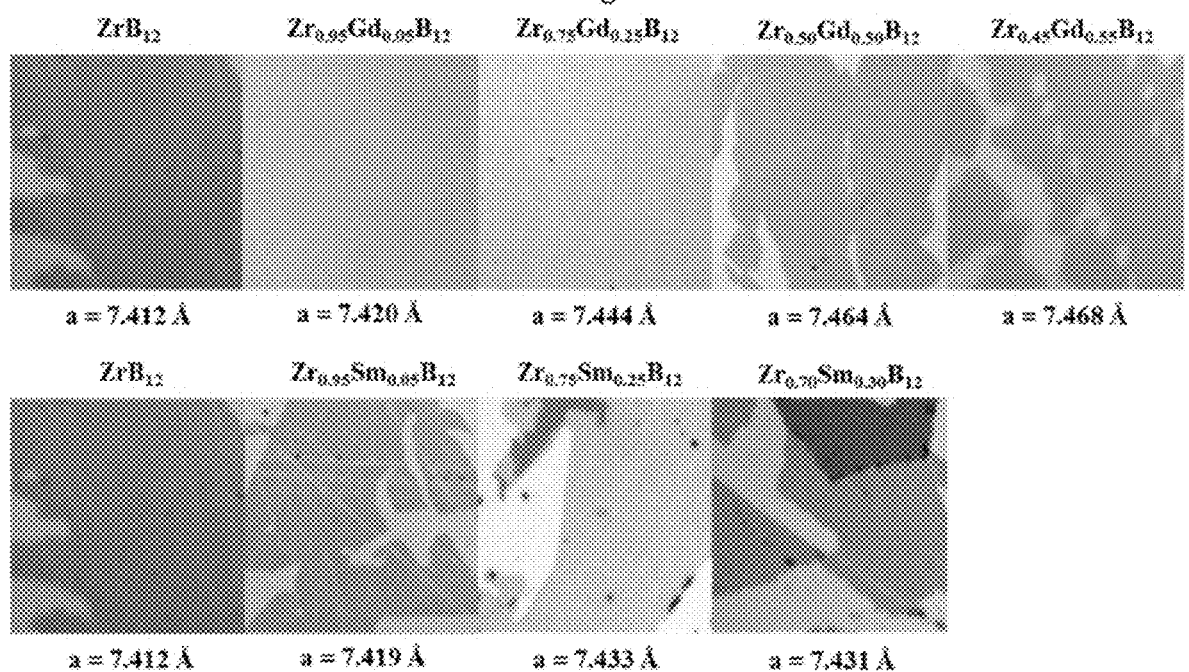
FIG. 21 shows the colors of solid solution samples of the mixed metal dodecaborides $Zr_{1-x}Gd_xB_{12}$, and $Zr_{1-x}Sm_xB_{12}$, taken using an optical microscope.

The solid solution formation of the dodecaboride phase can be directly observed using a light microscope going from pure ZrB$_{12}$ (violet) to Zr$_{0.45}$Gd$_{0.55}$B$_{12}$ (blue) and Zr$_{0.70}$Sm$_{0.30}$B$_{12}$ (blue-violet) shown in FIG. 21. The color change is due to the charge-transfer between the cuboctahedron boron cage network and the metal atoms. It also suggests that pure GdB$_{12}$ and SmB$_{12}$ should be blue, similar to YB$_{12}$, as Gd, Sm and Y are all in +3 oxidation states. The dark blue phase observed in Zr$_{1-x}$Sm$_x$B$_{12}$ is SmB$_6$.

Experimental

Zr$_{1-x}$Y$_x$B$_{12}$Zr$_{1-y}$Sc$_y$B$_{12}$ and Y$_{1-y}$Sc$_y$B$_{12}$

Mixed dodecaboride solid solutions, Zr$_{1-x}$Y$_x$B$_{12}$, (x=0.00, 0.05, 0.25, 0.50, 0.75, 0.95 and 1.00), Zr$_{1-y}$Sc$_y$B$_{12}$, Y$_{1-y}$Sc$_y$B$_{12}$ (y=0.00, 0.05, 0.25, 0.50, 0.75, 0.80, 0.85, 0.90, 0.95 and 1.00), ScB$_{50}$ and YB$_{66}$ were synthesized using metal and boron powders of high-purity: amorphous boron (99+%, Strem Chemicals, U.S.A.), zirconium (99.5%, Strem Chemicals, U.S.A.), yttrium (99.9%, Strem Chemicals, U.S.A.) and scandium (99.9%, Sigma-Aldrich, U.S.A.). In order to prevent the formation of the lower boride phases, a metals to boron ratio of 1:20 was used for the dodecaborides, 1:65 for ScB$_{50}$ and 1:70 for YB$_{66}$. The powders of boron and transition metals were weighed, homogenized in an agate mortar and pestle and pressed into pellets using a hydraulic press (Carver) under a 10 ton load. The samples were then arc-melted (I≥70 amps, t=1-2 mins) in an ultra-high purity argon atmosphere.

Prepared ingots were bisected using a diamond saw (Ameritool Inc., U.S.A.). One half was crushed into a sub 325 (45 μm) mesh powder and used for powder X-ray diffraction (PXRD) analysis; the other half was used for energy-dispersive X-ray spectroscopy (EDS) analysis and Vicker's hardness measurements. For the latter two, the samples were encapsulated in epoxy using an epoxy/hardener set (Allied High Tech Products Inc., U.S.A.). In order to achieve an optically flat surface, the samples were polished on a semi-automated polisher (South Bay Technology Inc., U.S.A.), using the following abrasives: SiC discs of 120-1200 grit sizes (Allied High Tech Products Inc., U.S.A.) and 30-1 micron particle diamond films (South Bay Technology Inc., U.S.A.).

Powder XRD was carried out on a Bruker D8 Discover Powder X-ray Diffractometer (Bruker Corporation, Germany) utilizing Cu$_{K\alpha}$ X-ray radiation (λ=1.5418 Å). The following scan parameters were used: 5-100° 2θ range, time per step of 0.3 sec, step size of 0.0353° with a scan speed of 0.1055°/sec. In order to determine the phases present in the powder X-ray diffraction data, the Joint Committee on Powder Diffraction Standards (JCPDS) database was utilized. The composition and purity of the samples were determined on an FEI Nova 230 high resolution scanning electron microscope (FEI Company, U.S.A.) with an Ultra-Dry EDS detector (Thermo Scientific, U.S.A.). Transmission electron microscopy (TEM) was performed on a TF-20 transmission electron microscope in order to confirm the crystal structure. Rietveld refinement utilizing Maud software was carried out to determine the cell parameters. The hardness of each sample was determined using a MicroMet 2103 Vickers microhardness tester (Buehler Ltd, U.S.A.). Fifteen indents of the following force loading were made in random areas of the sample: 0.49, 0.98, 1.96, 2.94 and 4.9 N (low to high, respectively). The length of the diagonals were measured using a high resolution optical microscope (Zeiss Axiotech 100HD, Carl Zeiss Vision GmbH, Germany) with 500× magnification, and Vickers hardness was calculated using the Equation below:

$$H_v = \frac{1854.4F}{a^2}$$

where F is the loading force applied in Newtons (N) and a is the average of the length of the two diagonals of each indent in micrometers.

Densities for the 50/50% solid solutions were calculated from powder XRD unit cell data and elemental composition from EDS.

Oxidation resistance was determined via thermogravimetric analysis utilizing a Pyris Diamond TGA/DTA unit (TG-DTA, Perkin-Elmer Instruments, U.S.A.). The following heating/cooling profile was used: heating in air from 25 to 200° C. (at 20° C./min), holding at 200° C. for 30 minutes, heating from 200 to 1000° C. (at 2° C./min), holding at 1000° C. for 120 minutes, cooling 1000 to 25° C. (at 5° C./min).

To determine and establish the composition and phase purity of mixed $MB_{12}$ solid solutions, powder X-ray diffraction (PXRD) and energy-dispersive X-ray spectroscopy (EDS) analyses were performed. FIGS. 1-3 show PXRD in the 5-100° 2 Θ for the three solid solutions: $Zr_{1-x}Y_xB_{12}$ (x=0.05, 0.25, 0.50, 0.75 and 0.95), $Zr_{1-y}Sc_yB_{12}$ and $Y_{1-y}Sc_yB_{12}$ (y=0.05, 0.25, 0.50, 0.75, 0.80, 0.85, 0.90 and 0.95). PXRD data for the β-rhombohedral boron doping phase of Sc ($ScB_{50}$, $R\bar{3}m$) and $YB_{66}$ ($Fm\bar{3}c$) (FIG. 16) compared to the reference patterns from JCPDS (Joint Committee for Powder Diffraction Standards) can be seen in FIG. 24.

Figure 24:
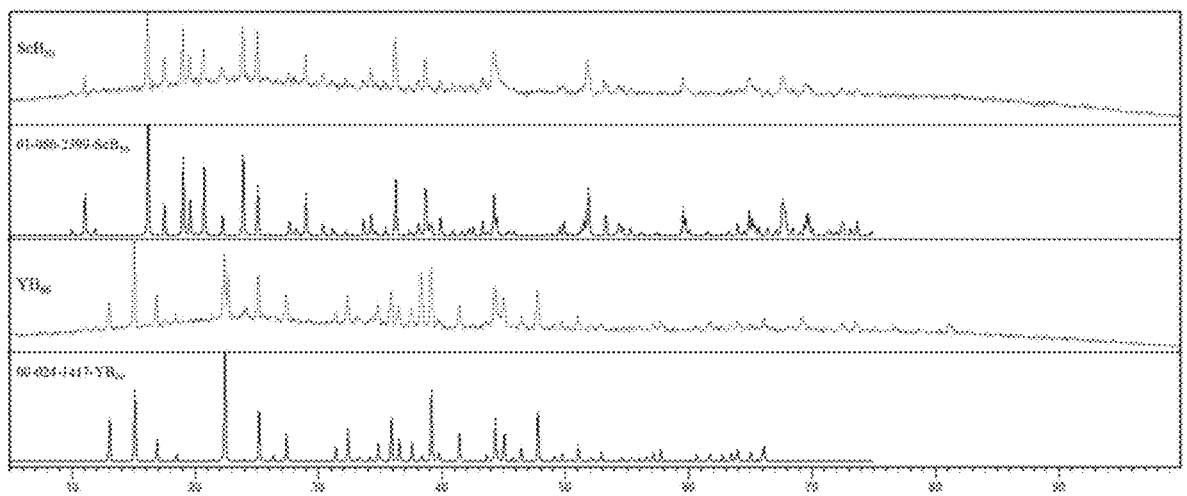
FIG. 24 shows powder XRD patterns of $ScB_{50}$ and $YB_{66}$.

The three dodecaborides, $ZrB_{12}$, $YB_{12}$ and $ScB_{12}$, are completely soluble in each other as binary metal substituted phases: $Zr_{1-x}Y_xB_{12}$, $Zr_{1-x}Sc_xB_{12}$ and $Y_{1-x}Sc_xB_{12}$. Samples with $YB_{12}$ contain $YB_{66}$ as a minor phase, while $ScB_{12}$ samples contain $ScB_{50}$ (FIGS. 16 and 24). $ZrB_{12}$ and $YB_{12}$ form an essentially perfect solid solution (FIG. 15 and Table 1), which follows Vegard's Law within experimental error. This can be attributed to the fact that both of these dodecaborides have the cubic-$UB_{12}$ ($Fm\bar{3}m$) structure, the electronegativities of the metals are similar, and the differences in their radii are within the 15% set by the Vegard's Law rules. On the other hand, $ScB_{12}$ possesses a tetragonal-$ScB_{12}$ structure. This results in $Zr_{1-x}Sc_xB_{12}$ and $Y_{1-x}Sc_xB_{12}$ solid solutions having a solid-state phase transition at 90-95 at. % Sc (FIGS. 1-3 and Table 2-3). In addition, $Zr_{1-x}Sc_xB_{12}$ solid solutions were previously shown to undergo a temperature induced phase transition. Unit cell parameters for cubic (FCC) and body-centered tetragonal (BCT) syngonies as well as the phase composition as determined by EDS are presented in Tables 1-3. FIG. 19 shows the SEM images and elemental maps for the hardest compositions of the mixed metal dodecaborides: $Zr_{0.5}Y_{0.5}B_{12}$, $Zr_{0.5}Sc_{0.5}B_{12}$ and $Y_{0.5}Sc_{0.5}B_{12}$. For $Zr_{0.5}Y_{0.5}B_{12}$, both Zr and Y can be observed in the metal dodecaboride phase. In contrast, for the Sc containing dodecaboride solid solutions, $Zr_{0.5}Sc_{0.5}B_{12}$ and $Y_{0.5}Sc_{0.5}B_{12}$, while Zr and Y can be seen primarily in the dodecaboride phase, Sc can be seen both in the dodecaboride phase as well as in boron rich areas (as $ScB_{50}$).

After establishing the purity of the samples, Vickers hardness testing (under a load of 0.49-4.9 N) was carried out, the results of which are shown in FIGS. 8-10. High covalent bond density of the dodecaborides may be the reason that both pure $MB_{12}$ as well as their mixed metal solid solutions are superhard ($H_v \geq 40$ GPa). For the $Zr_{1-x}Y_xB_{12}$ solid solution, at the composition of Y=50 at. %, the hardness maximizes at 45.8±1.3 GPa for a loading of 0.49 N, compared to 40.4±1.8 GPa for pure $ZrB_{12}$ (compared to a literature value of 39 GPa) and 40.9±1.6 GPa for pure $YB_{12}$ (compared to a literature value of 42 GPa). We speculate that the 14% increase in hardness here is due to a combination of both intrinsic factors (solid solution hardening) where incorporating atoms of different sizes (Zr: $r_{at}$=1.55 Å, $r_{CN=12}$=1.603 Å; Y: $r_{at}$=1.80 Å, $r_{CN=12}$=1.801 Å) produces strain at a local scale and dislocation propagation is therefore hindered; as well as extrinsic factors (due to sample morphology, microstructure and the presence of boron rich phases). $Zr_{1-x}Y_xB_{12}$ solid solutions contain the $YB_{66}$ phase, which in contrast to $ScB_{50}$, is not a β-rhombohedral boron doping phase, but a separate Y—B phase. $YB_{66}$ ($Fm\bar{3}c$, FIG. 16) contains 1584 boron atoms and 24 Y atoms and is superhard (40.4±1.8 GPa at 0.49 N), potentially providing some extrinsic hardening for these samples.

For the $Zr_{1-x}Sc_xB_{12}$ solid solution, the hardness increases to 48.0±2.1 GPa at a composition of 50 at % Sc, compared to 40.4±1.8 GPa for pure $ZrB_{12}$ and 41.7±2.2 GPa for pure $ScB_{12}$. This hardness increase can again be attributed to a combination of intrinsic (solid solution hardening), since at this composition ($Zr_{0.5}Sc_{0.5}B_{12}$) $ScB_{12}$ is stabilized in the cubic structural type as well as extrinsic factors. The hardness of the solid solutions richer in Sc (x≥0.5) are harder than the corresponding samples richer in Zr (x≤0.5); this may be attributed to the fact that $Zr_{1-x}Sc_xB_{12}$ undergoes a cubic to tetragonal phase transition at 90-95 at. % Sc. This is similar to the martensitic transformation in steel, where the unit cell transforms from a cubic to a body-centered tetragonal lattice through a diffusionless transformation. Solid solutions richer in Sc also contain the $ScB_{50}$ phase (FIG. 16), which is a solid solution of Sc in β-rhombohedral boron. This phase, like most metal boron doping phases, is superhard ($H_v \geq 40$ GPa) at 42.1±2.2 GPa at 0.49 N, providing some extrinsic hardening.

For the $Y_{1-x}Sc_xB_{12}$ solid solution, a hardness peak can be observed at 50 at. % Sc. The hardness increases to 45.2±2.1 GPa compared to 40.9±1.6 GPa for pure $YB_{12}$ and 41.7±2.2 GPa for pure $ScB_{12}$. Similarly to $Zr_{1-x}Sc_xB_{12}$, the hardness increase of $Y_{1-x}Sc_xB_{12}$ can be attributed to solid-solution hardening as well as the presence of secondary boron rich phase, $ScB_{50}$ phase, which is superhard ($H_v \geq 40$ GPa at 0.5 N of applied loading). A cubic to tetragonal phase transition occurs at 90-95 at. % Sc for this solid solution.

In order to determine the cell parameters, Rietveld refinement was carried out using Maud software (Tables 1-3). For $Zr_{1-x}Y_xB_{12}$ the lattice parameter (a) of the cubic cell changed from 7.412 Å for pure $ZrB_{12}$ to 7.505 Å for pure $YB_{12}$ (FIGS. 1-3 and Table 1). The change and gradual increase of the cell parameters confirms that a solid solution has been formed. In order to check the composition of the $Zr_{1-x}Y_xB_{12}$ phase, EDS analysis was performed (Table 1). This analysis further confirmed the nearly perfect solid solution formation over all range of concentrations of Zr and Y in $Zr_{1-x}Y_xB_{12}$. As both of the parent dodecaborides ($ZrB_{12}$ and $YB_{12}$) are of the cubic-$UB_{12}$ (Fm3m) structural type, this system has no solid-state phase transformation.

For $Zr_{1-x}Sc_xB_{12}$ and $Y_{1-x}Sc_xB_{12}$ solid solutions, not only can a change in the lattice parameters be observed indicative of the formation of a solid solution (Tables 2-3), but a solid state phase transition between the cubic-$UB_{12}$ (Fm3m) and tetragonal-$ScB_{12}$ (I4/mmm) lattice types can be found as well. The phase transition occurs at ~90-95 at. % Sc for $Zr_{1-x}Sc_xB_{12}$ and $Y_{1-x}Sc_xB_{12}$ solid solutions. A face-centered-cubic (FCC) to body-centered tetragonal (BCT) transition can be imagined if two FCC unit cells are positioned such that they share a face. Thus, the shared face-centered positions of the cubic cells become the body-centered positions of the tetragonal cell; the cubic a lattice parameter then becomes the tetragonal c lattice parameter, while the tetragonal a lattice parameter is composed of the cubic face diagonals and equals the cubic parameter a times $$\frac{\sqrt{2}}{2}.$$

Figure 22:
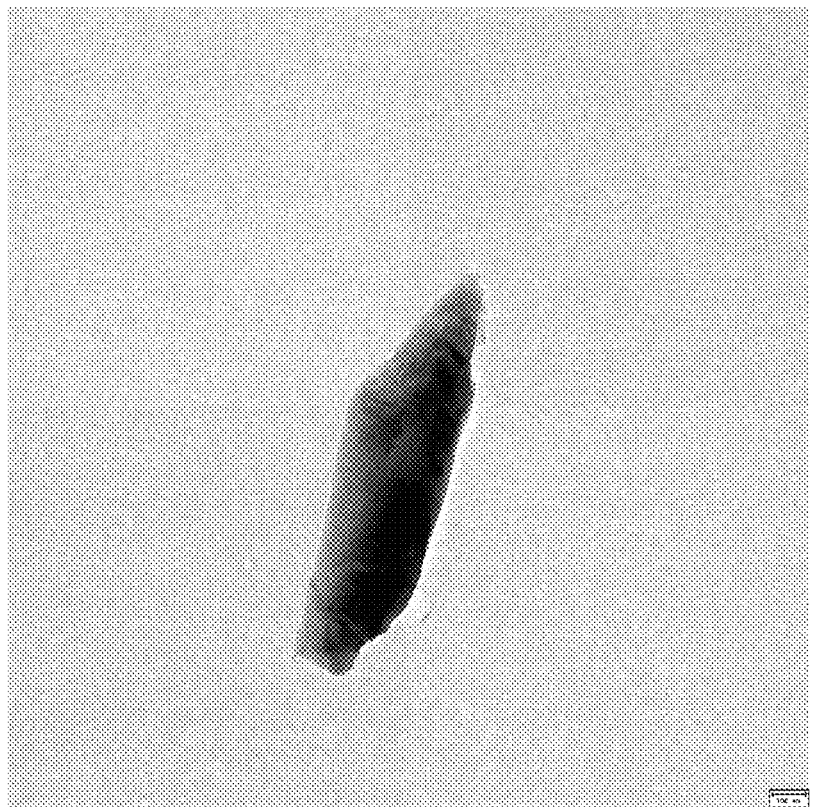
FIG. 22 shows a transmission electron microscopy image of $Zr_{0.05}Sc_{0.95}B_{12}$.
Figure 23:
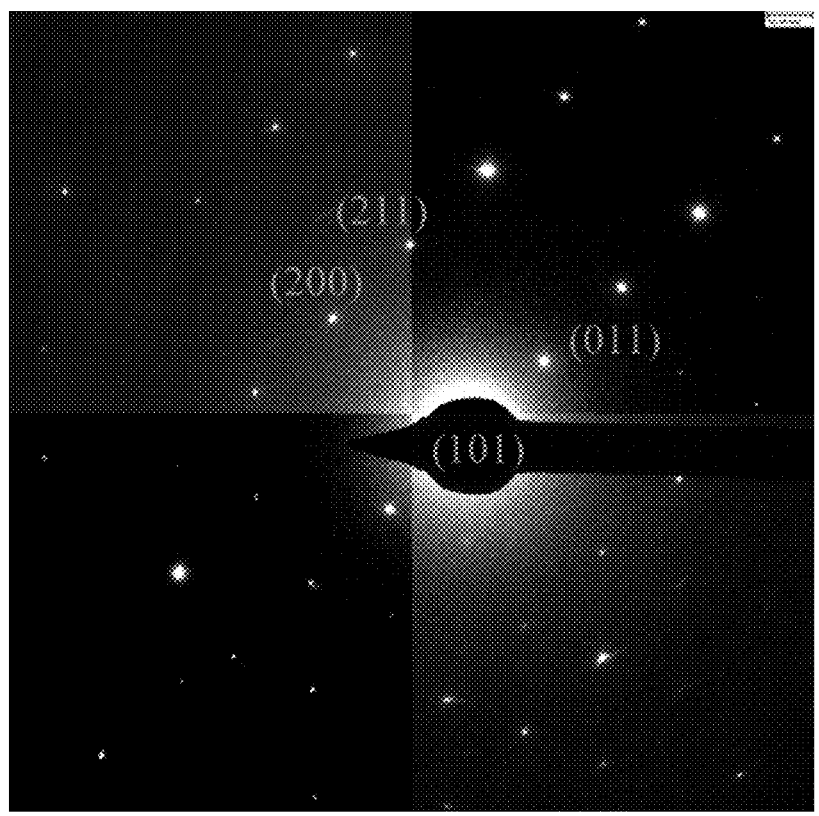
FIG. 23 shows the tetragonal diffraction pattern of $Zr_{0.05}Sc_{0.95}B_{12}$.

By refining the structural model to fit the data in the cubic and tetragonal unit cells over the whole range of solid solutions, we found that the values of the cubic a and tetragonal c lattice parameters stay essentially the same, within error, for low concentrations of scandium and diverges as they approach pure $ScB_{12}$. Therefore, at small concentrations of a secondary metal (5-10 at. %), one can speculate that the structure of the resulting mixed dodecaboride with scandium keeps the pure $ScB_{12}$ tetragonal unit cell, whereas with the addition of more secondary metal, the unit cell stabilizes into the cubic-$UB_{12}$ structure. To provide evidence for this speculation, a TEM image of showing the tetragonal diffraction pattern for $Zr_{0.05}Sc_{0.95}B_{12}$ can be seen in FIGS. 22-23.

Analyzing the crystal structure of $ZrB_{12}$ (ICSD 23861), $YB_{12}$ (ICSD 23860) and $ScB_{12}$ (ICSD 68028), one observes that tetragonal-$ScB_{12}$ has shorter metal-B bonds, while having longer B—B bonds than other cubic metal dodecaborides. This leads to not only a distortion of the cuboctahedron boron cages, but also to stronger metal-boron bonds in tetragonal-$ScB_{12}$. Addition of a secondary transition metal in $ScB_{12}$ allows for the alleviation of the cuboctahedral distortion and as a consequence stabilizes $M_{1-x}Sc_xB_{12}$ solid solution in the cubic structural type.

Metal dodecaboride samples exhibit interesting colors, ranging from violet for $ZrB_{12}$ to light blue for $YB_{12}$ and iceberg blue for $ScB_{12}$. The colors are a result of charge-transfer from the metal atoms to the network of boron cuboctahedron cages. FIG. 20 shows the colors of solid solution samples of the mixed metal dodecaborides taken using an optical microscope. The color change is most pronounced for the $Zr_{1-x}Y_xB_{12}$ solid solution, which goes from violet for $ZrB_{12}$ to light blue for $YB_{12}$. The color changes for $Zr_{1-x}Sc_xB_{12}$ and $Y_{1-x}Sc_xB_{12}$ are less pronounced due to the similarities of the shades of blue of $YB_{12}$ and $ScB_{12}$.

Analysing the thermal stability data from TGA for the hardest solid solutions of $ZrB_{12}$, $YB_{12}$ and $ScB_{12}$, one observes that the oxidation resistances for $Zr_{0.5}Y_{0.5}B_{12}$, $Zr_{0.5}Sc_{0.5}B_{12}$ and $Y_{0.5}Sc_{0.5}B_{12}$ are comparable to their parent compounds (FIG. 12). Whereas, the oxidation resistances for $ZrB_{12}$, $YB_{12}$ and $ScB_{12}$ are ~610° C., ~715° C. and ~685° C., respectively, the mixed dodecaboride solid solutions are stable up until ~630° C., ~685° C. and ~695° C., respectively. This high oxidation resistance suggests that dodecaborides could be a promising replacement for the current industrial standard, tungsten carbide, which oxidizes at ~400° C. Furthermore, the densities for the hardest compositions are low, owing to their high boron content. X-ray densities of $Zr_{0.5}Y_{0.5}B_{12}$ (3.52 g/cm³), $Zr_{0.5}Sc_{0.5}B_{12}$ (3.32 g/cm³), and $Y_{0.5}Sc_{0.5}B_{12}$ (3.18 g/cm³) show that they are as light, if not lighter than diamond (3.52 g/cm³). The low density, superhardness and enhanced oxidation resistance makes metal dodecaborides an interesting choice as potential materials for cutting and machining or as lightweight protective coatings.

$Zr_{1-x}Gd_xB_{12}$, $Zr_{1-x}Sm_xB_{12}$, $Zr_{1-x}Pr_xB_{12}$, and $Zr_{1-x}Nd_xB_{12}$ Pellets of $Zr_{1-x}Gd_xB_{12}$, $Zr_{1-x}Sm_xB_{12}$, $Zr_{1-x}Pr_xB_{12}$, and $Zr_{1-x}Nd_xB_{12}$ (x=0.05, 0.25, 0.50, 0.75 and 0.95) were prepared using high-purity metal and boron powders: amorphous boron (99+%, Strem Chemicals, USA), gadolinium (99%, Sigma-Aldrich, USA), zirconium (99.5%, Strem Chemicals, USA), samarium (Strem Chemicals, 99.9%), praseodymium (99.9%, Strem Chemicals, USA), and neodymium (99.8%, Strem Chemicals, USA). The metal to boron ratio was kept at a minimum of 1:20 to prevent the formation of lower borides ($MB_6$) as they are the ambient pressure most stable boride phases of Gd, Sm, Nd, and Pr. The weighed mixtures were homogenized in vials in a vortex mixer for ~1 minute, then consolidated in a hydraulic press (Carver) under ~10 tons before being arc melted (I>70 amps, T=1-2 min) under a high purity argon atmosphere.

The resultant pellets were broken into 2-4 pieces by gently tapping using a tool steel Plattner-style diamond crusher. Half of the pieces were crushed using the aforementioned tool steel Plattner-style diamond crusher to −325 mesh (≤45 µm) powder for powder XRD. PXRD was performed on a Bruker D8 Discover powder X-ray diffractometer (Bruker Corporation, Germany) utilizing a CuKα X-ray beam (λ=1.5418 Å) in the 5-100° 2θ range with a scan speed of 0.1055°/s, time per step of 0.3 s. The phases analyzed were cross-referenced against the Joint Committee on Powder Diffraction Standards (JCPDS) database. Maud software was used to perform the unit cell refinements.

One piece was encapsulated in an epoxy/hardener set (Allied High Tech Products Inc., USA) to be polished to an optically flat finish on a semi-automated polisher (Southbay Technology Inc., USA) using both silicon carbide abrasive disks of 120-1200 grit (Allied High Tech Products Inc., USA) and 30-1 µm particle-size diamond films (Southbay Technology Inc., USA).

The polished samples were analyzed using an UltraDry EDS detector (Thermo Scientific, USA) attached to an FEI Nova 230 high-resolution scanning electron microscope (FEI Company, USA). Vickers hardness testing was performed using a MicroMet 2103 Vickers microhardness tester (Buehler Ltd., USA) with a pyramidal diamond indenter tip. 15 indents were made at applied loadings of 0.49, 0.98, 1.96 each, and a minimum of 10 indents were made at loadings of 2.94 and 4.9 N each, and were performed in random areas of the sample. A high resolution optical microscope (Zeiss Axiotech 100HD, Carl Zeiss Vision GmbH, Germany) with 500× magnification was used to measure the length of the diagonals of each indent. Vicker's hardness was calculated using the Equation below:

$$H_v = \frac{1854.4F}{a^2}$$

where F is the loading force applied in Newtons (N) and a is the average of the length of the two diagonals of each indent in micrometers.

Thermogravimetric analysis utilizing a Pyris Diamond TGA/DTA unit (TG-DTA, Perkin-Elmer Instruments, U.S.A.) was used to determine oxidation resistance. The profile used for heating and cooling in air was as follows: heat from 25 to 200° C. (at 20° C./min), hold at 200° C. for 30 minutes, heat from 200 to 1000° C. (at 2° C./min), hold at 1000° C. for 120 minutes, cool 1000 to 25° C. (at 5° C./min).

Phase determination and sample purity was determined using powder X-ray diffraction (PXRD) and energy-dispersive X-ray spectroscopy (EDS). PXRD data (2 Θ=5-100°) for $Zr_{1-x}Gd_xB_{12}$, $Zr_{1-x}Sm_xB_{12}$, $Zr_{1-x}Nd_xB_{12}$ and $Zr_{1-x}Pr_xB_{12}$ solutions are shown in FIGS. 4-7. EDS data for $Zr_{1-x}Gd_xB_{12}$, $Zr_{1-x}Sm_xB_{12}$, $Zr_{1-x}Nd_xB_{12}$ and $Zr_{1-x}Pr_xB_{12}$ (FIG. 18), hardness (FIG. 11) and thermogravimetric analysis (FIG. 13) data for $Zr_{0.5}Gd_{0.5}B_{12}$ are discussed in detail later in this section. Unit cell parameters and compositions for $Zr_{1-x}Gd_xB_{12}$, $Zr_{1-x}Sm_xB_{12}$, $Zr_{1-x}Nd_xB_{12}$ and $Zr_{1-x}Pr_xB_{12}$ alloys are provided in Tables 4-7.

For $Zr_{1-x}Gd_xB_{12}$, the solubility limit of Gd in $ZrB_{12}$ is 54 at. % Gd, whereas for $Zr_{1-x}Sm_xB_{12}$, the solubility limit of Sm in $ZrB_{12}$ is ~15 at. % Sm. For $Zr_{1-x}Nd_xB_{12}$, the solubility limit of Nd in $ZrB_{12}$ is ~7 at. % Nd and for $Zr_{1-x}Pr_xB_{12}$, the solubility limit of Pr in $ZrB_{12}$ is 15 at. % Pr. The above solubilities were determined by powder XRD and EDS analyses. Past the solubility limit of Gd, Sm, Nd and Pr in $ZrB_{12}$, the amount of the respective hexaboride ($MB_6$) phases, which are the highest stable borides, increase (FIGS. 4-7). As metal dodecaborides are typically formed along the tie line of an incongruently melting phase, they are accompanied by a lower boride ($MB_2$ or $MB_6$) at metal to boron ratio of ~1:12, and higher borides ($MB_{50}$ and $MB_{66}$) at larger metal to boron ratios 1:20. Cell parameters determined for each of the solid solution compositions as well as the metal composition for $Zr_{1-x}Gd_xB_{12}$ and $Zr_{1-x}Sm_xB_{12}$ are given in Tables 4-5. Note that the solubility of the secondary metal (Sm—Pr) in $ZrB_{12}$ decreases with increasing size of said metal, which is in good agreement with the size requirements for the metal dodecaboride formation as discussed above.

Vickers hardness testing from 0.49 N (low load) to 4.9 N (high load) was performed on samples of $Zr_{1-x}Gd_xB_{12}$ (x=0.05, 0.25 and 0.50) after the composition and purity of each was established. The hardness of $Zr_{1-x}Gd_xB_{12}$ solid solutions did not change (within the measurement error) remaining at around ~40 GPa at 0.49 N, similar to the parent $ZrB_{12}$ (40.4±1.8 GPa).

Elemental maps and SEM images of selected samples of $Zr_{1-x}Gd_xB_{12}$, $Zr_{1-x}Sm_xB_{12}$, $Zr_{1-x}Nd_xB_{12}$ and $Zr_{1-x}Pr_xB_{12}$ alloys (x=0.55, 0.30, 0.25 and 0.25 respectively) are presented in FIG. 18. For the $Zr_{0.45}Gd_{0.55}B_{12}$ solid solution, the presence of zirconium and gadolinium can be seen in the dodecaboride phase. The boron rich areas correspond to a higher boride phase $GdB_{66}$ (cubic, $Fm\bar{3}c$ structure, a=23.449 Å, ICSD 614306). The $Zr_{0.70}Sm_{0.30}B_{12}$ solid solution shows the presence of zirconium and samarium in the dodecaboride phase. Here, the samarium rich areas correspond to $SmB_6$ (cubic, $Pm\bar{3}m$ structure, a=4.133 Å, ICSD 194196), and the boron rich areas correspond to the higher boride phase $SmB_{66}$ (cubic, $Fm\bar{3}c$ structure, a=23.468 Å). The $Zr_{0.75}Nd_{0.25}B_{12}$ and $Zr_{0.75}Pr_{0.25}B_{12}$ solid solutions show the presence of both zirconium and the secondary metals, neodymium and praseodymium, respectively, in the dodecaboride phase. The neodymium rich areas correspond to $NdB_6$ (cubic, $Pm\bar{3}m$ structure, a=4.127 Å, ICSD 614931), while the praseodymium rich areas correspond to $PrB_6$ (cubic, $Pm\bar{3}m$ structure, a=4.123 Å, ICSD 615183). In the samples containing Nd and Zr, the boron rich areas correspond to the higher boride phase $NdB_{66}$ (cubic, $Fm\bar{3}c$ structure, a=23.476 Å) and $ZrB_{50}$ (rhombohedral, $R\bar{3}m$ structure, a=10.932 Å, c=23.849 Å), respectively. For praseodymium, however, the metal rich areas correspond to $PrB_6$ (cubic, $Pm\bar{3}m$ structure, a=4.123 Å, ICSD 615183), while the boron rich areas correspond to the higher boride phase $ZrB_{50}$ (rhombohedral, $R\bar{3}m$ structure, a=10.932 Å, c=23.849 Å) as the $PrB_{66}$ phase does not exist.

Maud software was used to perform the unit cell refinements. For $Zr_{1-x}Gd_xB_{12}$, the cubic unit cell parameter (a) reached a value of 7.453 Å for the alloy with 55 nominal at. % Gd, compared to 7.412 Å and 7.524 Å (value from high-pressure—6.5 GPa—synthesis) for pure $ZrB_{12}$ and $GdB_{12}$, respectively. The change in the unit cell suggests the formation of a solid solution between $GdB_{12}$ and $ZrB_{12}$. As more Gd is present in the alloy, the $GdB_6$ phase concentration increases, as it is the ambient pressure stable boride phase.

EDS analysis and calculations using Vegard's Law were used to determine the solubility limit of Gd in $ZrB_{12}$ (Table 4). Both methods gave a value 54 at. % Gd in $ZrB_{12}$; the excess Gd formed the boron rich $GdB_{66}$ and $ZrB_{50}$ phase. For $Zr_{1-x}Sm_xB_{12}$, the cubic unit cell parameter (a) reached a value of 7.428 Å for the alloy with 30 nominal at. % Sm, compared to 7.412 Å for pure $ZrB_{12}$. As the high pressure synthesis of $SmB_{12}$ was not successful, since it likely requires a pressure in excess of 6.5 GPa, there is no literature value for its unit cell. However, using the composition from EDS analysis and unit cell refinements, the unit cell for pure $SmB_{12}$ can be determined through extrapolation 7.543 Å. Still, the change in the unit cell suggests the formation of a solid solution between $SmB_{12}$ and $ZrB_{12}$. As more Sm is present in the alloy, the $SmB_6$ phase concentration increases, as it is the ambient pressure stable boride phase for samarium.

For $Zr_{1-x}Nd_xB_{12}$ and $Zr_{1-x}Pr_xB_{12}$ there is a slight change in the unit cell parameter (a) compared to the pure $ZrB_{12}$, corresponding to the limited solubilities of Nd and Pr in $ZrB_{12}$, 7 and 4 at. %, respectively. Similar to $SmB_{12}$, the high-pressure synthesis of $NdB_{12}$ and $PrB_{12}$ was unsuccessful; therefore, it is not possible to compare the unit cells of the alloys with the unit cell of the pure compounds.

Another confirmation of the solid solution formation of the dodecaboride phase can be directly observed using a light microscope (FIG. 21) going from pure $ZrB_{12}$ (violet) to $Zr_{0.45}Gd_{0.55}B_{12}$ (blue) and $Zr_{0.70}Sm_{0.30}B_{12}$ (blue-violet). The color change is due to the charge-transfer between the cuboctahedron boron cage network and the metal atoms. It also suggests that pure $GdB_{12}$ and $SmB_{12}$ should be blue, similar to $YB_{12}$, as Gd, Sm and Y are all in +3 oxidation states. The dark blue phase observed in $Zr_{1-x}Sm_xB_{12}$ is $SmB_6$.

The thermal stability of the zirconium-gadolinium and zirconium-samarium borides was measured in air using thermogravimetric analysis (FIG. 13). The $Zr_{0.5}Gd_{0.5}B_{12}$ sample is stable in air up to ~630° C., while $Zr_{0.75}Sm_{0.25}B_{12}$ up to ~620° C. compared to ~610° C. for pure $ZrB_{12}$.

While preferred embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the disclosure and that methods and structures within the scope of these claims and their equivalents be covered thereby.

What is claimed is:

1. A composite matrix comprising $Zr_{1-x}Y_xB_{12}$ wherein x is from 0.001 to 0.999.
2. A composite matrix comprising $Zr_{1-x}Sc_xB_{12}$ wherein x is from 0.001 to 0.999.
3. A composite matrix comprising $Y_{1-x}Sc_xB_{12}$ wherein x is from 0.001 to 0.999.
4. A composite matrix comprising $Zr_{1-x}Gd_xB_{12}$ wherein x is from 0.001 to 0.999.
5. A composite matrix comprising $Zr_{1-x}Sm_xB_{12}$ wherein x is from 0.001 to 0.999.
6. A composite matrix comprising $Zr_{1-x}Nd_xB_{12}$ wherein x is from 0.001 to 0.999.
7. A composite matrix comprising $Zr_{1-x}Pr_xB_{12}$ wherein x is from 0.001 to 0.999.

* * * * *